US010636019B1

(12) United States Patent
Abrons

(10) Patent No.: US 10,636,019 B1
(45) Date of Patent: Apr. 28, 2020

(54) INTERACTIVE GRATUITY PLATFORM

(71) Applicant: Square, Inc., San Francisco, CA (US)

(72) Inventor: Adam Abrons, Alameda, CA (US)

(73) Assignee: Square, Inc., San Francisco, CA (US)

( * ) Notice: Subject to any disclaimer, the term of this patent is extended or adjusted under 35 U.S.C. 154(b) by 401 days.

(21) Appl. No.: 15/087,960

(22) Filed: Mar. 31, 2016

(51) Int. Cl.
*G06Q 20/10* (2012.01)
*G06Q 20/40* (2012.01)

(52) U.S. Cl.
CPC ......... *G06Q 20/102* (2013.01); *G06Q 20/401* (2013.01)

(58) Field of Classification Search
None
See application file for complete search history.

(56) References Cited

U.S. PATENT DOCUMENTS 4,035,614 A 7/1977 Frattarola et al.
4,254,441 A 3/1981 Fisher
4,591,937 A 5/1986 Nakarai et al.
4,609,957 A 9/1986 Gentet et al.
4,845,740 A 7/1989 Tokuyama et al.
5,266,789 A 11/1993 Anglin et al.
5,434,400 A 7/1995 Scherzer
5,463,678 A 10/1995 Kepley, III et al.
5,589,855 A 12/1996 Blumstein et al.
5,590,038 A 12/1996 Pitroda
5,603,078 A 2/1997 Henderson et al.
5,652,421 A 7/1997 Veeneman et al.
5,729,591 A 3/1998 Bailey
5,764,742 A 6/1998 Howard et al.
5,850,599 A 12/1998 Seiderman
5,878,337 A 3/1999 Joao et al.
5,945,654 A 8/1999 Huang
(Continued)

FOREIGN PATENT DOCUMENTS

AU 2017235924 A1 10/2017
CA 2 916 603 A1 12/2014
(Continued)

OTHER PUBLICATIONS

Final Office Action dated Nov. 10, 2016, for U.S. Appl. No. 13/830,350, of Morgan, T.B., et al., filed Mar. 14, 2013.
(Continued)

*Primary Examiner* — Joseph W. King
(74) *Attorney, Agent, or Firm* — Lee & Hayes, P.C.

(57) ABSTRACT

In some examples, methods and systems generate interactive receipts with the option of a dynamic tip amount. The method includes determining at least one tip determinant based at least in part on the payment transaction, wherein the tip determinant is selected from a group of: the merchant; the customer; a payment object presented by the customer towards the payment transaction; a geographical location of a mobile device associated with one of the merchant and the customer; and a category of a merchant's item corresponding to the payment transaction. The method includes obtaining, by a dynamic tip generator, a tipping profile based on a history of tipping behavior associated with the tip determinant and generating, by the dynamic tip generator, at least one dynamic tip amount based at least on the tipping profile, which is presented to the customer.

23 Claims, 17 Drawing Sheets

(56) References Cited

U.S. PATENT DOCUMENTS

| | | | |
|---|---|---|---|
| 5,960,411 | A | 9/1999 | Hartman et al. |
| 5,991,749 | A | 11/1999 | Morrill, Jr. |
| 6,006,109 | A | 12/1999 | Shin |
| 6,021,944 | A | 2/2000 | Arakaki |
| 6,032,859 | A | 3/2000 | Muehlberger et al. |
| 6,061,666 | A | 5/2000 | Do et al. |
| 6,129,277 | A | 10/2000 | Grant et al. |
| 6,154,738 | A | 11/2000 | Call |
| 6,175,922 | B1 | 1/2001 | Wang |
| 6,193,155 | B1 | 2/2001 | Walker et al. |
| 6,234,389 | B1 | 5/2001 | Valliani et al. |
| 6,263,352 | B1 | 7/2001 | Cohen |
| 6,308,227 | B1 | 10/2001 | Kumar et al. |
| 6,330,544 | B1 | 12/2001 | Walker et al. |
| 6,341,353 | B1 | 1/2002 | Herman et al. |
| 6,363,139 | B1 | 3/2002 | Zurek et al. |
| 6,400,517 | B1 | 6/2002 | Murao |
| 6,431,445 | B1 | 8/2002 | DeLand, Jr. et al. |
| 6,476,743 | B1 | 11/2002 | Brown et al. |
| 6,481,623 | B1 | 11/2002 | Grant et al. |
| 6,497,368 | B1 | 12/2002 | Friend et al. |
| 6,536,670 | B1 | 3/2003 | Postman et al. |
| 6,579,728 | B2 | 6/2003 | Grant et al. |
| 6,612,488 | B2 | 9/2003 | Suzuki |
| 6,813,608 | B1 | 11/2004 | Baranowski |
| 6,832,721 | B2 | 12/2004 | Fujll |
| 6,850,147 | B2 | 2/2005 | Prokoski et al. |
| 6,868,391 | B1 | 3/2005 | Hultgren |
| 6,896,182 | B2 | 5/2005 | Sakaguchi |
| 6,898,598 | B2 | 5/2005 | Himmel et al. |
| 6,944,782 | B2 | 9/2005 | von Mueller et al. |
| 7,003,316 | B1 | 2/2006 | Elias et al. |
| 7,013,149 | B2 | 3/2006 | Vetro et al. |
| 7,085,812 | B1 | 8/2006 | Sherwood |
| 7,149,296 | B2 | 12/2006 | Brown et al. |
| 7,155,411 | B1 | 12/2006 | Blinn et al. |
| 7,163,148 | B2 | 1/2007 | Durbin et al. |
| 7,167,711 | B1 | 1/2007 | Dennis |
| 7,233,843 | B2 | 6/2007 | Budhraja et al. |
| 7,252,232 | B2 | 8/2007 | Fernandes et al. |
| 7,324,836 | B2 | 1/2008 | Steenstra et al. |
| 7,343,317 | B2 | 3/2008 | Jokinen et al. |
| 7,363,054 | B2 | 4/2008 | Elias et al. |
| 7,409,234 | B2 | 8/2008 | Glezerman |
| 7,433,452 | B2 | 10/2008 | Taylor et al. |
| 7,475,024 | B1 | 1/2009 | Phan |
| 7,478,054 | B1 | 1/2009 | Adams et al. |
| 7,493,390 | B2 | 2/2009 | Bobde et al. |
| 7,505,762 | B2 | 3/2009 | Onyon et al. |
| 7,506,812 | B2 | 3/2009 | von Mueller et al. |
| 7,520,430 | B1 | 4/2009 | Stewart et al. |
| 7,552,087 | B2 | 6/2009 | Schultz et al. |
| 7,575,166 | B2 | 8/2009 | McNamara |
| 7,580,873 | B1 | 8/2009 | Silver et al. |
| 7,581,678 | B2 | 9/2009 | Narendra et al. |
| 7,600,673 | B2 | 10/2009 | Stoutenburg et al. |
| 7,603,382 | B2 | 10/2009 | Halt, Jr. |
| 7,708,189 | B1 | 5/2010 | Cipriano |
| 7,764,185 | B1 | 7/2010 | Manz et al. |
| 7,793,834 | B2 | 9/2010 | Hachey et al. |
| 7,805,378 | B2 | 9/2010 | Berardi et al. |
| 7,810,729 | B2 | 10/2010 | Morley, Jr. |
| 7,818,809 | B1 | 10/2010 | Sobel et al. |
| 7,869,591 | B1 | 1/2011 | Nagel et al. |
| 7,896,248 | B2 | 3/2011 | Morley, Jr. |
| 7,918,394 | B1 | 4/2011 | Morley, Jr. |
| 7,945,494 | B2 | 5/2011 | Williams |
| 8,015,070 | B2 | 9/2011 | Sinha et al. |
| 8,060,259 | B2 | 11/2011 | Budhraja et al. |
| 8,112,066 | B2 | 2/2012 | Ben Ayed |
| 8,190,514 | B2 | 5/2012 | Bishop et al. |
| 8,228,299 | B1 | 7/2012 | Maloney et al. |
| 8,231,055 | B2 | 7/2012 | Wen |
| 8,266,551 | B2 | 9/2012 | Boldyrev et al. |
| 8,281,998 | B2 | 10/2012 | Tang et al. |
| 8,376,239 | B1 | 2/2013 | Humphrey |
| 8,401,710 | B2 | 3/2013 | Budhraja et al. |
| 8,423,459 | B1 | 4/2013 | Green et al. |
| 8,434,682 | B1 | 5/2013 | Argue et al. |
| 8,459,544 | B2 | 6/2013 | Casey et al. |
| 8,498,888 | B1 | 7/2013 | Raff et al. |
| 8,577,803 | B2 | 11/2013 | Chatterjee et al. |
| 8,577,810 | B1 | 11/2013 | Dalit et al. |
| 8,579,203 | B1 | 11/2013 | Lambeth et al. |
| 8,602,296 | B1 | 12/2013 | Velline et al. |
| 8,630,586 | B2 | 1/2014 | Dvortsov et al. |
| 8,676,119 | B2 | 3/2014 | Cohen et al. |
| 8,732,085 | B2 | 5/2014 | Bennett |
| 8,788,418 | B2 | 7/2014 | Spodak et al. |
| 8,855,312 | B1 | 10/2014 | Hodgman et al. |
| 8,859,337 | B2 | 10/2014 | Gaul et al. |
| 8,892,462 | B1 | 11/2014 | Borovsky et al. |
| 8,939,357 | B1 | 1/2015 | Perry |
| 8,965,791 | B1 * | 2/2015 | Bell ..................... G06Q 20/209 705/24 |
| 8,972,298 | B2 | 3/2015 | Kunz et al. |
| 9,010,644 | B1 | 4/2015 | Workley |
| 9,064,249 | B1 | 6/2015 | Borovsky et al. |
| 9,092,767 | B1 | 7/2015 | Andrews et al. |
| 9,092,776 | B2 | 7/2015 | Dessert |
| 9,092,828 | B2 | 7/2015 | Hosp |
| 9,195,985 | B2 | 11/2015 | Domenica et al. |
| 9,224,141 | B1 | 12/2015 | Lamba et al. |
| 9,542,681 | B1 | 1/2017 | Borovsky et al. |
| 9,704,146 | B1 | 7/2017 | Morgan et al. |
| 9,721,251 | B1 | 8/2017 | Jen et al. |
| 2001/0001856 | A1 | 5/2001 | Gould et al. |
| 2001/0029470 | A1 | 10/2001 | Schultz et al. |
| 2001/0029484 | A1 | 10/2001 | Schultz et al. |
| 2002/0002507 | A1 | 1/2002 | Hatakeyama |
| 2002/0016765 | A1 | 2/2002 | Sacks |
| 2002/0030871 | A1 | 3/2002 | Anderson et al. |
| 2002/0073043 | A1 | 6/2002 | Herman et al. |
| 2002/0077974 | A1 | 6/2002 | Ortiz |
| 2002/0091646 | A1 | 7/2002 | Lake et al. |
| 2002/0099648 | A1 | 7/2002 | DeVoe et al. |
| 2002/0108062 | A1 | 8/2002 | Nakajima et al. |
| 2002/0169541 | A1 | 11/2002 | Bouve et al. |
| 2002/0188535 | A1 | 12/2002 | Chao et al. |
| 2002/0188559 | A1 | 12/2002 | Schultz |
| 2003/0014317 | A1 | 1/2003 | Siegel et al. |
| 2003/0061157 | A1 | 3/2003 | Hirka et al. |
| 2003/0065805 | A1 | 4/2003 | Barnes, Jr. |
| 2003/0089772 | A1 | 5/2003 | Chien |
| 2003/0115126 | A1 | 6/2003 | Pitroda |
| 2003/0115285 | A1 | 6/2003 | Lee et al. |
| 2003/0132300 | A1 | 7/2003 | Dilday et al. |
| 2003/0135463 | A1 | 7/2003 | Brown et al. |
| 2003/0144040 | A1 | 7/2003 | Liu et al. |
| 2003/0182204 | A1 | 9/2003 | Rhee |
| 2003/0204447 | A1 | 10/2003 | Dalzell et al. |
| 2003/0217005 | A1 | 11/2003 | Drummond et al. |
| 2003/0220835 | A1 | 11/2003 | Barnes, Jr. |
| 2004/0012875 | A1 | 1/2004 | Wood |
| 2004/0030601 | A1 | 2/2004 | Pond et al. |
| 2004/0041911 | A1 | 3/2004 | Odagiri et al. |
| 2004/0058705 | A1 | 3/2004 | Morgan et al. |
| 2004/0087339 | A1 | 5/2004 | Goldthwaite et al. |
| 2004/0093496 | A1 | 5/2004 | Colnot |
| 2004/0104268 | A1 | 6/2004 | Bailey |
| 2004/0127256 | A1 | 7/2004 | Goldthwaite et al. |
| 2004/0128256 | A1 | 7/2004 | Krouse et al. |
| 2004/0138999 | A1 | 7/2004 | Friedman et al. |
| 2004/0193489 | A1 | 9/2004 | Boyd et al. |
| 2004/0204074 | A1 | 10/2004 | Desai |
| 2004/0204990 | A1 | 10/2004 | Lee et al. |
| 2004/0215520 | A1 | 10/2004 | Butler et al. |
| 2004/0219971 | A1 | 11/2004 | Ciancio et al. |
| 2004/0230489 | A1 | 11/2004 | Goldthwaite et al. |
| 2004/0230526 | A1 | 11/2004 | Praisner |
| 2005/0055582 | A1 | 3/2005 | Bazakos et al. |
| 2005/0077870 | A1 | 4/2005 | Ha et al. |
| 2005/0209719 | A1 | 9/2005 | Beckert et al. |
| 2005/0236480 | A1 | 10/2005 | Vrotsos et al. |

(56) References Cited

U.S. PATENT DOCUMENTS

| | | | |
|---|---|---|---|
| 2005/0242173 | A1 | 11/2005 | Suzuki |
| 2005/0246245 | A1 | 11/2005 | Satchell et al. |
| 2005/0247787 | A1 | 11/2005 | Von Mueller et al. |
| 2006/0049255 | A1 | 3/2006 | von Mueller et al. |
| 2006/0064373 | A1 | 3/2006 | Kelley |
| 2006/0085333 | A1 | 4/2006 | Wah et al. |
| 2006/0094481 | A1 | 5/2006 | Gullickson |
| 2006/0122902 | A1 | 6/2006 | Petrov et al. |
| 2006/0131385 | A1 | 6/2006 | Kim |
| 2006/0146839 | A1 | 7/2006 | Hurwitz et al. |
| 2006/0208066 | A1 | 9/2006 | Finn et al. |
| 2006/0223580 | A1 | 10/2006 | Antonio et al. |
| 2006/0234771 | A1 | 10/2006 | Shavrov |
| 2006/0261149 | A1 | 11/2006 | Raghavendra Tulluri |
| 2006/0273158 | A1 | 12/2006 | Suzuki |
| 2007/0067833 | A1 | 3/2007 | Colnot |
| 2007/0069013 | A1 | 3/2007 | Seifert et al. |
| 2007/0073619 | A1 | 3/2007 | Smith |
| 2007/0100651 | A1 | 5/2007 | Ramer et al. |
| 2007/0124211 | A1 | 5/2007 | Smith |
| 2007/0155430 | A1 | 7/2007 | Cheon et al. |
| 2007/0174080 | A1 | 7/2007 | Outwater |
| 2007/0208930 | A1 | 9/2007 | Blank et al. |
| 2007/0221728 | A1 | 9/2007 | Ferro et al. |
| 2007/0244811 | A1 | 10/2007 | Tumminaro |
| 2007/0250623 | A1 | 10/2007 | Hickey et al. |
| 2007/0255620 | A1 | 11/2007 | Tumminaro et al. |
| 2007/0255653 | A1 | 11/2007 | Tumminaro et al. |
| 2007/0255662 | A1 | 11/2007 | Tumminaro |
| 2007/0272740 | A1 | 11/2007 | Palacios |
| 2008/0027815 | A1 | 1/2008 | Johnson et al. |
| 2008/0035725 | A1 | 2/2008 | Jambunathan et al. |
| 2008/0037442 | A1 | 2/2008 | Bill |
| 2008/0040265 | A1 | 2/2008 | Rackley, III et al. |
| 2008/0040274 | A1 | 2/2008 | Uzo |
| 2008/0052176 | A1 | 2/2008 | Buchheit |
| 2008/0059370 | A1 | 3/2008 | Sada et al. |
| 2008/0059375 | A1 | 3/2008 | Abifaker |
| 2008/0078831 | A1 | 4/2008 | Johnson et al. |
| 2008/0099375 | A1 | 5/2008 | Landau et al. |
| 2008/0103972 | A1 | 5/2008 | Lanc |
| 2008/0133351 | A1 | 6/2008 | White et al. |
| 2008/0147564 | A1 | 6/2008 | Singhal |
| 2008/0172306 | A1 | 7/2008 | Schorr et al. |
| 2008/0177624 | A9 | 7/2008 | Dohse |
| 2008/0177662 | A1 | 7/2008 | Smith et al. |
| 2008/0177826 | A1 | 7/2008 | Pitroda |
| 2008/0197188 | A1 | 8/2008 | Jagatic et al. |
| 2008/0208762 | A1 | 8/2008 | Arthur et al. |
| 2008/0238610 | A1 | 10/2008 | Rosenberg |
| 2008/0249939 | A1 | 10/2008 | Veenstra |
| 2008/0262925 | A1 | 10/2008 | Kim et al. |
| 2008/0270246 | A1 | 10/2008 | Chen |
| 2008/0275779 | A1 | 11/2008 | Lakshminarayanan |
| 2008/0277465 | A1 | 11/2008 | Pletz et al. |
| 2008/0296978 | A1 | 12/2008 | Finkenzeller et al. |
| 2009/0068982 | A1 | 3/2009 | Chen et al. |
| 2009/0070228 | A1 | 3/2009 | Ronen |
| 2009/0098908 | A1 | 4/2009 | Silverbrook et al. |
| 2009/0099961 | A1 | 4/2009 | Ogilvy |
| 2009/0100168 | A1 | 4/2009 | Harris |
| 2009/0104920 | A1 | 4/2009 | Moon et al. |
| 2009/0106138 | A1 | 4/2009 | Smith et al. |
| 2009/0112766 | A1 | 4/2009 | Hammad et al. |
| 2009/0117883 | A1 | 5/2009 | Coffing et al. |
| 2009/0119190 | A1 | 5/2009 | Realini |
| 2009/0125429 | A1 | 5/2009 | Takayama |
| 2009/0144161 | A1 | 6/2009 | Fisher |
| 2009/0159663 | A1 | 6/2009 | Mullen et al. |
| 2009/0159681 | A1 | 6/2009 | Mullen et al. |
| 2009/0187492 | A1 | 7/2009 | Hammad et al. |
| 2009/0192904 | A1 | 7/2009 | Patterson et al. |
| 2009/0266884 | A1 | 10/2009 | Killian et al. |
| 2009/0271265 | A1 | 10/2009 | Lay et al. |
| 2009/0288012 | A1 | 11/2009 | Hertel et al. |
| 2009/0292591 | A1 | 11/2009 | Schultz et al. |
| 2009/0313132 | A1 | 12/2009 | McKenna et al. |
| 2009/0319421 | A1 | 12/2009 | Mathis et al. |
| 2009/0319638 | A1 | 12/2009 | Faith et al. |
| 2010/0010906 | A1 | 1/2010 | Grecia |
| 2010/0063893 | A1 | 3/2010 | Townsend |
| 2010/0076777 | A1 | 3/2010 | Paretti et al. |
| 2010/0082420 | A1 | 4/2010 | Trifiletti et al. |
| 2010/0082490 | A1 | 4/2010 | Rosenblatt et al. |
| 2010/0102125 | A1 | 4/2010 | Gatto |
| 2010/0174596 | A1 | 7/2010 | Gilman et al. |
| 2010/0174915 | A1 | 7/2010 | Prokin |
| 2010/0184479 | A1 | 7/2010 | Griffin, Jr. |
| 2010/0191653 | A1 | 7/2010 | Johnson et al. |
| 2010/0222000 | A1 | 9/2010 | Sauer et al. |
| 2010/0223145 | A1 | 9/2010 | Dragt |
| 2010/0241536 | A1 | 9/2010 | Tanaka |
| 2010/0243732 | A1 | 9/2010 | Wallner |
| 2010/0259559 | A1 | 10/2010 | Schneider |
| 2010/0263018 | A1 | 10/2010 | Cozart et al. |
| 2010/0269059 | A1 | 10/2010 | Othmer et al. |
| 2010/0306099 | A1 | 12/2010 | Hirson et al. |
| 2011/0029416 | A1 | 2/2011 | Greenspan |
| 2011/0040624 | A1 | 2/2011 | Jhanji |
| 2011/0047013 | A1 | 2/2011 | McKenzie, III |
| 2011/0055084 | A1 | 3/2011 | Singh |
| 2011/0071892 | A1 | 3/2011 | Dickelman |
| 2011/0084131 | A1 | 4/2011 | McKelvey |
| 2011/0084139 | A1 | 4/2011 | McKelvey et al. |
| 2011/0084147 | A1 | 4/2011 | Wilson et al. |
| 2011/0087550 | A1 | 4/2011 | Fordyce, III et al. |
| 2011/0087596 | A1 | 4/2011 | Dorsey |
| 2011/0131128 | A1 | 6/2011 | Vaananen |
| 2011/0137803 | A1 | 6/2011 | Willins |
| 2011/0145049 | A1 | 6/2011 | Hertel et al. |
| 2011/0145052 | A1 | 6/2011 | Lin et al. |
| 2011/0145082 | A1 | 6/2011 | Hammad |
| 2011/0161235 | A1 | 6/2011 | Beenau et al. |
| 2011/0174879 | A1 | 7/2011 | Morley, Jr. |
| 2011/0178883 | A1 | 7/2011 | Granbery et al. |
| 2011/0180598 | A1 | 7/2011 | Morgan et al. |
| 2011/0180601 | A1 | 7/2011 | Morley, Jr. |
| 2011/0191196 | A1 | 8/2011 | Orr et al. |
| 2011/0198395 | A1 | 8/2011 | Chen |
| 2011/0202463 | A1 | 8/2011 | Powell |
| 2011/0218871 | A1 | 9/2011 | Singh |
| 2011/0246284 | A1 | 10/2011 | Chaikin et al. |
| 2011/0251892 | A1 | 10/2011 | Laracey |
| 2011/0251962 | A1 | 10/2011 | Hruska |
| 2011/0258014 | A1 | 10/2011 | Evangelist et al. |
| 2011/0258120 | A1 | 10/2011 | Weiss |
| 2011/0258689 | A1 | 10/2011 | Cohen et al. |
| 2011/0259957 | A1 | 10/2011 | Tsai |
| 2011/0270747 | A1 | 11/2011 | Xu |
| 2011/0276418 | A1 | 11/2011 | Velani |
| 2011/0295750 | A1 | 12/2011 | Rammal |
| 2011/0302019 | A1 | 12/2011 | Proctor, Jr. et al. |
| 2011/0302080 | A1 | 12/2011 | White et al. |
| 2011/0313840 | A1 | 12/2011 | Mason et al. |
| 2011/0313867 | A9 | 12/2011 | Silver |
| 2011/0313871 | A1 | 12/2011 | Greenwood |
| 2011/0313880 | A1 | 12/2011 | Paul et al. |
| 2011/0320345 | A1 | 12/2011 | Taveau et al. |
| 2012/0008851 | A1 | 1/2012 | Pennock et al. |
| 2012/0011072 | A1 | 1/2012 | Lodolo |
| 2012/0012653 | A1 | 1/2012 | Johnson et al. |
| 2012/0016731 | A1 | 1/2012 | Smith et al. |
| 2012/0016794 | A1 | 1/2012 | Orr et al. |
| 2012/0022930 | A1 | 1/2012 | Brouhard |
| 2012/0022944 | A1 | 1/2012 | Volpi |
| 2012/0029990 | A1 | 2/2012 | Fisher |
| 2012/0030044 | A1 | 2/2012 | Hurst |
| 2012/0059701 | A1 | 3/2012 | van der Veen et al. |
| 2012/0059718 | A1 | 3/2012 | Ramer et al. |
| 2012/0059758 | A1 | 3/2012 | Carlson |
| 2012/0078736 | A1 | 3/2012 | Denzer et al. |
| 2012/0084210 | A1 | 4/2012 | Farahmand |
| 2012/0089418 | A1 | 4/2012 | Kamath et al. |
| 2012/0095867 | A1 | 4/2012 | McKelvey |

(56) References Cited

U.S. PATENT DOCUMENTS

| | | | |
|---|---|---|---|
| 2012/0095871 | A1 | 4/2012 | Dorsey et al. |
| 2012/0110568 | A1 | 5/2012 | Abel et al. |
| 2012/0143772 | A1 | 6/2012 | Abadir |
| 2012/0150611 | A1 | 6/2012 | Isaacson et al. |
| 2012/0150643 | A1 | 6/2012 | Wolfe et al. |
| 2012/0150742 | A1 | 6/2012 | Poon et al. |
| 2012/0166311 | A1 | 6/2012 | Dwight et al. |
| 2012/0173348 | A1 | 7/2012 | Yoo et al. |
| 2012/0185306 | A1 | 7/2012 | Cheng |
| 2012/0185355 | A1 | 7/2012 | Kilroy |
| 2012/0197740 | A1 | 8/2012 | Grigg et al. |
| 2012/0197743 | A1 | 8/2012 | Grigg et al. |
| 2012/0197794 | A1 | 8/2012 | Grigg et al. |
| 2012/0209749 | A1 | 8/2012 | Hammad et al. |
| 2012/0209773 | A1 | 8/2012 | Ranganathan |
| 2012/0214416 | A1 | 8/2012 | Kent et al. |
| 2012/0244885 | A1 | 9/2012 | Hefetz |
| 2012/0246074 | A1 | 9/2012 | Annamalai et al. |
| 2012/0254031 | A1 | 10/2012 | Walker et al. |
| 2012/0271707 | A1 | 10/2012 | Harrison et al. |
| 2012/0271725 | A1 | 10/2012 | Cheng |
| 2012/0278727 | A1 | 11/2012 | Ananthakrishnan et al. |
| 2012/0284036 | A1 | 11/2012 | Evans |
| 2012/0290422 | A1 | 11/2012 | Bhinder |
| 2012/0290472 | A1 | 11/2012 | Mullen et al. |
| 2012/0290609 | A1 | 11/2012 | Britt |
| 2012/0296679 | A1 | 11/2012 | Im |
| 2012/0296726 | A1 | 11/2012 | Dessert et al. |
| 2012/0323685 | A1 | 12/2012 | Ullah |
| 2013/0006773 | A1 | 1/2013 | Lutnick et al. |
| 2013/0019284 | A1 | 1/2013 | Pacyga et al. |
| 2013/0024341 | A1 | 1/2013 | Jeon et al. |
| 2013/0024364 | A1 | 1/2013 | Shrivastava et al. |
| 2013/0024371 | A1 | 1/2013 | Hariramani et al. |
| 2013/0030889 | A1 | 1/2013 | Davich et al. |
| 2013/0041824 | A1 | 2/2013 | Gupta |
| 2013/0048719 | A1 | 2/2013 | Bennett |
| 2013/0050080 | A1 | 2/2013 | Dahl et al. |
| 2013/0054320 | A1 | 2/2013 | Dorso et al. |
| 2013/0065672 | A1 | 3/2013 | Gelman et al. |
| 2013/0066783 | A1 | 3/2013 | Wolff |
| 2013/0073363 | A1 | 3/2013 | Boal |
| 2013/0085941 | A1 | 4/2013 | Rosenblatt et al. |
| 2013/0103574 | A1 | 4/2013 | Conrad et al. |
| 2013/0103946 | A1 | 4/2013 | Binenstock |
| 2013/0110607 | A1 | 5/2013 | Basmajian et al. |
| 2013/0117329 | A1 | 5/2013 | Bank et al. |
| 2013/0124333 | A1 | 5/2013 | Doughty et al. |
| 2013/0132140 | A1 | 5/2013 | Amin et al. |
| 2013/0132246 | A1 | 5/2013 | Amin et al. |
| 2013/0132274 | A1 | 5/2013 | Henderson et al. |
| 2013/0132887 | A1 | 5/2013 | Amin et al. |
| 2013/0134962 | A1 | 5/2013 | Kamel et al. |
| 2013/0138563 | A1 | 5/2013 | Gilder et al. |
| 2013/0144707 | A1 | 6/2013 | Issacson et al. |
| 2013/0144792 | A1 | 6/2013 | Nilsson et al. |
| 2013/0151613 | A1 | 6/2013 | Dhawan et al. |
| 2013/0155474 | A1 | 6/2013 | Roach et al. |
| 2013/0159081 | A1 | 6/2013 | Shastry et al. |
| 2013/0159172 | A1 | 6/2013 | Kim |
| 2013/0159173 | A1 | 6/2013 | Sivaraman et al. |
| 2013/0159446 | A1 | 6/2013 | Carlson et al. |
| 2013/0166402 | A1 | 6/2013 | Parento et al. |
| 2013/0166445 | A1 | 6/2013 | Issacson et al. |
| 2013/0173407 | A1 | 7/2013 | Killian et al. |
| 2013/0179227 | A1 | 7/2013 | Booth et al. |
| 2013/0181045 | A1 | 7/2013 | Dessert et al. |
| 2013/0198018 | A1 | 8/2013 | Baig |
| 2013/0204727 | A1 | 8/2013 | Rothschild |
| 2013/0204777 | A1 | 8/2013 | Irwin, Jr. et al. |
| 2013/0204793 | A1 | 8/2013 | Kerridge et al. |
| 2013/0212655 | A1 | 8/2013 | Hoyos et al. |
| 2013/0218697 | A1 | 8/2013 | Kingston et al. |
| 2013/0218721 | A1 | 8/2013 | Borhan et al. |
| 2013/0225081 | A1 | 8/2013 | Doss et al. |
| 2013/0228616 | A1 | 9/2013 | Bhosle et al. |
| 2013/0236109 | A1 | 9/2013 | Madden et al. |
| 2013/0246203 | A1 | 9/2013 | Laracey |
| 2013/0246207 | A1 | 9/2013 | Novak et al. |
| 2013/0246280 | A1 | 9/2013 | Kirsch |
| 2013/0246301 | A1 | 9/2013 | Radhakrishnan et al. |
| 2013/0248591 | A1 | 9/2013 | Look et al. |
| 2013/0268431 | A1 | 10/2013 | Mohsenzadeh |
| 2013/0290173 | A1 | 10/2013 | Nemeroff |
| 2013/0290187 | A1 | 10/2013 | Itwaru |
| 2013/0290522 | A1 | 10/2013 | Behm, Jr. |
| 2013/0291018 | A1 | 10/2013 | Billings et al. |
| 2013/0297933 | A1 | 11/2013 | Fiducia et al. |
| 2013/0317835 | A1 | 11/2013 | Mathew |
| 2013/0317950 | A1 | 11/2013 | Abraham et al. |
| 2013/0332354 | A1 | 12/2013 | Rhee et al. |
| 2013/0332385 | A1 | 12/2013 | Kilroy et al. |
| 2013/0339253 | A1 | 12/2013 | Sincai |
| 2013/0346223 | A1 | 12/2013 | Prabhu et al. |
| 2014/0006205 | A1 | 1/2014 | Berry et al. |
| 2014/0012754 | A1 | 1/2014 | Hanson et al. |
| 2014/0019236 | A1 | 1/2014 | Argue et al. |
| 2014/0025446 | A1 | 1/2014 | Nagarajan et al. |
| 2014/0032297 | A1 | 1/2014 | Germann et al. |
| 2014/0052613 | A1* | 2/2014 | Tavakoli ............ G06Q 20/3224 705/39 |
| 2014/0052617 | A1 | 2/2014 | Chawla et al. |
| 2014/0057667 | A1 | 2/2014 | Blankenship et al. |
| 2014/0058861 | A1 | 2/2014 | Argue et al. |
| 2014/0067557 | A1 | 3/2014 | van Niekerk et al. |
| 2014/0074569 | A1 | 3/2014 | Francis et al. |
| 2014/0074655 | A1 | 3/2014 | Lim et al. |
| 2014/0074658 | A1 | 3/2014 | Sanchez |
| 2014/0074691 | A1 | 3/2014 | Bank et al. |
| 2014/0074716 | A1 | 3/2014 | Ni |
| 2014/0081783 | A1 | 3/2014 | Paranjape et al. |
| 2014/0081853 | A1 | 3/2014 | Sanchez et al. |
| 2014/0081854 | A1 | 3/2014 | Sanchez et al. |
| 2014/0084059 | A1 | 3/2014 | Sierchio et al. |
| 2014/0089073 | A1 | 3/2014 | Jacobs et al. |
| 2014/0089078 | A1 | 3/2014 | Dessert et al. |
| 2014/0096179 | A1 | 4/2014 | Ben-Shalom et al. |
| 2014/0099888 | A1 | 4/2014 | Flanagan et al. |
| 2014/0100931 | A1 | 4/2014 | Sanchez et al. |
| 2014/0100973 | A1 | 4/2014 | Brown et al. |
| 2014/0101737 | A1 | 4/2014 | Rhee |
| 2014/0108245 | A1 | 4/2014 | Drummond et al. |
| 2014/0114775 | A1 | 4/2014 | Cloin et al. |
| 2014/0114781 | A1 | 4/2014 | Watanabe |
| 2014/0122345 | A1 | 5/2014 | Argue et al. |
| 2014/0129135 | A1 | 5/2014 | Holden et al. |
| 2014/0129302 | A1 | 5/2014 | Amin et al. |
| 2014/0129357 | A1 | 5/2014 | Goodwin |
| 2014/0129942 | A1 | 5/2014 | Rathod |
| 2014/0129951 | A1 | 5/2014 | Amin et al. |
| 2014/0136318 | A1 | 5/2014 | Alberth, Jr. et al. |
| 2014/0136349 | A1 | 5/2014 | Dave et al. |
| 2014/0149282 | A1 | 5/2014 | Philliou et al. |
| 2014/0156508 | A1 | 6/2014 | Argue et al. |
| 2014/0156517 | A1 | 6/2014 | Argue et al. |
| 2014/0164151 | A1* | 6/2014 | Hockley ................ G06Q 50/12 705/15 |
| 2014/0164234 | A1 | 6/2014 | Coffman et al. |
| 2014/0180805 | A1 | 6/2014 | Argue et al. |
| 2014/0184505 | A1 | 7/2014 | Fullerton et al. |
| 2014/0189886 | A1 | 7/2014 | Patterson |
| 2014/0201067 | A1 | 7/2014 | Lai et al. |
| 2014/0207669 | A1 | 7/2014 | Rosenberg |
| 2014/0214567 | A1 | 7/2014 | Llach et al. |
| 2014/0214652 | A1 | 7/2014 | Zheng et al. |
| 2014/0236762 | A1 | 8/2014 | Gerber et al. |
| 2014/0249947 | A1 | 9/2014 | Hicks et al. |
| 2014/0249999 | A1 | 9/2014 | Johnson et al. |
| 2014/0250002 | A1 | 9/2014 | Isaacson et al. |
| 2014/0254820 | A1 | 9/2014 | Gardenfors et al. |
| 2014/0257958 | A1 | 9/2014 | Andrews |
| 2014/0278589 | A1 | 9/2014 | Rados et al. |
| 2014/0279098 | A1 | 9/2014 | Ham |
| 2014/0279184 | A1 | 9/2014 | Lai et al. |

(56) References Cited

U.S. PATENT DOCUMENTS

| | | | | |
|---|---|---|---|---|
| 2014/0379497 | A1 | 12/2014 | Varma et al. | |
| 2014/0379536 | A1 | 12/2014 | Varma et al. | |
| 2014/0379580 | A1 | 12/2014 | Varma et al. | |
| 2015/0012426 | A1 | 1/2015 | Purves et al. | |
| 2015/0025983 | A1 | 1/2015 | Cicerchi | |
| 2015/0032567 | A1 | 1/2015 | Bhatia | |
| 2015/0058146 | A1 | 2/2015 | Gaddam et al. | |
| 2015/0066765 | A1 | 3/2015 | Banks et al. | |
| 2015/0073907 | A1 | 3/2015 | Purves et al. | |
| 2015/0095228 | A1 | 4/2015 | Su et al. | |
| 2015/0100481 | A1 | 4/2015 | Ghosh et al. | |
| 2015/0112822 | A1 | 4/2015 | Aaron et al. | |
| 2015/0112838 | A1 | 4/2015 | Li et al. | |
| 2015/0120418 | A1 | 4/2015 | Cervenka et al. | |
| 2015/0134439 | A1 | 5/2015 | Maxwell et al. | |
| 2015/0134513 | A1 | 5/2015 | Olson et al. | |
| 2015/0134528 | A1 | 5/2015 | Fineman et al. | |
| 2015/0154581 | A1 | 6/2015 | Dorsey | |
| 2015/0178755 | A1 | 6/2015 | Barroso | |
| 2015/0187021 | A1 | 7/2015 | Moring et al. | |
| 2015/0194023 | A1 | 7/2015 | Brackenridge et al. | |
| 2015/0294312 | A1 | 10/2015 | Kendrick et al. | |
| 2015/0332223 | A1 | 11/2015 | Aaron et al. | |
| 2015/0332237 | A1 | 11/2015 | Aaron et al. | |
| 2015/0356570 | A1 | 12/2015 | Goldsmid et al. | |
| 2015/0363757 | A1* | 12/2015 | Mocko | G06Q 20/20 705/16 |
| 2016/0027042 | A1 | 1/2016 | Heeter | |
| 2016/0042339 | A1* | 2/2016 | Nichols | G06Q 20/12 705/35 |
| 2016/0086166 | A1 | 3/2016 | Pomeroy et al. | |
| 2016/0342992 | A1 | 11/2016 | Lee | |
| 2017/0270497 | A1 | 9/2017 | Tsou et al. | |
| 2017/0270505 | A1 | 9/2017 | Tsou et al. | |

FOREIGN PATENT DOCUMENTS

| | | | |
|---|---|---|---|
| CA | 2 930 186 | A1 | 5/2015 |
| CA | 3 016 616 | A1 | 9/2017 |
| GB | 2530451 | A | 3/2016 |
| JP | 2004-78662 | A | 3/2004 |
| JP | 2005-269172 | A | 9/2005 |
| KR | 10-0452161 | B1 | 10/2004 |
| KR | 10-2005-0077659 | A | 8/2005 |
| KR | 10-2006-0103089 | A | 9/2006 |
| KR | 10-2008-0039330 | A | 5/2008 |
| WO | 01/65827 | A2 | 9/2001 |
| WO | 2010/097711 | A2 | 9/2010 |
| WO | 2010/111130 | A2 | 9/2010 |
| WO | 2010/135174 | A1 | 11/2010 |
| WO | 2011/047042 | A2 | 4/2011 |
| WO | 2014/210020 | A1 | 12/2014 |
| WO | 2015/061005 | A1 | 4/2015 |
| WO | 2015/069389 | A1 | 5/2015 |
| WO | 2015/100378 | A1 | 7/2015 |
| WO | 2015/179316 | A1 | 11/2015 |
| WO | 2017/160454 | A1 | 9/2017 |

OTHER PUBLICATIONS

Final Office Action dated Nov. 14, 2016, for U.S. Appl. No. 14/526,361, of White, M.W., et al., filed Oct. 28, 2014.

Final Office Action dated Nov. 29, 2016, for U.S. Appl. No. 14/088,113, of Maxwell, D.W., et al., filed Nov. 22, 2013.

Final Office Action dated Nov. 30, 2016, for U.S. Appl. No. 14/208,800, of Thome, J.P., et al., filed Mar. 13, 2014.

Final Office Action dated Dec. 12, 2016, for U.S. Appl. No. 14/088,141, of Maxwell, D.W., et al., filed Nov. 22, 2013.

Advisory Action dated Dec. 22, 2016, for U.S. Appl. No. 14/145,895, of Aaron, P., et al., filed Dec. 31, 2013.

Final Office Action dated Dec. 27, 2016, for U.S. Appl. No. 14/184,503, of Borovsky, A., et al., filed Feb. 19, 2014.

Notice of Allowance dated Jan. 13, 2017, for U.S. Appl. No. 14/329,658, of Aaron, P., et al., filed Jul. 11, 2014.

Final Office Action dated Jan. 27, 2017, for U.S. Appl. No. 14/329,638, of Aaron, P., et al., filed Jul. 11, 2014.

Examination Report No. 1 for Australian Patent Application No. 2014347192, dated Dec. 15, 2016.

Non-Final Office Action dated Mar. 24, 2016, for U.S. Appl. No. 14/145,895, of Aaron, P., et al., filed Dec. 31, 2013.

Non-Final Office Action dated Apr. 8, 2016, for U.S. Appl. No. 14/526,361, of White, M. W., et al., filed Oct. 28, 2014.

Final Office Action dated Apr. 13, 2016, for U.S. Appl. No. 14/165,256, of Aaron, P., filed Jan. 27, 2014.

Final Office Action dated Apr. 27, 2016, for U.S. Appl. No. 14/182,655, of Spindel, N., et al., filed Feb. 18, 2014.

Final Office Action dated Apr. 28, 2016, for U.S. Appl. No. 14/189,880, of Aaron, P., et al., filed Feb. 25, 2014.

Non-Final Office Action dated May 3, 2016, for U.S. Appl. No. 13/830,350, of Morgan, T. B., et al., filed Mar. 14, 2013.

Non-Final Office Action dated May 9, 2016, for U.S. Appl. No. 14/225,338, of Aaron, P., et al., filed Mar. 25, 2013.

International Search Report and Written Opinion for PCT Application No. PCT/US2014/058398 dated Dec. 24, 2014.

International Search Report and Written Opinion for PCT Application No. PCT/US2014/058447 dated Jan. 15, 2015.

International Search Report and Written Opinion for PCT Application No. PCT/US2014/072269 dated Mar. 31, 2015.

International Search Report and Written Opinion for PCT Application No. PCT/US2015/031423 dated Aug. 13, 2015.

"Another eBay Band-Aid Fails to Fix the New Pricing Structure Flaws," posted on Oct. 18, 2008, Retrieved from the Internet URL: https://thebrewsnews.wordpress.com/2008/10/18/another-ebay-band-aid-fails-to-fix-the-new-pricing-structure-flaws/, on May 16, 2016, pp. 1-4.

"Merchantindustry.com—Best Merchant Services," retrieved from internet URL: https://web.archive.org/web/20121020212419/http://www.merchantindustry.com/, on Dec. 30, 2015, pp. 1-7.

"Online Shopping," dated Nov. 2, 2014, Retrieved from the Internet URL: http://en.wikipedia.org/wiki/Online_shopping, on Nov. 10, 2014, pp. 1-12.

"Tracking Inventory," PayPal, dated Jan. 4, 2010, Retrieved from the Internet URL: https://www.paypal-community.com/t5/How-to-use-PayPal-Archive/Tracking-inventory/td-p/19392, pp. 1-3.

Goode, L., "Paying With Square's New Mobile-Payments App," All Things D, dated Apr. 30, 2012, Retrieved from the Internet URL: http://allthingsd.com/20120430/paying-with-squares-new-mobile-payments-app/, on Nov. 7, 2014, pp. 1-3.

Myres, L., "The Mac Security Blog: What is Multi-Factor Authentication, and How Will It Change in the Future?," Intego, dated Aug. 17, 2012, Retrieved from the Internet URL: http://www.intego.com/mac-security-blog/what-is-multi-factor-authentication-and-how-will-it-change-in-the-future/, on Nov. 11, 2014, pp. 1-4.

Wallen, J., "Five Top Apps for Managing Inventory," Tech Republic, dated Aug. 15, 2012, Retrieved from the Internet URL: http://www.techrepublic.com/blog/five-apps/five-top-apps-for-managing-inventory/, on Nov. 10, 2014, pp. 1-7.

Non-Final Office Action dated Apr. 4, 2014, for U.S. Appl. No. 14/172,842, of Borovsky, A., et al., filed Feb. 4, 2014.

Non-Final Office Action dated Apr. 10, 2014, for U.S. Appl. No. 14/160,490, of Moring, D., et al., filed Jan. 21, 2014.

Non-Final Office Action dated May 29, 2014, for U.S. Appl. No. 13/837,562, of Chin, H.C.A., et al., filed Mar. 15, 2013.

Notice of Allowance dated Aug. 1, 2014, for U.S. Appl. No. 14/172,842, of Borovsky, A., et al., filed Feb. 4, 2014.

Non-Final Office Action dated Aug. 27, 2014, U.S. Appl. No. 14/165,256, of Aaron, P., filed Jan. 27, 2014.

Final Office Action dated Aug. 28, 2014, for U.S. Appl. No. 14/160,490, of Moring, D., et al., filed Jan. 21, 2014.

Advisory Action dated Nov. 18, 2014, for U.S. Appl. No. 14/160,490, of Moring, D., et al., filed Jan. 21, 2014.

Non-Final Office Action dated Jan. 9, 2015, U.S. Appl. No. 14/145,895, of Aaron, P., et al., filed Dec. 31, 2013.

Final Office Action dated Jan. 26, 2015, for U.S. Appl. No. 13/837,562, of Chin, H.C.A., et al., filed Mar. 15, 2013.

(56) References Cited

OTHER PUBLICATIONS

Notice of Allowance dated Feb. 20, 2015, for U.S. Appl. No. 14/513,076, of Borovsky, A., et al., filed Oct. 13, 2014.
Final Office Action dated Mar. 17, 2015, for U.S. Appl. No. 14/165,256, of Aaron, P., filed Jan. 27, 2014.
Non-Final Office Action dated Mar. 19, 2015, for U.S. Appl. No. 14/329,638, of Aaron, P., et al., filed Jul. 11, 2014.
Non-Final Office Action dated Apr. 27, 2015, for U.S. Appl. No. 14/184,503, of Borovsky, A., et al., filed Feb. 19, 2014.
Non-Final Office Action dated May 12, 2015, for U.S. Appl. No. 14/189,869, of Lamba, K., et al., filed Feb. 25, 2014.
Non-Final Office Action dated May 20, 2015, for U.S. Appl. No. 13/829,080, of Morgan, T.B., et al., filed Mar. 14, 2013.
Non-Final Office Action dated May 26, 2015, for U.S. Appl. No. 14/225,338, of Aaron, P., et al., filed Mar. 25, 2014.
Non-Final Office Action dated May 27, 2015, for U.S. Appl. No. 14/197,704, of Lamba, K., et al., filed Mar. 5, 2014.
Non-Final Office Action dated Jul. 2, 2015, for U.S. Appl. No. 14/208,800, of Thome, J.P., et al., filed Mar. 13, 2014.
Non-Final Office Action dated Jul. 10, 2015, for U.S. Appl. No. 14/526,361, of White, M.W., et al., filed Oct. 28, 2014.
Non-Final Office Action dated Jun. 11, 2015, for U.S. Appl. No. 14/692,655, of Borovsky, A., et al., filed Apr. 21, 2015.
Final Office Action dated Aug. 18, 2015, for U.S. Appl. No. 14/145,895, of Aaron, P., et al., filed Dec. 31, 2013.
Final Office Action dated Sep. 17, 2015, for U.S. Appl. No. 13/829,080, of Morgan, T.B., et al., filed Mar. 14, 2013.
Notice of Allowance dated Sep. 18, 2015, for U.S. Appl. No. 14/197,704, of Lamba, K., et al., filed Mar. 5, 2014.
Final Office Action dated Sep. 21, 2015, for U.S. Appl. No. 14/184,503, of Borovsky, A., et al., filed Feb. 19, 2014.
Non-Final Office Action dated Sep. 30, 2015, for U.S. Appl. No. 14/189,880, of Aaron, P., filed Feb. 25, 2014.
Final Office Action dated Oct. 2, 2015, for U.S. Appl. No. 14/225,338, of Aaron, P., et al., filed Mar. 25, 2014.
Final Office Action dated Oct. 5, 2015, for U.S. Appl. No. 14/526,361, of White, M.W., et al., filed Oct. 28, 2014.
Non-Final Office Action dated Oct. 5, 2015, for U.S. Appl. No. 13/829,658, of Morgan, T.B., et al., filed Mar. 14, 2013.
Non-Final Office Action dated Oct. 6, 2015, for U.S. Appl. No. 14/329,658, of Aaron, P., et al. filed Jul. 11, 2014.
Non-Final Office Action dated Oct. 8, 2015, for U.S. Appl. No. 14/149,754, of Spindel, N., et al., filed Jan. 7, 2014.
Non-Final Office Action dated Oct. 8, 2015, for U.S. Appl. No. 14/165,256, of Aaron, P., filed Jan. 27, 2014.
Final Office Action dated Oct. 16, 2015, for U.S. Appl. No. 14/692,655, of Borovsky, A., et al., filed Apr. 21, 2015.
Final Office Action dated Oct. 21, 2015, for U.S. Appl. No. 14/329,638, of Aaron, P., et al. filed Jul. 11, 2014.
Non-Final Office Action dated Nov. 18, 2015, for U.S. Appl. No. 14/182,655, of Spindel, N., et al., filed Feb. 18, 2014.
Advisory Action dated Nov. 24, 2015, for U.S. Appl. No. 13/829,080, of Morgan, T.B., et al., filed Mar. 14, 2013.
Advisory Action dated Dec. 4, 2015, for U.S. Appl. No. 14/184,503, of Borovsky, A., et al., filed Feb. 19, 2014.
Advisory Action dated Dec. 30, 2015, for U.S. Appl. No. 14/692,655, of Borovsky, A., et al., filed Apr. 21, 2015.
Final Office Action dated Dec. 31, 2015, for U.S. Appl. No. 14/208,800, of Thome, J. P., et al., filed Mar. 13, 2014.
Advisory Action dated Dec. 31, 2015, for U.S. Appl. No. 14/225,338, of Aaron, P., et al., filed Mar. 25, 2014.
Advisory Action dated Jan. 21, 2016, for U.S. Appl. No. 14/526,361, of White, M. W., et al., filed Oct. 28, 2014.
Non-Final Office Action dated Jan. 22, 2016, for U.S. Appl. No. 14/189,869, of Lamba, K., et al., filed Feb. 25, 2014.
Non-Final Office Action dated Feb. 2, 2016, for U.S. Appl. No. 13/829,080, of Morgan, T, B., et al., filed Mar. 14, 2013.
Non-Final Office Action dated Mar. 14, 2016, for U.S. Appl. No. 14/692,655, of Borovsky, A., et al., filed Apr. 21, 2015.

Non-Final Office Action dated Jul. 21, 2016, for U.S. Appl. No. 14/329,638, of Aaron, P., et al., filed Jul. 11, 2014.
Final Office Action dated Sep. 1, 2016, for U.S. Appl. No. 14/225,338, of Aaron, P., et al., filed Mar. 25, 2014.
Notice of Allowance dated Sep. 13, 2016, for U.S. Appl. No. 14/692,655, of Borovsky, A., et al., filed Apr. 21, 2015.
Advisory Action dated Sep. 21, 2016, for U.S. Appl. No. 13/829,658, of Morgan, T.B., et al., filed Mar. 14, 2013.
Advisory Action dated Sep. 21, 2016, for U.S. Appl. No. 14/149,754, of Spindel, N., et al., filed Jan. 7, 2014.
Non-Final Office Action dated Sep. 21, 2016, for U.S. Appl. No. 14/189,880, of Aaron, P., filed Feb. 25, 2014.
Non-Final Office Action dated Sep. 22, 2016, for U.S. Appl. No. 14/182,655, of Spindel, N., et al., filed Feb. 18, 2014.
Final Office Action dated Nov. 17, 2017, for U.S. Appl. No. 14/730,860, of Sasmaz, Y., et al., filed Jun. 4, 2015.
Notice of Allowance dated Nov. 24, 2017, for U.S. Appl. No. 13/829,658, of Morgan, T.B., et al., filed Mar. 14, 2013.
Non-Final Office Action dated Dec. 13, 2017, for U.S. Appl. No. 14/312,397, of Varma, A.K., et al., filed Jun. 23, 2014.
Munson, J., and Gupta, V.K., "Location-Based Notification as a General-Purpose Service," dated Sep. 28, 2002, Retrieved from the Internet URL—https://ai2-s2-pdfs.s3.amazonaws.com/1bb5/6ae0a70b030e2f2376ed246834bddcabd27b.pdf, pp. 40-44.
Final Office Action dated Aug. 10, 2017, for U.S. Appl. No. 14/160,490, of Moring, D., et al., filed Jan. 21, 2014.
Final Office Action dated Sep. 15, 2017, for U.S. Appl. No. 14/182,655, of Spindel, N., et al., filed Feb. 18, 2014.
Examination Report No. 2 for Australian Patent Application No. 2014302661, dated Sep. 26, 2017.
Advisory Action dated Oct. 31, 2017, for U.S. Appl. No. 14/160,490, of Moring, D., et al., filed Jan. 21, 2014.
Advisory Action dated Sep. 29, 2016, for U.S. Appl. No. 14/329,658, of Aaron, P., et al., filed Jul. 11, 2014.
Final Office Action dated Oct. 11, 2016, for U.S. Appl. No. 13/829,080, of Morgan, T.B., et al., filed Mar. 14, 2013.
Advisory Action dated Oct. 11, 2016, for U.S. Appl. No. 14/189,869, of Lamba, K., et al., filed Feb. 25, 2014.
Final Office Action dated Oct. 12, 2016, for U.S. Appl. No. 14/145,895, of Aaron, P., et al., filed Dec. 31, 2013.
Final Office Action dated Nov. 1, 2016, for U.S. Appl. No. 14/160,490, of Moring, D., et al., filed Jan. 21, 2014.
Notice of Allowance dated Nov. 8, 2016, for U.S. Appl. No. 14/225,338, of Aaron, P., et al., filed Mar. 25, 2014.
Non-Final Office Action dated Dec. 29, 2017, for U.S. Appl. No. 14/165,256, of Aaron, P., filed Jan. 27, 2014.
Examiner's Requisition for Canadian Patent Application No. 2,930,186, dated Jan. 11, 2018.
Final Office Action dated Jan. 22, 2018, for U.S. Appl. No. 13/830,350, of Morgan, T.B., et al., filed Mar. 14, 2013.
Examiner's Requisition for Canadian Patent Application No. 2,916,603, dated Feb. 15, 2018.
Non-Final Office Action dated Jan. 20, 2017, for U.S. Appl. No. 14/168,274, of Odawa, A.W., et al., filed Jan. 30, 2014.
Examiner Requisition for Canadian Patent Application No. 2,930,186, dated Jan. 30, 2017.
Notice of Acceptance for Australian Patent Application No. 2014347192, dated Feb. 16, 2017.
Advisory Action dated Feb. 24, 2017, for U.S. Appl. No. 14/526,361, of White, M.W., et al., filed Oct. 28, 2014.
Corrected Notice of Allowance dated Feb. 27, 2017, for U.S. Appl. No. 14/329,658, of Aaron, P., et al., filed Jul. 11, 2014.
Notice of Allowance dated Mar. 2, 2017, for U.S. Appl. No. 13/829,080, of Morgan, T.B., et al., filed Mar. 14, 2013.
Final Office Action dated Mar. 2, 2017, for U.S. Appl. No. 14/189,880, of Aaron, P., et al., filed Feb. 25, 2014.
Advisory Action dated Mar. 9, 2017, for U.S. Appl. No. 14/184,503, of Borovsky, A., et al., filed Feb. 19, 2014.
Non-Final Office Action dated Mar. 13, 2017, for U.S. Appl. No. 14/189,869, of Lamba, K., et al., filed Feb. 25, 2014.
Non-Final Office Action dated Mar. 15, 2017, for U.S. Appl. No. 13/829,658, of Morgan, T.B., et al., filed Mar. 14, 2013.

(56) References Cited

OTHER PUBLICATIONS

"Card Not Present Transaction," Wikipedia, published Mar. 4, 2014, Retrieved from the Internet URL: http://en.wikipedia.org/wiki/Card_not_present_transaction, on Jun. 6, 2014, pp. 1-2.
"Payment Gateway," Wikipedia, published May 30, 2014, Retrieved from the Internet URL: http://en.wikipedia.org/wiki/Pavment gateways, on Jun. 6, 2014, pp. 1-3.
"ProPay JAK Mobile Card Reader," Propay, published Dec. 27, 2011, Retrieved from the Internet URL: https://web.archive.org/web/20111227055421/https://www.propay.com/products-services/accept-payments/jak-card-reader, pp. 1-2.
"Verified by Visa Acquirer and Merchant Implementation Guide," U.S. Region, Visa Public, May 2011, pp. 1-114.
"Uber—Android Apps on Google Play," Published on Nov. 10, 2014, Retrieved from the Internet URL: https://play.google.com/store/apps/details?id=com.ubercab&hl=en, on Nov. 12, 2014, pp. 1-2.
Punch, L., "E-commerce: Just what does card-present mean these days," dated Oct. 1, 2012, Retrieved from the Internet URL: http://digitaltransactions.net/news/ story/ E-Commerce_-Just-What-Does-Card-Present-Mean-These-Days, on Feb. 17, 2015, pp. 1-4.
Non-Final Office Action dated Dec. 1, 2014, for U.S. Appl. No. 14/062,617, of Templeton, T., et al., filed Oct. 24, 2013.
Non Final Office Action dated Dec. 15, 2014, for U.S. Appl. No. 14/312,397, of Varma, A.K, et al., filed Jun. 23, 2014.
Final Office Action dated Apr. 16, 2015, for U.S. Appl. No. 14/062,617, of Templeton, T., et al., filed Oct. 24, 2013.
Final Office Action dated Aug. 31, 2015, for U.S. Appl. No. 14/312,397, of Varma, A.K., et al., filed Jun. 23, 2014.
Non-Final Office Action dated Jan. 14, 2016, for U.S. Appl. No. 14/312,397, of Varma, A.K., et al., filed Jun. 23, 2014.
Non-Final Office Action dated Feb. 23, 2016, for U.S. Appl. No. 14/062,617, of Templeton, T., et al., filed Oct. 24, 2013.
Non-Final Office Action dated May 5, 2016, for U.S. Appl. No. 14/312,397, of Varma, A.K, et al., filed Jun. 23, 2014.
Non-Final Office Action dated Aug. 10, 2016, for U.S. Appl. No. 14/312,433, of Varma, A.K, et al., filed Jun. 23, 2014.
Final Office Action dated Sep. 1, 2016, for U.S. Appl. No. 14/062,617, of Templeton, T., et al., filed Oct. 24, 2013.
Non-Final Office Action dated Sep. 8, 2016, for U.S. Appl. No. 14/312,371, of Varma, A.K., et al., filed Jun. 23, 2014.
Examination Report No. 1 for Australian Patent Application No. 2014302661, dated Sep. 27, 2016.
Non-Final Office Action dated Nov. 17, 2016, for U.S. Appl. No. 14/701,571, of Jen, M., et al., filed May 1, 2015.
Advisory Action dated Nov. 28, 2016, for U.S. Appl. No. 14/062,617, of Templeton, T., et al., filed Oct. 24, 2013.
Final Office Action dated Nov. 28, 2016, for U.S. Appl. No. 14/312,397, of Varma, A.K., et al., filed Jun. 23, 2014.
Examiner's Requisition for Canadian Patent Application No. 2,916,603, dated Feb. 9, 2017.
Notice of Allowance dated Mar. 23, 2017, for U.S. Appl. No. 14/701,571, of Jen, M., et al., filed May 1, 2015.
Advisory Action dated Apr. 10, 2017, for U.S. Appl. No. 14/312,397, of Varma, A.K., et al., filed Jun. 23, 2014.
Non-Final Office Action dated Apr. 18, 2017, for U.S. Appl. No. 14/160,490, of Moring, D., et al., filed Jan. 21, 2014.
Final Office Action dated Apr. 19, 2017, for U.S. Appl. No. 14/312,433, of Varma, A.K., et al., filed Jun. 23, 2014.
Final Office Action dated Apr. 27, 2017, for U.S. Appl. No. 14/312,371, of Varma, A.K., et al., filed Jun. 23, 2014.
Non-Final Office Action dated Jun. 19, 2017, for U.S. Appl. No. 14/730,860, of Sasmaz, Y., et al., filed Jun. 4, 2015.
Advisory Action dated Jun. 30, 2017, for U.S. Appl. No. 14/312,433, of Varma, A.K., et al., filed Jun. 23, 2014.
Non-Final Office Action dated Jul. 10, 2017, for U.S. Appl. No. 13/830,350, of Morgan, T.B., et al., filed Mar. 14, 2013.
Advisory Action dated Jul. 11, 2017, for U.S. Appl. No. 14/312,371, of Varma, A.K., et al., filed Jun. 23, 2014.
Examination Report No. 1 for Australian Patent Application No. 2015264426, dated Jul. 11, 2017.
International Search Report and Written Opinion for International Application No. PCT/US2014/043891, dated Dec. 10, 2014.
Shalmanese, "The Straight Dope Message Board," message dated Oct. 5, 2013, Retrieved from the internet URL: http://boards.straightdope.com/sdmb/showthread.php?t=703989%BB, on Jul. 18, 2016, pp. 1-10.
Final Office Action dated May 20, 2016, for U.S. Appl. No. 14/329,658, of Aaron, P., et al., filed Jul. 11, 2014.
Non-Final Office Action dated Jun. 7, 2016, for U.S. Appl. No. 14/088,113, of Maxwell, D. W., et al., filed Nov. 22, 2013.
Non-Final Office Action dated Jun. 7, 2016, for U.S. Appl. No. 14/208,800, of Thome, J. P., et al., filed Mar. 13, 2014.
Non-Final Office Action dated Jun. 8, 2016, for U.S. Appl. No. 14/088,141, of Maxwell, D. W., et al., filed Nov. 22, 2013.
Non-Final Office Action dated Jun. 17, 2016, for U.S. Appl. No. 14/184,503, of Borovsky, A., et al., filed Feb. 19, 2014.
Final Office Action dated Jun. 17, 2016, for U.S. Appl. No. 14/149,754, of Spindel, N., et al., filed Jan. 7, 2014.
Final Office Action dated Jun. 20, 2016, for U.S. Appl. No. 13/829,658, of Morgan, T. B., et al., filed Mar. 14, 2013.
Non-Final Office Action dated Jul. 14, 2016, for U.S. Appl. No. 14/160,490, of Moring, D., et al., filed Jan. 21, 2014.
Final Office Action dated Jul. 18, 2016, for U.S. Appl. No. 14/189,869, of Lamba, K., et al., filed Feb. 25, 2014.
Non Final Office Action dated Apr. 20, 2012 for U.S. Appl. No. 12/903,828, of Dorsey, J., filed Oct. 13, 2010.
Final Office Action dated Aug. 30, 2012 for U.S. Appl. No. 12/903,828, of Dorsey, J., filed Oct. 13, 2010.
Non Final Office Action dated May 28, 2014 for U.S. Appl. No. 12/903,828, of Dorsey, J., filed Oct. 13, 2010.
Final Office Action dated Nov. 24, 2014 for U.S. Appl. No. 12/903,828, of Dorsey, J., filed Oct. 13, 2010.
Non Final Office Action dated Dec. 20, 2017, for U.S. Appl. No. 14/615,257 of Dorsey, J., filed Feb. 5, 2015.
Final Office Action dated Jun. 6, 2018, for U.S. Appl. No. 14/615,257, of Dorsey, J., filed Feb. 5, 2015.
Non-Final Office Action dated Aug. 10, 2018, for U.S. Appl. No. 15/070,353, of Tsou, V., et al., filed Mar. 15, 2016.
Non-Final Office Action dated Oct. 4, 2018, for U.S. Appl. No. 15/070,675, of Tsou, V., et al., filed Mar. 15, 2016.
International Search Report and Written Opinion for International Application No. PCT/US2010/052499, dated May 26, 2011.
International Search Report and Written Opinion for International Application No. PCT/US2017/018056, dated Apr. 12, 2017.
"2.5mm Headset Jack," Retrieved from the Internet URL: http://www.phonescoop.com/glossary/term.php?gid=360, on May 5, 2011, pp. 1-1.
"A Magnetic Stripe Reader—Read Credit Cards & Driver Licences!," Articlesbase (articlesbase.com), Sep. 7, 2009, Retrieved from the Internet URL: http://www.articlesbase.com/electronics-articles/a-magnetic-stripe-reader-read-credit-cards- . . . , on Feb. 8, 2011, pp. 1-3.
Acidus, "Mag-stripe Interfacing—A Lost Art," Retrieved from the Internet URL: http://www.scribd.com/doc/18236182/Magstripe-Interfacing#open_ . . . , on Feb. 7, 2011, pp. 1-4.
"Announcement: Semtek Introduces Side Swipe II Card Reader for Wireless Devices," Brighthand, Retrieved from the Internet URL: http://forum.brighthand.com/pdas-handhelds/173285-announcement-semtek-introduces-sid . . . , on Apr. 19, 2011, pp. 1-2.
"Arduino magnetic stripe decoder," Instructables, Retrieved from the Internet URL: http://www.instructables.com/id/Arduino-magneticstripe-decorder/, on Feb. 8, 2011, pp. 1-5.
"Barcode scanner and Magnetic Stripe Reader (MSR) for Pocke . . . ," Tom's Hardware (tomshardware.com), Retrieved from the Internet URL: http://www.tomshardware.com/forum/24068-36-barcode-scanner-magnetic-stripe-reader-po . . . , on Feb. 8, 2011, pp. 1-2.
Buttell, A.E., "Merchants eye mobile phones to transact card payments," Feb. 3, 2010, Retrieved from the Internet URL: http://www.merchantaccountguide.com/merchant-account-news/cell-phone-credit-card-mer . . . , on Feb. 8, 2011, pp. 1-3.

(56) References Cited

OTHER PUBLICATIONS

"Credit Card Swiper and Reader for iPhone, iPad, Blackberry, Android and more," Retrieved from the Internet URL: http://hubpages.com/hub/Credit-Card-Swiper-and-Reader-for-iPhone-iPad-Blackberry-An . . . , on Apr. 20, 2011, pp. 1-2.
"Get paid on the spot from your mobile phone," Retrieved from the Internet URL: http://payments.intuit.com/products/basic-payment-solutions/mobile-credit-card-processin . . . , on Feb. 11, 2011, pp. 1-3.
Grandison, K., "vTerminal Credit Card Processing App for AuthorizeNet and PayPal Payflow Pro for Curve 8350 8500 8900 and Bold 9000," Retrieved from the Internet URL: http://www.4blackberry.net/tag/business-tools/vterminal-credit-card-processing-app-for-authorizenet-and-paypal-payflow-pro-for-curve-8350-8500-890-download-2075.html, on Mar. 30, 2015, pp. 1-4.
Harris, A., "Magnetic Stripe Card Spoofer," Aug. 4, 2008, Retrieved from the Internet URL: http://hackaday.com/2008/08/04/magnetic-stripe-card-spoofer/, on Apr. 25, 2011, pp. 1-11.
"Headphone Jack (3.5mm)," Retrieved from the Internet URL: http://www.phonescoop.com/glossary/term.php?gid=440, on May 5, 2011, pp. 1-1.
Jones, R., "U.S. Credit Cards to get a high-tech makeover," Oct. 22, 2010, Retrieved from the Internet URL: http://lifeine.today.com/_news/2010/10/22/5334208-us-credit-cards-to-get-a-high-tech-mak . . . , on Feb. 8, 2011, pp. 1-8.
Kuo, Y-S., et al., "Hijacking Power and Bandwidth from the Mobile Phone's Audio Interface," Proceedings of the First ACM Symposium on Computing for Development, (DEV' 10), Dec. 17, 2010, pp. 1-10.
"Magnetic Card Reader," lekernel.net~scrapbook, Retrieved from the Internet URL: http://lekernel.net/scrapbook/old/cardreader.html, on Apr. 25, 2011, pp. 1-4.
"Magnetic Stripe Reader (MSR) MSR7000-100R," Motorola Solutions, Retrieved from the Internet URL: http://www.motorola.com/business/US-EN/MSR7000-100R_US-EN.do?vgnextoid=164fc3 . . . , on Feb. 8, 2011, pp. 1-1.
"Magnetic stripe reader/writer," Retrieved from the Internet URL: http://www.gae.ucm.es/-padilla/extrawork/stripe.html, on Dec. 21, 2009, pp. 1-2.
"Mag-stripe readers The hunt for a homebrew mag-stripe reader that'll work with modern," Jan. 16, 2009, Retrieved from the Internet URL: http://www.hak5.org/forums/index.php?showtopic=11563&st=20, on Apr. 25, 2011, pp. 1-6.
"Mophie Marketplace Magnetic Strip Reader/Case for iPhone 3G & 3GS—Grey," J&R (JR.com), Retrieved from the Internet URL: http://www.jr.com/mophie/pe/MPE_MPIP3GBLK/, on Feb. 8, 2011, pp. 1-1.
"MSR500EX (Mini123EX) Portable Magnetic Stripe Card Reader," Tyner, Apr. 27, 2007, Retrieved from the Internet URL: http://www.tyner.com/magnetic/msr500ex.htm, on Apr. 22, 2011, pp. 1-3.
Padilla, L., "Magnetic stripe reader circuit," Jan. 28, 1997, Retrieved from the Internet URL: http://www.gae.ucm.es/~padilla/extraworkImagamp.html, on May 5, 2011, pp. 1-7.
Padilla, L., "The simplest magnetic stripe reader," Jan. 27, 2003, Retrieved from the Internet URL: www.gae.ucm.esi~padilla/extrawork/soundtrack.html, on Dec. 21, 2009, pp. 1-5.
Padilla, L., "Turning your mobile into a magnetic stripe reader," Retrieved from the Internet URL: http://www.gae.ucm.es/~padilla/extrawork/mobilesoundtrack.html, on Feb. 7, 2011, pp. 1-4.
"Pay@PC," Retrieved from the Internet URL: http://www.merchantanywhere.com/PAY_AT_PCT@PC.htm, on Feb. 11, 2011, pp. 1-2.
"Reading magnetic cards (almost) for free," Lekernel's Scrapbook, ("Lekernel"), Jan. 26, 2009, Retrieved from the Internet URL: http://lekernel.net/blog/?p=12, on May 5, 2011, pp. 1-2.
"Reference Designations for Electrical and Electronics Parts and Equipment, Engineering Drawing and Related Documentation Practices," ASME Y14.44-2008, The American Society of Mechanical Engineers, Nov. 21, 2008, pp. 1-31.
"Semtek 3913 Insert Magnetic Card Reader 20 Pin Serial RS232," Product description, RecycledGoods.com, Retrieved from the Internet URL: http://www.recycledgoods.com/products/Semtek-3913-Insert-Magnetic-Card-Reader-20-Pi . . . , on Apr. 19, 2011, pp. 1-3.
"Semtek to target healthcare with HandEra PDAs and PDA swipe card reader," Aug. 29, 2001, Retrieved from the Internet URL: http://www.pdacortex.com/semtek.htm, on Apr. 19, 2011, pp. 1-2.
Titlow, J.P., "ROAM pay is like Square for Blackberry (Plus Android, iOS and Desktops)," Dec. 1, 2010, Retrieved from the Internet URL: http://www.readwriteweb.com/biz/2010/12/roampay-is-like-square-for-bla.php, on Apr. 20, 2011, pp. 1-12.
"Touch-Pay Wireless Credit Card Processing," MerchantSeek, Retrieved from the Internet URL: http://www.merchantseek.com/wireless-credit-card-processing.htm, on Feb. 11, 2011, pp. 1-5.
"Travel industry targeted for Palm PDA card reader," Retrieved from the Internet URL: http://www.m-travel.com/news/2001/08/travel_industry.html, on Apr. 19, 2011, pp. 1-2.
"USB Magnetic Stripe Credit/Card Track-2 Reader and Writer (75/210BPI)," Deal Extreme (dealextreme.com), Nov. 15, 2008, Retrieved from the Internet URL: http://www.dealextreme.com/p/usb-magnetic-stripe-credit-debit-card-track-2-reader-and-wr . . . , on Feb. 8, 2011, pp. 1-3.
Veneziani, V., "Use a cellphone as a magnetic card reader," Apr. 15, 2005, Retrieved from the Internet URL: http://hackaday.com/2005/04/15/use a-cellphone-as-a-magnetic-card . . . , on Feb. 7, 2011, pp. 1-10.
Website: www.alexwinston.com, Aug. 31, 2009, pp. 1-5.
Final Office Action dated Jan. 17, 2019, for U.S. Appl. No. 15/070,353, of Tsou, V., et al., filed Mar. 15, 2016.
Non Final Office Action dated Mar. 6, 2019, for U.S. Appl. No. 14/615,257 of Dorsey, J., filed Feb. 5, 2015.
Advisory Action dated Mar. 27, 2019, for U.S. Appl. No. 15/070,353, of Tsou, V. et al., filed Mar. 15, 2016.
Notice of Allowance dated Apr. 17, 2019, for U.S. Appl. No. 15/070,675, of Tsou, V., et al., filed Mar. 15, 2016.
Non-Final Office Action dated Jul. 12, 2019, for U.S. Appl. No. 15/070,353, of Tsou, V., et al., filed Mar. 15, 2016.
Examiner Requisition for Canadian Patent Application No. 3,016,616, dated Jul. 19, 2019.
Examination Report, for European Patent Application No. 17709230.1, dated Aug. 9, 2019.

* cited by examiner

GRATUITY DASHBOARD — 300

☐ This Week

| User ⌄ | Merchant ⌄ | Items Purchased ⌄ | Tip Amount ⌄ |
|---|---|---|---|
| John | Beanshop | Latte | $3.00 |
| Mike | Corner Cafe | Latte | $4.00 |
| John | Beanshop | Latte | $3.00 |
| John | Beanscenery | Latte | $2.50 |
| Aaron | Beanshop | Latte | $3.50 |
| Mike | Corner Cafe | Muffin | $5.00 |
| John | Beanshop | Muffin | $1.00 |
| John | Beanshop | Sandwich | $0.00 |

302 — 🔍
304 — (Tip Amount column)

GRATUITY DASHBOARD — 400

TRANSACTION A, TIP AMOUNT $10-15

| LOCATION | CUSTOMER | MERCHANT | CARD INFO. | ITEM TYPE |
|---|---|---|---|---|
| LOCATION A / Template 1 | CUSTOMER A / Template 1 | MERCHANT A / Template 1 | CARD INFO. A / Template 1 | ITEM TYPE A / Template 1 |
| LOCATION B / Template 2 | CUSTOMER B / Template 2 | MERCHANT B / Template 1 | CARD INFO. B / Template 1 | ITEM TYPE B / Template 1 |
| ... | ... | ... | ... | ... |
| LOCATION N / Template N | CUSTOMER N / Template 2 | MERCHANT N / Template 1 | CARD INFO. N / Template 1 | ITEM TYPE N / Template 1 |

GRATUITY Template 1
GRATUITY Template 2
...
GRATUITY Template N

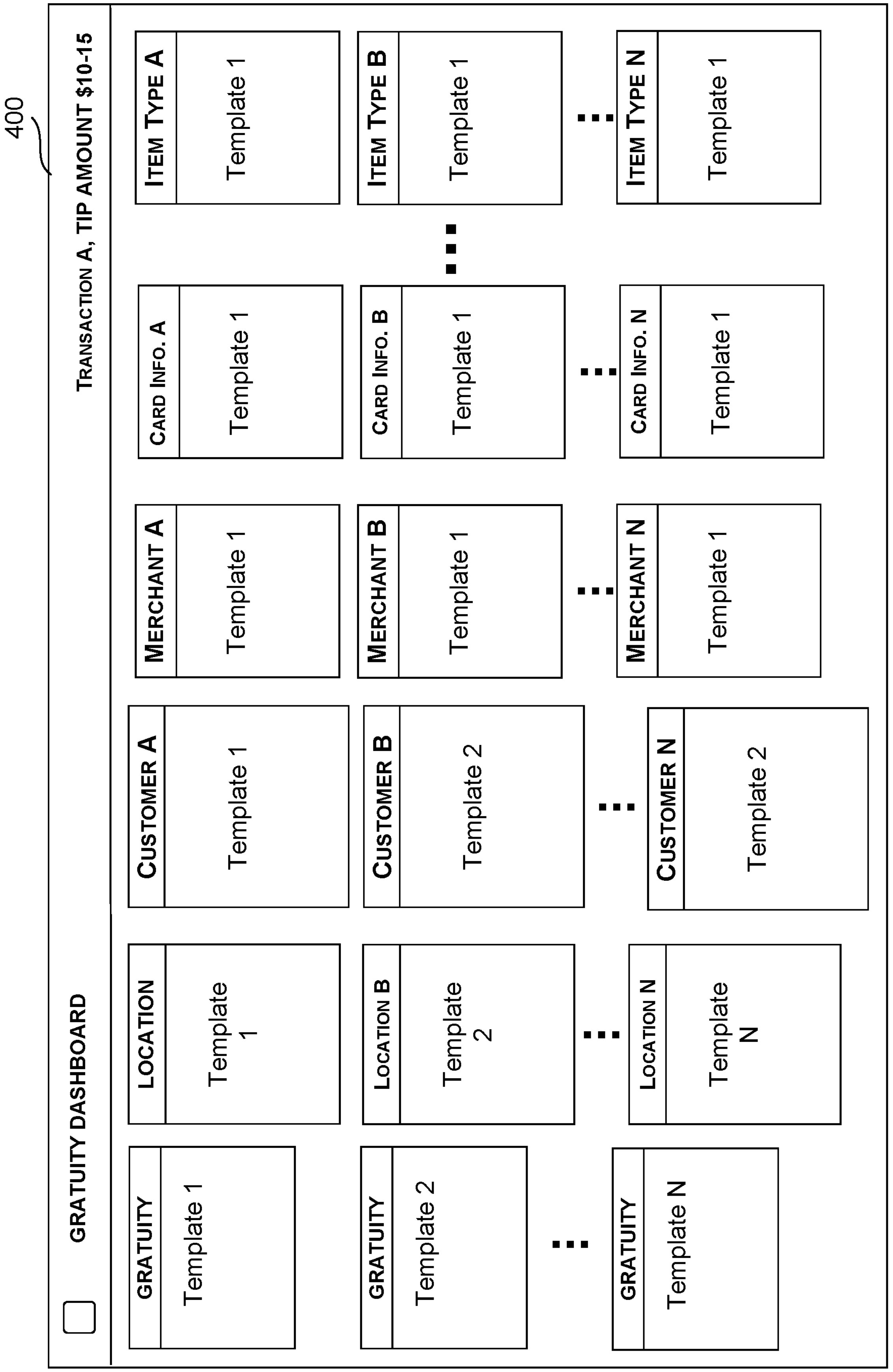

*FIG. 4*

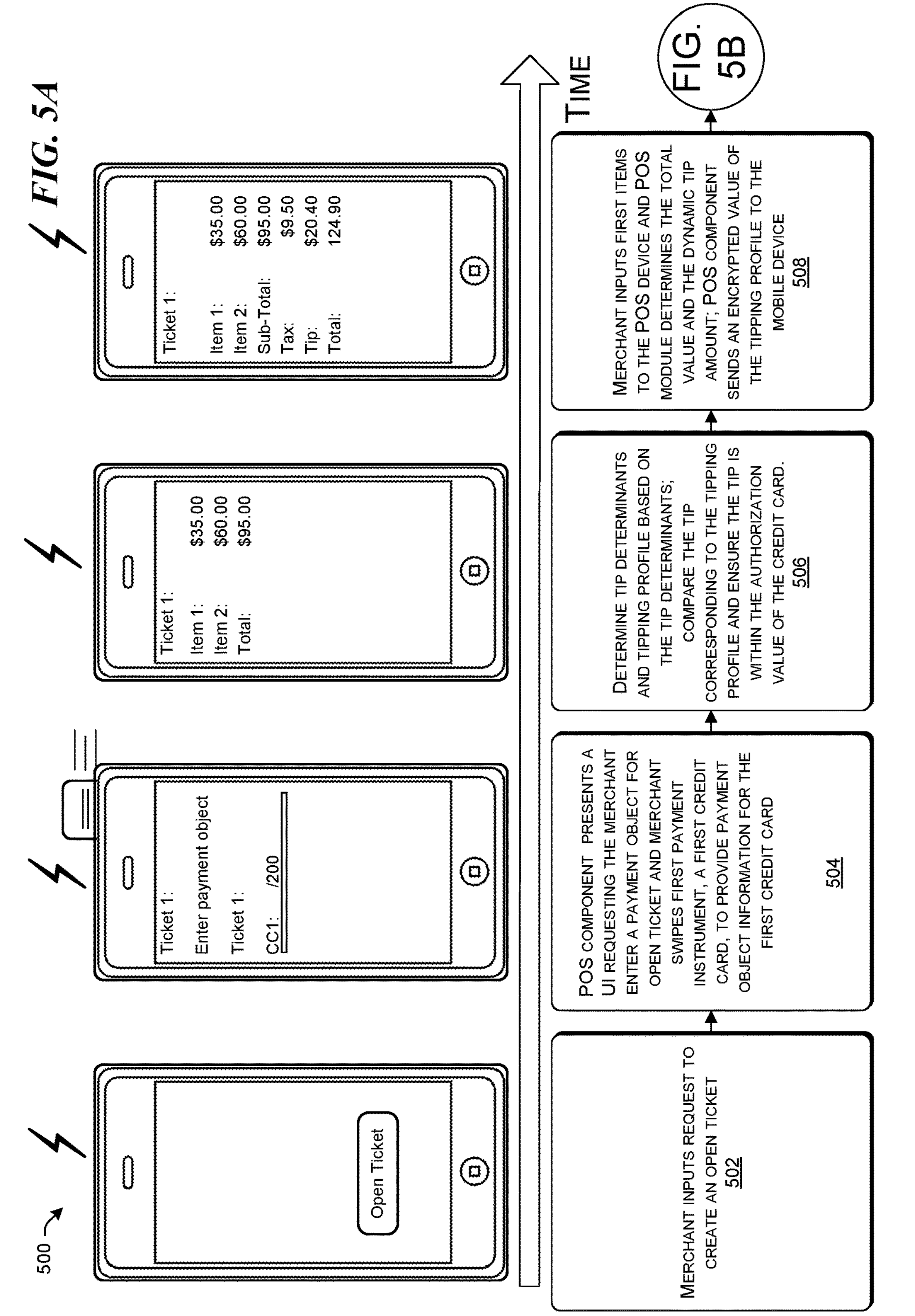

TIME ↑

MERCHANT INPUTS FIRST ITEMS TO THE POS DEVICE AND POS MODULE DETERMINES THE TOTAL VALUE AND THE DYNAMIC TIP AMOUNT; POS COMPONENT SENDS AN ENCRYPTED VALUE OF THE TIPPING PROFILE TO THE MOBILE DEVICE
508

DETERMINE TIP DETERMINANTS AND TIPPING PROFILE BASED ON THE TIP DETERMINANTS; COMPARE THE TIP CORRESPONDING TO THE TIPPING PROFILE AND ENSURE THE TIP IS WITHIN THE AUTHORIZATION VALUE OF THE CREDIT CARD.
506

POS COMPONENT PRESENTS A UI REQUESTING THE MERCHANT ENTER A PAYMENT OBJECT FOR OPEN TICKET AND MERCHANT SWIPES FIRST PAYMENT INSTRUMENT, A FIRST CREDIT CARD, TO PROVIDE PAYMENT OBJECT INFORMATION FOR THE FIRST CREDIT CARD
504

MERCHANT INPUTS REQUEST TO CREATE AN OPEN TICKET
502

INTERACTIVE GRATUITY PLATFORM

TECHNICAL FIELD

Customers are generally provided with paper receipts of the transaction at the point-of-sale (POS) terminal as proof of purchase of goods/services. The receipt generally includes an itemization of the product or service and a total net cost of all the products and/or services. The paper receipt serves as a proof of the purchase for the customer. Some merchants have started to provide their customers with receipts electronically to maintain record of the financial transactions. For example, some merchants may provide a receipt through delivery of an electronic mail (i.e., e-mail).

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features. Moreover, multiple instances of the same part are designated by a common prefix separated from the instance number by a dash. The drawings are not to scale.

FIG. 4 illustrates a screenshot of a gratuity dashboard for managing merchant engagements with customers, according to an embodiment of the present subject matter.

FIGS. 5A and 5B are sequence diagrams illustrating the operations of tip generation in an offline, open-ticket scenario, according to an embodiment of the present subject matter.

DETAILED DESCRIPTION

Figure 1A:
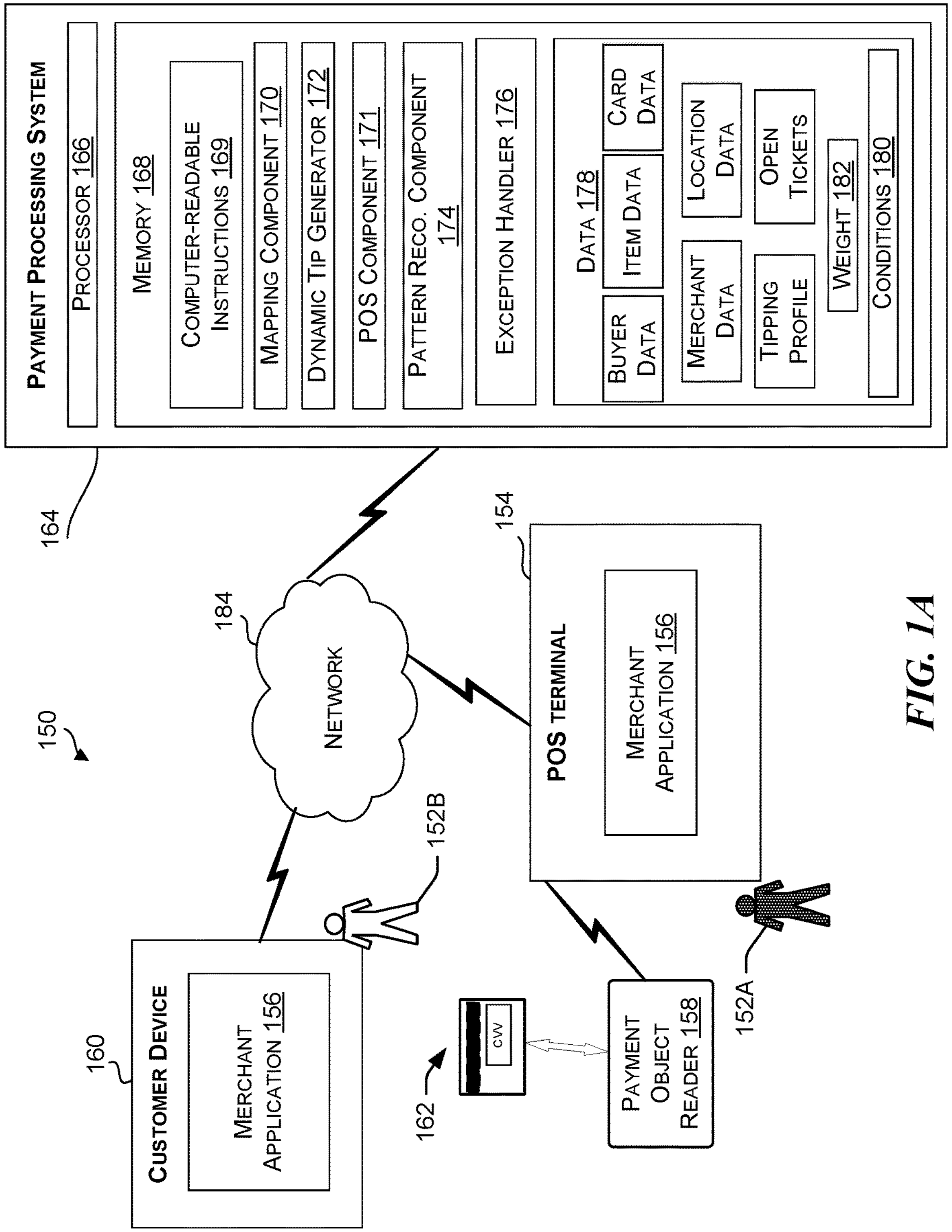
FIG. 1A is an example architecture of payment processing system for enabling point-of-sale (POS) transactions between merchants and customers and generating receipts in response to the POS transaction with the option of adaptive tipping, according to an embodiment of the present subject matter.

Introduced herein is a technique to provide an interactive digital receipt implemented on a customer device, where the receipt offers an interactive platform for merchants and customers to interact on a continuous basis. More specifically, the interactive digital receipt includes an interactive component that generates adaptive tip amounts corresponding to a merchant behavior, customer behavior, or the nature of items in a shopping cart. The interactive digital receipt can be embodied in a text message, an electronic mail (e-mail), or a mobile software application. The interactive digital receipt is generated in response to an occurrence of a particular financial transaction between a merchant and a customer, such as a payment transaction conducted at a completion of service and/or goods provided by the merchant. The financial transaction may be an electronic transaction conducted over the Internet or a card present point-of-sale (POS) transaction where the customer/buyer/payer makes the purchase at a store front, other "brick-and-mortar" location, or simply in the presence of a merchant/payee.

Once the financial transaction takes place (i.e., the payer tenders payment to the payee), the interactive digital receipt is generated to provide the customer with an electronic record of the transaction. In addition to providing the transaction record, the interactive digital receipt provides one or more tools for customer engagement, or interactive components, to enable the merchant and the customer to engage, or interact, with one another. Such interactive components may be time-based thus allowing the engagements, or the interactions, to take place only until the expiration of the time period.

In some instances, the disclosed technique provides an engagement component that includes a gratuity payment feature to allow the merchant to generate an adaptive gratuity amount (i.e., "tip") on top of a payment amount for a purchase from a particular merchant. The gratuity payment feature allows the customer to tip the merchant after the time of the actual transaction. The gratuity payment feature can be provided before or after displaying the payment amount. While displaying before removes bias in tipping, displaying after allows the customer to have more control on their tipping behavior. In some implementations, the gratuity payment feature also allows the customer to add or modify the adaptive gratuity amount generated by the engagement component.

The merchant may set the time limit at which the interactive receipt (for the purchase) is open for receiving the gratuity amount from the customer. The customer may set a nominal gratuity amount to operate as a default amount to be paid to the merchant if no gratuity is added after a predefined time limit. For example, such nominal gratuity amount may be set for a particular favorite merchant of the customer; that is, the customer desires to always tip a nominal amount even he/she forgets to add such amount after a transaction. The gratuity payment feature is beneficial, for example, when the customer has forgotten to tip and desires to tip after he/she has already made the payment and left the merchant's store. The nominal gratuity amount may also be set by the merchant. This is beneficial in scenarios involving special services and/or goods. For example, a restaurant merchant sets a default 25% tip for any transaction involving 10 or more parties dining at the restaurant, or to adjust the tip on the nature of items in the cart by charging higher tips on non-perishable goods and no tips on others.

In some instances, the disclosed technique provides an engagement component that includes a feedback feature to allow the customer to set a condition or rule for subsequent transaction. The condition can be mapped to the gratuity amount thus automatically adjusting the gratuity amount when the condition is met. For example, the customer may set the condition such as modify the gratuity amount to be adapted based solely on the cart value and not on any other factors. Such condition may then be applied to transactions. The feedback feature also allows the customer to leave a review (e.g., a write-up, a rating, etc.) for a particular merchant after a transaction is completed. The feedback feature is offered to the customer within a predefined time period. The merchant may configure the predefined time period. For example, the time period can be an hour, a day, or a week after a payment transaction (e.g., a restaurant visit) has completed. The merchant may configure the predefined time period to be tied to an incentive. For example, the customer is rewarded a 20% Off Coupon via the interactive receipt for submitting a condition within an hour of the transaction completion time. Such time-based feedback feature is beneficial, for example, when the merchant wants to improve the dataset that generates adaptive gratuity amounts and configure the tip amounts more increase visibility of the merchant venue (i.e., through reviews), to incentivize the customer to act more quickly in submitting the feedback, and/or to manage the collection of feedback more effectively and in a timely manner (e.g., allowing a review six days after the service is likely ineffective).

In some instances, the disclosed technique provides a particular customer an interactive transaction record containing all interactive digital receipts of transactions between the particular customer and one or more merchants. The transaction record also includes interactive digital receipts corresponding to all transactions with a mapping of tip with item on a particular receipt, in case the tip varies on a per-item basis. The interactive transaction record organizes the interactive digital receipts based on time, location, and merchant. The interactive transaction record is updated along with each new interactive digital receipt that gets generated and or updated. Further, the interactive transaction record allows the customer to access each interactive digital receipt. This can be beneficial when the customer wants to revisit a record for a particular transaction. For example, if a customer wants to review and add a gratuity amount to a payment transaction completed recently, he or she can access the interactive transaction record to search for the particular transaction and add on a tip to the payment authorization for that transaction.

In some instances, the disclosed technique provides a customer interface for a particular merchant to configure various engagements that may be offered via the interactive digital receipts on the customer devices of one or more customers. In some instances, the interface allows the merchant to create one or more customized templates for the interactive digital receipts of particular customers. As such, the disclosed technique allows the merchant to dynamically change what is being offered, or displayed, on the customer device of the frequent customer.

The systems and methods described herein disclose various methods and systems that give the merchants and customers more control and granularity in selecting tips. Traditionally, the gratuity amounts are fixed based on the payment amount and are generally a percentage of the payment amount. Imagine performing transactions in businesses that especially require the customer to react quickly. For example, at a coffee shop during peak hours or in a cab. In such scenarios, it has been shown that giving customers quick tip options to pick from is more efficient than letting them key-in a gratuity amount. For example, the merchants are known to keep the tip amounts at fixed percentages of 10, 15, 20, 25, and so on. While fixed percentages work for some products or services, a more granular tip amount selection is desired. For example, in many of the city's cabs, riders are offered options for their tip depending on the length of the ride. For fares under $15, a screen prompts tips of $2, $3 or $4; the numbers can range from 15 percent to 30 percent for higher fares. The presets are used about 70 percent of the time, according to industry estimates.

This analysis is particularly true with the rise of use of credit cards, which has become a convenient payment method not just for longer trips, such as the area's airports, but also for shorter, cheaper rides, the type of $5 rainy-day indulgences that were once handled exclusively with cash. At the end of 2008, about one-fifth of cab rides were being paid for with a card. That portion has grown steadily in 2009-10, reaching 28 percent. Meanwhile, black-car business has fallen about 30 percent, as companies encourage employees to use corporate credit cards to expense cheaper yellow-cab rides.

Thus, while the credit card use is increasing, the gratuity amounts have mostly stayed static or preset. Research shows that the average tip generally comes out to just over 18 percent. The preset tip amounts are used more than half the time, resulting in a $5.30 ride getting a tip of $2, or about 38 percent. Due to such set-ups, the customer either pays no tips at all or overly excessive tips.

To this end, as disclosed herein, the interactive gratuity payment feature is generated based on the analysis of the seller and customer behavior over a period of time and generates gratuity amounts that are more in accordance with their behaviors instead of static values. As a result, the customer is more likely to select tips instead of leaving no-tips. From the customer's perspective, the customer selects tips that work with their budget and preferences making it easier to tip even during rush hours. The systems and methods described herein can offer new and efficient channels to generate revenue from tip amounts and circulate to other aspects of business, thus effectively creating another avenue for revenue generation. The tip can be used to further strengthen the specific merchant-customer relationship, for example, higher tips may lead to coupons and rewards or better service in subsequent interaction with the high-tipping customer. The tipping feature can be either interactive or static. Further, the tipping feature allows granularity and flexibility in tipping. In some implementations, the tipping is based on the category of item, location of the merchant's store, and card-linked purchases or tipping history. The tipping score or profile can also be an aggregate of multiple behaviors collected over time and combined on the basis of a weighting scale or randomly.

The interactive receipt as disclosed herein can be designed to interact with the customer, for example, by allowing the customer to follow hyperlinks, embedded webpages, enter information in fields for further processing, share on social networks or other communication networks. The systems and methods set the default options on a per-transaction basis, based on a number of inputs. For example, if the PPS recognizes the payment instrument (in most markets the swipe, dip, or tap happens before the tip is selected), the PPS can detect the buyer's overall tipping behavior—whether they are a high or low tipper. Do they usually tip the middle option? When if ever do they select a custom tip? The PPS also includes a history for the seller. Many sellers "set and forget" their tip options, but PPS can look at how their tip options are performing, and compare that to other sellers, perhaps in similar businesses, geographies, etc. Also, PPS evaluates the items in the cart—that is, what items are part of this purchase. Tipping behavior can vary based not just on the buyer and seller, but also on what is being purchased.

The present subject matter can operate in both real-time and offline modes. Embodiments of the present subject matter are configured to operate regardless of the kind of mobile device, web applications, mobile applications, POS topologies, payment cards, computer networks, and environments. Embodiments of the present subject matter may find various applications in, e.g., coin and non-coin based point of sale (POS) systems where receipts are generally provided to itemize purchases. Furthermore, transactions on such POS systems may be either direct or remote.

Various embodiments and implementations of the disclosed payment technology are now described. The following description provides specific details for a thorough understanding and an enabling description of these implementations. One skilled in the art will understand, however, that the disclosed system and methods may be practiced without many of these details. Additionally, some well-known structures or functions may not be shown or described in detail, so as to avoid unnecessarily obscuring the relevant description of the various implementations. The terminology used in the description presented below is intended to be interpreted in its broadest reasonable manner, even though it is being used in conjunction with a detailed description of certain specific implementations of the disclosed system and methods. Some frequently used terms are now described.

As used herein, a merchant may include any business engaged in the offering of goods or services for acquisition by buyers. Actions attributed to a merchant may include actions performed by owners, employees, or other agents of the merchant and thus no distinction is made herein unless specifically discussed. In addition, as used herein, a customer or buyer may include any entity that acquires goods or services from a merchant, such as by purchasing, renting, leasing, borrowing, licensing, or the like. Hereinafter, goods and/or services offered by merchants may be referred to as items. Thus, a merchant and a buyer may interact with each other to conduct a transaction in which the buyer acquires an item from a merchant, and in return, the buyer provides payment to the merchant, for example through a payment object.

As used herein, a 'payment transaction' or simply 'transaction' may include a financial transaction for the acquisition of goods and/or services that is conducted between a buyer and a merchant. For example, when paying for a transaction, the buyer can provide the amount that is due to the merchant using a payment object or even a payment proxy. In other cases, the payment transaction includes transfer of money from one party to another for any number of reasons. Thus, while the description refers to as buyer and merchant as parties to the payment transaction, it will be understood that the parties can be a sender and a recipient, a land lord and a renter, a bank and a bank customer, a first friend and a second friend, and so on.

The term 'payment card' or 'payment object' refers to a payment mechanism that includes a conventional debit card, a conventional credit card, a prepaid gift card, or the like, a smartcard that has an embedded integrate circuit chip (e.g., Europay-MasterCard-visa (EMV) card), a proxy card, or any card that functions as a combination of any of these mechanisms. The term 'proxy card' as used herein refers to a card that may or may not bear a card number or an account number that appears to be that of a real credit or debit card account (i.e., it is in the correct format), but where that card/account number is actually only a proxy for the buyer's real card/account number. Additionally, the payment card used in the example above is a specific type of a financial instrument. Other types of financial instruments, other than the payment card, can be used to initiate the transfer of funds. A financial instrument can be a software instrument or virtual instrument, such as a virtual wallet. Other examples of payment card may also include a prepaid card, a gift card, a rewards card, a loyalty points' card, a frequent flyer miles card, a check, cash, or any other kind of payment object that holds financial value or provides a promise to pay at a later time. Payment card may also include a payment object, such as an electronic device configured to initiate contactless payment transactions, e.g., a key fob, a mobile device (such as a mobile device having an NFC tag). And finally, the payment object can also be a payment proxy having a syntax of a monetary indicator followed by a string of alphanumeric characters or in general, any identifier that is representative of the buyer or merchant's financial account. The payment proxy can be used in the context of and within a webpage as part of the web address, a social networking handle or customer name, a forum, a messaging application, and so on. The payment proxy can also be a biometric payment object.

The term 'biometric payment object' is a type of payment object or financial instrument that is biometrically identifiable and initialized by a biometric characteristic, such as a person's finger (e.g., for fingerprint recognition), face, iris or retina, heartbeat, voice, etc.

The term "landing page," as used here, refers to a virtual location identified by a personalized location address that is dedicated to collect payments on behalf of a recipient associated with the personalized location address. The personalized location address can include the payment proxy discussed above. In some embodiments, the landing page is identified by a uniform resource locator (URL) that includes a payment proxy, where the URL is accessible through a web browser application installed on a client device of the sender. For example, the URL is www . . . .com/$charityName. In another example, the URL is www . . . .com/$aaron. In some embodiments, the landing page is identified by a graphical customer interface (GUI) of a mobile payment application installed on a client device of the sender. For example, the GUI of the mobile payment application is dedicated to $charityName, where there can be multiple GUIs each dedicated to a different payment proxy.

The landing page is generated by the payment processing system to receive, e.g., collect, one or more payments on behalf of the recipient from one or more senders. The sender can access the landing page, e.g., by entering a URL into a web browsing application installed on the sender's client device. Upon navigating to the URL, the sender can simply enter a payment amount, e.g., in a web form field, and send the money, e.g., by selecting a "Pay" action button displayed on the website. In another example, the sender can access the landing page, e.g., by selecting a GUI within a mobile payment processing system application, where the GUI, e.g., is labeled with the payment proxy $aaron. The sender can further enter a payment amount at the GUI and send the money, e.g., by selecting a "Pay" action button displayed on the GUI.

The term "forum," as used here, refers to a media channel (e.g., a social networking website, a microblog, a blog, etc.) that enables customer interaction and engagement through comments, posts, and/or messages. The forum can be employed by a service provider to provide various services to customers of the forum, e.g., create messages, post comments, interact with one another, etc. Within a forum context, a customer can indicate an intent to transfer money by specifying a payment proxy in a message that the customer submits, e.g., "posts," on a particular forum, where that payment proxy carries the syntax of the monetary indicator preceding one or more alphanumeric characters. For example, the customer posts a message "I support $funnyguy311 with $10." In such an example, the payment processing system detects the customer's intent to send money, e.g., $10, to "$funnyguy311" and initiates the transfer of money upon identification of a recipient financial account associated with "$funnyguy311." The monetary indicator can correspond to various currencies, e.g., dollar ($), euro (€), pound (£), yuan (¥), etc. Although use of the dollar monetary indicator ($) is used herein, it is to be understood that any currency symbol could equally be used.

The term "merchant application," "registration application" or "mobile payment portal" as used here, refers to any messaging application that enables communication between customers (e.g., sender and recipient of a message) over a wired or wireless communications network. A service provider that delivers a communication service to customers, e.g., chat capability, can employ the messaging application. The messaging application can include, for example, a text messaging application for communication between phones (e.g., conventional mobile telephones or smartphones), or a cross-platform instant messaging application for smartphones and phones that use the Internet for communication. Within a messaging application context, a customer can indicate an intent to transfer money by specifying a payment proxy in a TO field of, e.g., a message, that the customer inputs within the messaging application. For example, the customer enters into the TO field "$redcross." In another example, the customer enters into the TO field "$aaron." Once the customer enters a payment proxy, or input, into the TO field, the customer can enter a message in a body of the message, e.g., "Here is $10," and send the message. In various embodiments, the message can be a text message, a chat message, an email message, or indeed any other type of message that is capable of being exchanged between computing devices. Although this specification may employ text messages as an example, it is to be understood that the payment proxy technology may employ any of these types of messages. Upon receiving an indication to send (e.g., after detecting that the customer has clicked "Send"), the messaging application transmits a message, e.g., the text message to a messaging application computer system ("messaging application system"). The messaging application system detects that the input in the TO field of the message it has received includes a syntax of a monetary indicator preceding one or more alphanumeric characters. In response, the messaging application system forwards the text message to the payment processing system for processing. The payment processing system identifies a recipient associated with the input (or payment proxy) that is derived from the TO field, and further identifies a recipient financial account associated with that recipient. Upon identification of the recipient financial account, the payment processing system initiates the transfer of money.

With a number of cardholder payment options (e.g., magnetic stripe, contact chip and contactless chip) and methods in development (e.g., mobile and cloud-based), the card issuing institutions bake various kinds of information in the payment object. This information includes a card number, an expiry date, a point-of-sale entry code, and a service code. A card number is a sequence of digits that identifies a bank that issued the credit card and an account number that is specific to the cardholder. In some circumstances, a card number is also referred to as a "primary account number" (PAN). An expiry date of a credit card indicates a date when the credit card expires. A service code of a credit card indicates how the cardholder is permitted to use the credit card, and also whether the card includes a magnetic stripe or an integrated circuit with dynamic card information embedded therein. The point-of-sale entry code indicates how the card is introduced in a card reader, that is whether it is swiped or dipped.

It is noted that the payment technology is equally applicable in other embodiments to various other content providers and various other types of providers, such as financial service providers or to any application that involves communication of messages between customers, and that the payment technology is not limited to a specific application, device or industry.

The preceding summary is provided for the purposes of summarizing some exemplary embodiments to provide a basic understanding of aspects of the subject matter described herein. Accordingly, the above-described features are merely examples and should not be construed as limiting in any way. Other features, aspects, and advantages of the subject matter described herein will become apparent from the following description of Figures and Claims.

Turning now to the Figures, FIG. 1A is an example architecture of interactive receipt generation 150 for enabling point-of-sale (POS) transactions between merchants 152A and customers 152B and providing a tipping option that is granular and adaptive to the customer performing the transaction. In the example of FIG. 1A, the interactive receipt generation system 150 includes a POS terminal 154 (associated with a merchant 152A) executing an instance of a merchant application 156 and a plurality of payment object readers, such as a magstripe object reader 108 and an EMV object reader 158 connected to the POS terminal 154. The system 150 further includes a payment processing system 164 ("PPS 164"), and one or more bank computing device(s), an issuer of the payment object, and an object payment network computing device(s) (not shown); all of which are connected via a communications network(s) 184, according to an embodiment of the present subject matter.

The environment 150 includes the PPS 164, a customer 152B associated with a customer device 160, a POS terminal 154 associated with a payment object reader 158 being operated by a merchant 152A, in which the customer 152B introduces a payment object 162 to pay for a product or service ("item") offered by the merchant 152A.

As illustrated in FIG. 1A, the payment processing system (PPS 164 is operatively coupled, via a network 184, to the customer device 160 and the POS terminal 154. In this way, the payment processing system 164 can send and receive information, to and from the POS terminal 154 and the customer device 160, to facilitate generating an interactive digital receipt for one or more financial transactions between the merchant and the customer. It is noted that FIG. 1A illustrates only one example of an embodiment of the environment 120, and it will be appreciated that in other embodiments, the environment may include more or fewer components and that the components may have a different configuration. Further, the various components shown in FIG. 1A may be implemented by using hardware, software, firmware or a combination thereof, including one or more signal processing and/or application specific integrated circuits.

The customer 152B can use any of a variety of payment objects 162, such as credit cards, debit cards, etc., when participating in POS transaction with a merchant 152A. In some embodiments, payment objects 162 can include one or more magnetic stripes with customer financial information stored thereon. The data can be read when the magnetic stripes are swiped in a payment object reader 158 communicatively coupled to POS terminal 154. In some embodiments, other types of payment objects 162 can be used, for example smart cards having a built in integrated circuit including a memory chip (e.g. EMV payment objects), a radio frequency identification tag (e.g. near field communication enabled objects), and the like. For this, the payment object reader 158 obtains data off the EMV chip on the payment object 162. In some examples, the payment object 162 includes EMV chip and also magstripes to allow backward compatibility with legacy readers.

Referring to FIG. 1A, the network 184 may be a communication network based on certain communication protocols, such as TCP/IP protocol. Such network may include, but is not limited to, Internet, Intranet, wide area network (WAN), local area network (LAN), wireless network, Bluetooth, WiFi, and mobile communication network. The physical connections of the network and the communication protocols are well known to those of skill in the art.

The customer device 160 may be, for example, mobile devices and computing devices that can communicate with the PPS 164 and the POS terminal 154 through the network 608. The customer device 160 can be the user device 100 of FIGS. 1B-1I. The customer device can include a merchant application 156 or an instance thereof.

The POS terminal 154 may be, for example, mobile devices and computing devices that can communicate with the PPS 164 and the customer device 160 through the network 184. The mobile devices include, but are not limited to, smartphones (e.g., Android®-enabled phones), personal digital assistants (PDAs), portable computers with wired or wireless wide-area-network and/or telecommunication capability such as tablet personal computers and "netbook" personal computers. The computing devices include, but are not limited to, personal computers, electronic point-of-sale cash registry machines, and electronic kiosks. The POS terminal 154 can be the user device 100 of FIGS. 1B-1I. The POS terminal 154 too can include the merchant application 156 or an instance thereof. The payment processing system 164 includes a processor 166, communications circuitry and an input/output interface (not shown), and a memory 168. These components may be coupled by one or more communication buses or other signal lines. It is noted that the system 164 can include more or fewer components.

The processor 166 includes one or more processors. The processor 166 is operatively coupled to the communication circuitry and the memory 168. The processor 166 may include a digital signal processor, a microprocessor, and various analog-to-digital converters, digital-to-analog converters, and other support circuits and/or combinations thereof. The processor may be configured to execute computer/machine readable and executable instructions stored in the local memory 168 or in a remote device memory (not shown). Such instructions are implemented by the processor 166 to perform one or more functions described above. In performing such functions, the processor 166 uses the communication circuitry to communicate with the network 184 and other devices on the network 184, such as the POS terminal 154 and the customer device 160.

The memory 168 includes one or more memories. The one or more memories may be, for example, cache memory, main memory and secondary memory. The memory 168 includes computer-readable instructions 169, where the computer-readable instructions may be executed by the processor 166 to implement a mobile application on the customer device 160, such as an interactive digital receipt application. In some embodiments, the memory 168 may include data storage (not shown) for storing data created and/or used by to the interactive digital receipt application.

The memory 168 may include components, such as mapping component 170, dynamic tip generator 172, the POS component 171, the pattern recognition component 174, and the exception handler 176. The memory 168 also includes data tables such as buyer or merchant data, user or customer data, card or payment object data, item data, location data, tipping profile, open tickets, and also tipping weight 182 and conditions 180.

Operationally, a customer 152B approaches a payment object reader 158 and requests an item, which can be a product or service. The POS component 171 of the PPS 164 can generate the user interface for the merchant 152A to select the items requested by the customer 152B. The POS component 171 can also open an existing open ticket or tab previously generated by the merchant. In response, the customer provides a payment object which the merchant inserts, swipes, taps or otherwise introduces the payment object 162 in the reader 158, the reader 158 registers it as a transaction activity. The reader 158 reads the data off of the payment object 162 and encrypts the data as transaction data. The reader then transfers the encrypted data to the POS terminal 154. In some cases, the POS terminal 154 receives unencrypted data from the reader 158. If the customer is using a merchant application 156 to perform an online transaction, the transaction data includes the device identifier, e.g., IP address or other kind of device fingerprint.

The transaction data also includes other information such as location of the customer, merchant or the devices associated with the customer and the merchant, or the location with respect to the merchant's store. The payment object reader 158 proceeds to detecting entry of the customer or merchant device through location detection techniques, such as techniques based on angulation, lateration, proximity detection, dead reckoning, geo-fence, global or local positioning systems, Bluetooth Technology, Near-Field Communication Technology, sensors-based technology, Radio frequency identification (RFID) system, or the like. In one embodiment, the reader 158 can establish an automatic geo-fence and entry and exit of the devices tracks location of the devices. According to the present subject matter, the geo-fence is defined and established based on a current location of an asset, for example using GPS data comprising latitude and longitude along with some predetermined area based on range or distance. In this manner, the user need not manually specify a location by drawing a perimeter, specifying a point location, or by any other means.

The transaction data can also include card data such as service codes, point of entry codes, card verification values, last four of the card etc. Also, item data such as category of items, quantity of items and nature of items for example, whether they are perishable or frozen, can be tracked in the transaction data. The items may be in a shopping cart in a single or batch payment transactions.

The transaction data can also include merchant or customer identifiers, for example, a person's fingerprint, face, iris or retina, etc., or in general, hand characteristics, eye characteristics, facial characteristics, and voice characteristics. The other identifiers include social security number, driver's license number, passport number, and the like.

The POS terminal 154 or the reader 158 sends the transaction data to the PPS 164. The PPS 164, through the POS component 171, analyzes the transaction data to extract tip determinants. The tip determinants identify the merchant, customer, customer location, merchant location, item type, payment objects, and the like, shown as buyer data, merchant data, card data, item data, location data, open tickets in the figure.

The PPS 164 then maps the tip determinants to any data, for example history of transactions, stored in the database 178 through a mapping component 170. For example, the card data can be used to track any other purchases made on that card and the tipping history thereof. The buyer data, similarly, can be used to determine the past purchases and tipping history of the customer or even by other customers in the neighborhood of the merchant or customers purchasing similar items. The item data can be used to determine tipping history associated with a specific item. For example, it may be determined that a coffee is likely to be tipped at 10% than a food item, like a sandwich. In some cases, the tip determinants and their tipping behaviors can be cross-mapped, which means once the buyer data has been mapped to tipping history, the tipping history can be further analyzed to see how the customer tips a certain item or merchant, or if there are any preferences to a certain day. For example, the customer may be more likely to tip more on weekdays. The mapping component 171 may be based on probabilistic mapping algorithm, tree search algorithm, brute-force search algorithms, combinatorial search algorithms, minimax algorithm, alpha-beta pruning, Informational search and the A* algorithm, among others. The pattern recognition component 174 can analyze data from the mapping component 171, such as historical tipping behaviors associated with the tipping determinants to identify patterns, if any. For example, a customer may have a habit of leaving no tip in cabs, whereas tipping may be more prominent in restaurants. The pattern recognition component 174 can create a rule or condition 180 as a result of this analysis. In other implementations, the pattern recognition component 174 can cross-reference this with other fringe details, such as the time available to enter tip, to better understand whether the customer is likely to pay in less-rush scenarios.

Once the tipping behaviors corresponding to the tip determinants are obtained, the dynamic tip generator 172 generates a tipping profile based on a unique combination of tip determinants obtained off the transaction data at the time of transaction, or a single tip determinant randomly selected from the obtained tip determinants. In some cases, all or some tip determinants may be used. The order of tip determinants or the hierarchy of tip determinants can be stored in "weights plane." The tipping profile can be an algorithm, a mathematical relationship, a fixed value or a range of values of gratuities or tips that the customer generally tips. The profile is specific to the transaction, and is in part based on the items in the cart.

In some cases, the tipping profile may be based on conditions 180. The conditions 180 are set by the PPS 164, merchants or customers. Once the tipping profile is generated, the dynamic tip generator sends the associated tip values or ranges to the merchant application 156 for the customer to choose from as part of the tipping feature in an interactive receipt. In some cases, the tipping feature is generated before the customer provides authorization of credit transaction and in some cases, it is provided after the customer finalizes the transaction. It will be understood that while some implementations may specifically relate to physical stores, the present subject matter can apply the interactive receipts with the tipping feature for online scenarios as well.

In some implementations, the dynamic tip generator 172 generates a tip value generally provided by customers in the neighborhood of the merchant or for such items. This value may be a fixed 10, 20, 25%, etc. The dynamic tip generator then adjusts this value based on the tipping profile. Such differences, that is between what the static value was and the one generated by the tipping profile is displayed by the PPS onto the POS terminal. In some implementations, the customer can choose to select the static value which is controlled and maintained by the exception handler 176.

Figure 1B:
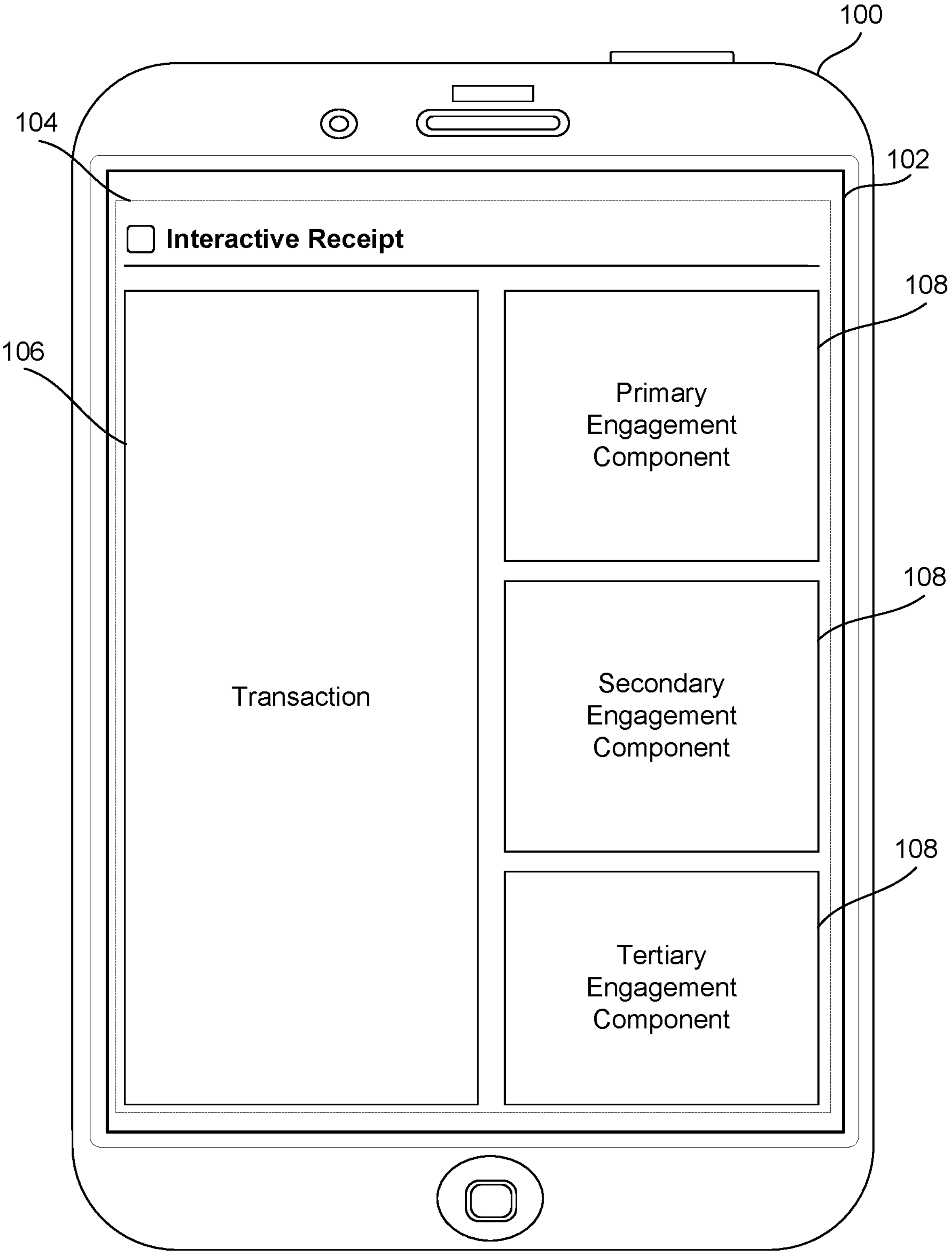
FIG. 1B illustrates a first embodiment of an interactive digital receipt technique implemented on a customer device.

Referring to FIG. 1B, which illustrates a first embodiment of an interactive digital receipt technique implemented on a customer device 100. As used herein, the term "customer device" refers to any general-purpose computing device capable of data processing. In one example, the customer device can be a mobile device, such as a smartphone (e.g., iPhone®, Android®-enabled phone, etc.), a personal digital assistant (PDA), a tablet, an e-reader, or other mobile or portable computing devices. In another example, the customer device can be a personal computing device, such as a desktop, a laptop, or other wired and wireless personal computers. The customer device 100 is equipped with a display screen 102 for displaying various customer interfaces to enable a customer to interact with content generated by the customer device 100.

The customer device 100 can implement an application, such as an interactive receipt mobile application for use by a mobile customer, where the interactive receipt mobile application includes one or more customer interface components. As used herein, a "customer interface component" is a component of a customer interface intended for a customer to view and interact with an interactive digital receipt 104. The interactive digital receipt 104 is generated for the customer after an occurrence of a financial transaction between the customer and a merchant (e.g., payment that occurs at the completion of a service and/or tendering of goods), where the interactive digital receipt 104 is displayed on the display screen 102 of the customer device 100. It is noted that the interactive digital receipt 104 may take up an entirety or any portion of the display screen 102. The interactive digital receipt 104 includes various interactive components, such as a customer transaction interface component 106 ("transaction component") and one or more customer engagement interface components 108 ("engagement component"). The transaction component 106 displays details associated with a particular transaction between the customer and the merchant, where the transaction details are displayed in real time in response to an occurrence of the particular transaction (e.g., payment transaction at the completion of a service). For example, when the customer has made a payment to the merchant, the interactive digital receipt is automatically generated on the customer device 100, and included on the receipt are details of the purchased items and prices generated by the transaction component 106.

The one or more engagement components 108 displays in real time one or more features for the merchant and the customer to interact or engage with one another. In one implementation, the features generated are configured to be available via the interactive digital receipt only within a predefined time period. The predefined time period is configurable by the merchant and allows the merchant to provide time-based incentives to engage the customer to interact with the merchant. In other implementations, the features generated can be accessed at anytime. Further details regarding the engagement components and the transaction component will be discussed in FIGS. 1C-1H.

Figure 1C:
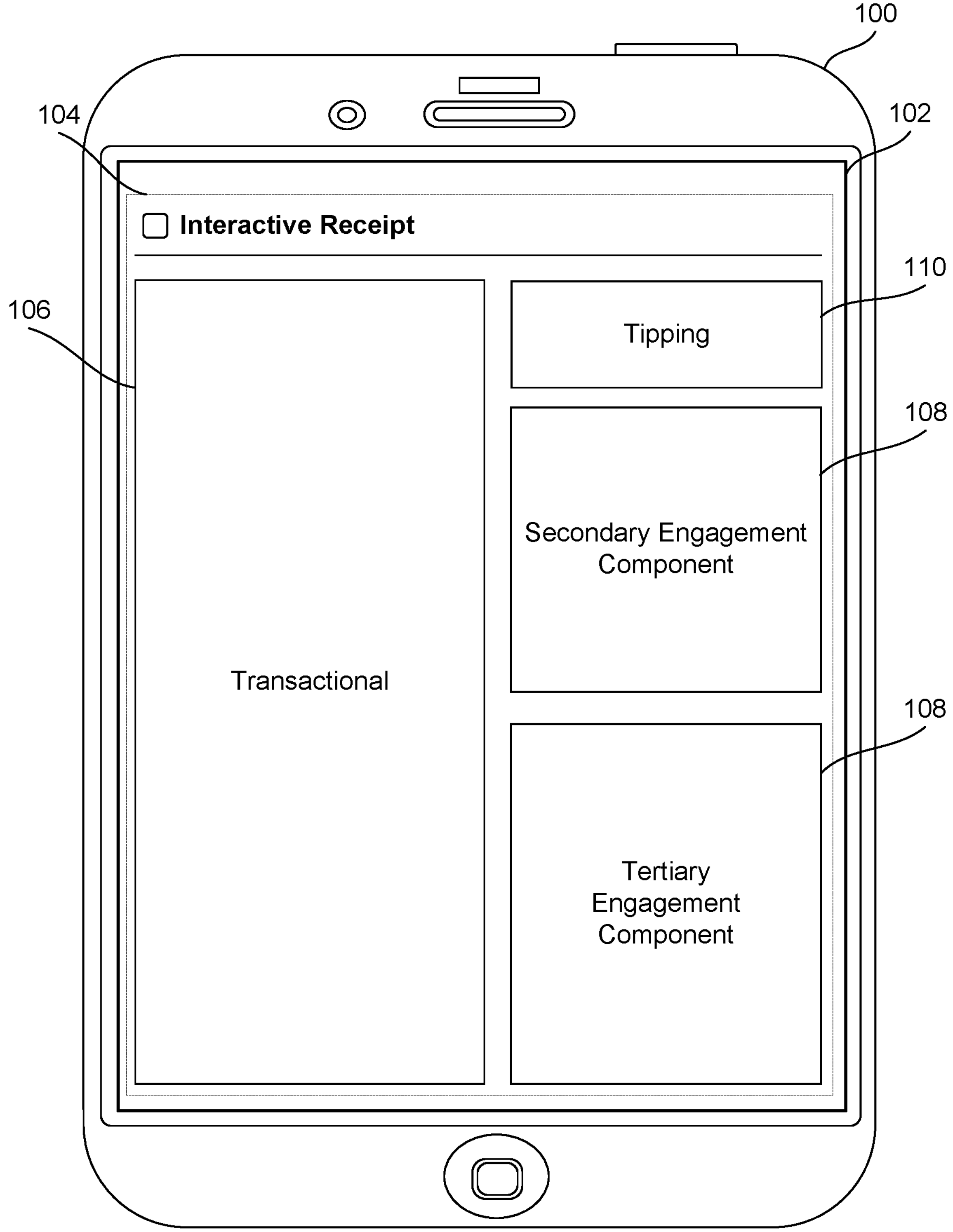
FIGS. 1C-1E illustrate a second embodiment of an interactive digital receipt technique implemented on a customer device.
Figure 1D:
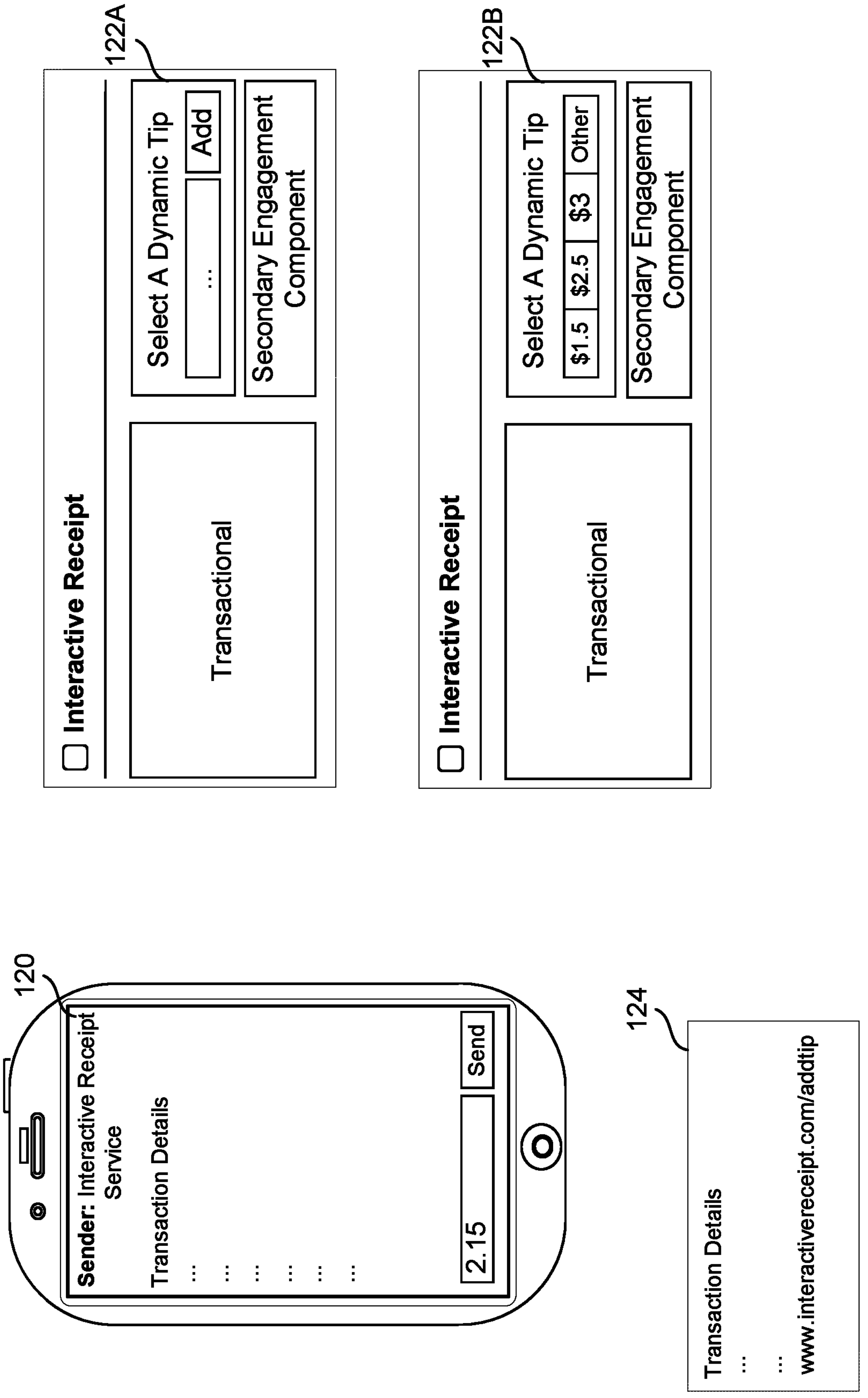
Figure 1E:
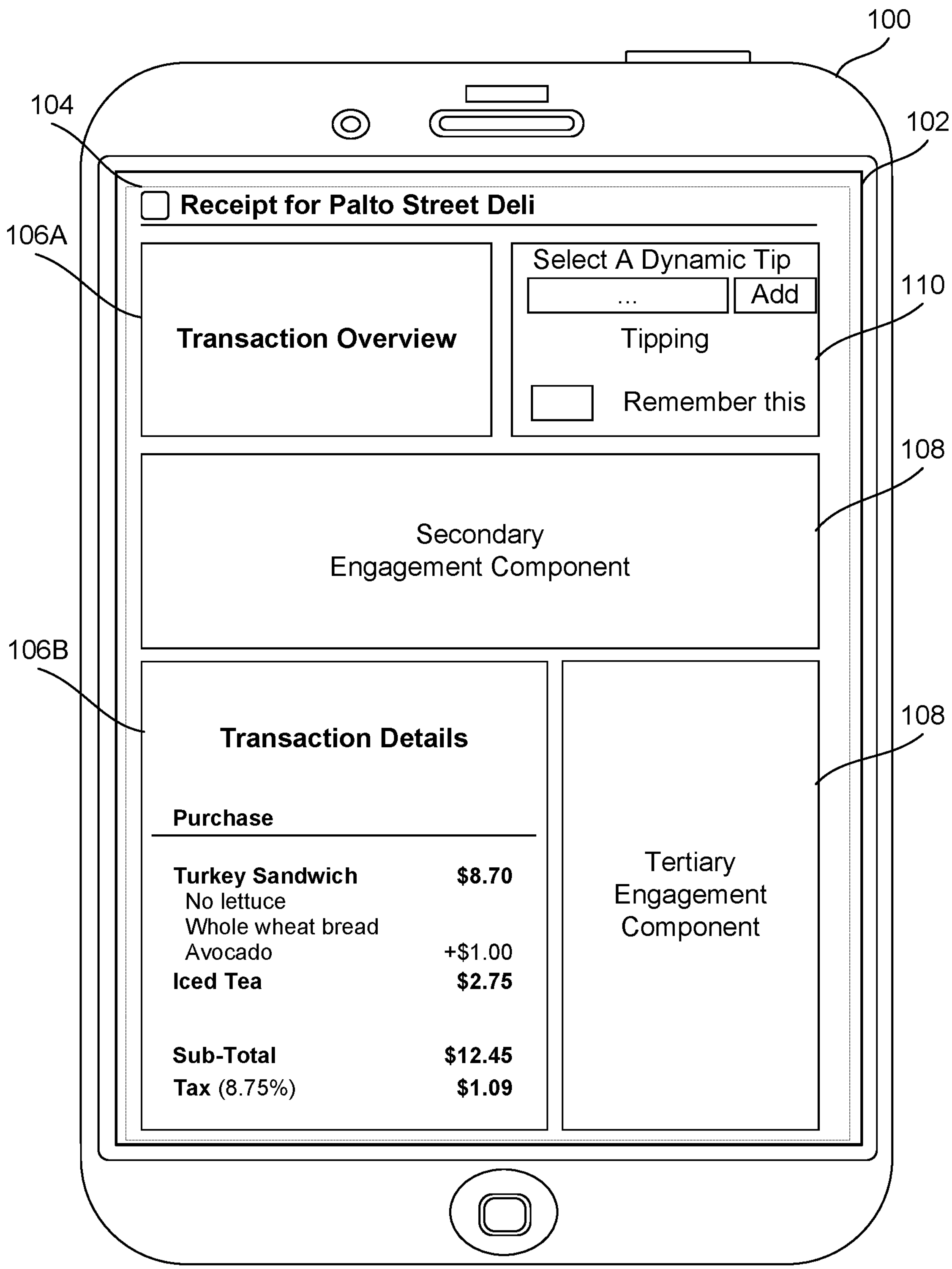

FIGS. 1C-1E illustrate a second embodiment of an interactive digital receipt technique implemented on a customer device 100. As illustrated in FIG. 1C, the interactive digital receipt 104 includes an engagement, or interactive, component for generating a tipping feature 110. The tipping feature 110 allows the customer the option to select or even add a gratuity amount (i.e., "tip") after the occurrence of a particular transaction with a merchant (e.g., tendering or completion of a payment for goods and/or service); such a transaction may be, for example, payment for a meal at a restaurant visit, where the customer is able to leave a tip after he/she has left the restaurant. The tipping feature enables any tip selected or added by the customer to be directly transmitted to the payment system, without any human interference. For example, after the customer has tendered his credit card to the merchant to pay for a meal, the interactive digital receipt is generated on the customer's mobile device. Using the mobile device, the customer can then proceed to add a tip by selecting a tip amount from amongst recommended options as per dynamic tip generator, and such tip (e.g., credit card authorization of the tip) is directly sent to the payment system to be added together with the already authorized payment amount, without the merchant having to physically enter and submit the tip authorization to the payment system.

The tipping feature 110 may be embodied in the interactive digital receipt in a variety of ways, as illustrated in FIG. 1D. In one example, the interactive digital receipt is a text message 120. In such example, upon receiving the receipt via text, a customer can select or add a tipping amount to the transaction by replying to the text message 120 and entering a number (e.g., "2.15" for a $2.15 tip), for example a tip suggested in the message by the dynamic tip generator 172. In another example, the interactive digital receipt is displayed as part of a customer interface associated with a mobile application ("App"). In such example, the tipping feature 110 is a text box 122A within the interactive receipt (e.g., interactive receipt 104), and the customer can select a tip from one of the suggested tips from the dynamic tip generator 172. The dynamic tip generator 172 generates the tip recommendations based on an analysis of dynamically changing tipping profiles based on tipping behaviors associated with tip determinants, such as the merchant, customer, location of the store, items in the shopping cart, the amount of money on the payment object being used to pay for the payment transaction, and the like. The tip determinants may be weighted, which means some determinants may be more instrumental in determination of tip profiles than others. Further the tipping behavior may be based on the preferences or conditions assigned by the tip determinants or tipping data collected over past interactions at various merchant locations. In another example, the customer can add on a tipping amount by entering a number directly in the text box, for example substantially similar to the tipping amount suggested by the tipping feature 110. The tipping feature 110 embodied within the App may also be a customer interface component 122B with default tip amounts displayed to the customer. The default amounts can be configured to change based on a condition or weight specified by the merchant or the customer. For example, the customer may specify that the recommendations be generated only for a particular merchant, e.g., a salon. The payment amount associated with the transaction (e.g., an amount equivalent to a pattern of tip selections or past additions, such as 1.5%, 15.5%, etc.). The customer can quickly add the tipping amount by clicking on any of the default amounts displayed. In yet another example, the interactive digital receipt is a Uniform Resource Locator (URL) link 124, which takes the customer to a web page to allow adding of the tipping amount. The link 124 can be a part of the text message 120, a part of the text box 122A, the component 122B, or an electronic mail (e-mail).

The tipping feature 110 is configurable in various ways to implement various functionalities. In one embodiment, the tipping feature is configured to be available at any time, and for an unlimited time period, starting after a time instance when payment has been authorized (e.g., after the customer has authorized the payment amount using his/her credit card to pay the merchant). In one embodiment, the tipping feature 110 is configured to be available only for a limited, predefined time period, or timeframe, after the authorization for the payment amount has been granted by the customer. As used herein, the term "timeframe" refers to a time limit during which the tipping feature remains available for receiving a gratuity amount authorization from the customer. The timeframe may be, for example, an hour, a day, a week, or any other desired time period (e.g., unlimited). In some embodiments, the timeframe is configured by the merchant. In other embodiments, the timeframe is configured by an operator of the payment processing system.

The timeframe of the tipping feature 110 is initialized, or started, at a time instance at which the transaction between the customer and merchant has occurred (i.e., a tender of payment has been completed). The timeframe decreases incrementally, from this time instance, at a rate that corresponds to an ordinary passage of time. For example, once a customer submits a payment (e.g., authorizes payment amount via a debit card), an interactive digital receipt is generated for the customer and the timeframe for tipping associated with that receipt is initialized (i.e., the countdown starts) at the moment the receipt is generated. At the expiration of the timeframe (i.e., the countdown reaches 0), the tipping feature becomes unavailable to the customer (e.g., the feature becomes an invalidated feature). In a real-world setting, such time limitation helps the merchant manage its financial transactions more efficiently. For example, a merchant often processes its financial transactions in batches and would not want to keep any particular transaction open indefinitely.

In one embodiment, the timeframe of the tipping feature 110 may be configured to incorporate a customer definition of a default gratuity amount. In particular, a customer of the customer device 100, such as a customer, may define a nominal gratuity amount to be automatically paid to certain merchants if no gratuity amount is submitted at the expiration of the timeframe. The nominal gratuity amount may be the based on the past gratuity amount entered by the customer or the lowest of the tip recommendations. For example, a customer defines the gratuity amount to be $10 for the customer's favorite restaurant. In such example, the $10 tip is automatically authorized for any transaction with that restaurant whenever no gratuity amount is added at the timeframe expiration. The customer can also define the nominal gratuity amount to be zero. In some embodiments, the default gratuity amount may be defined by the merchant. For example, a restaurant merchant may want to configure a nominal gratuity amount to be defined for restaurant services to groups of six parties or more. In such example, when no tip is added to the payment amount at the end of a timeframe (e.g., 2 hours), an automatic 22.5% of the payment amount is authorized on the customer's payment card as the tip amount, and the 22.5% tip amount gets added in the final transaction payment. The nominal amount may be based on merchant's or customer's tip behavior. In another implementation.

Referring to FIG. 1E, the interactive digital receipt 104 can include two transaction components 106A, 106B, in addition to the tipping feature 110. The transaction component 106A includes an overview of the transaction completed between the customer and the merchant, such as the total amount of the transaction, the payment card used for the transaction (e.g., last four digits of a credit card), the date, or the like. The transaction component 106B includes the details of the transaction, such as the name of the items purchased, the quantity, the price, or the like. In some implementations, each item may have a separate tip percentage associated with it so that the customer can decide if they want to tip on certain items or not. Further, some items may carry a higher tip than others. In this illustration, this is shown with stars against an item. Since iced team is starred, only iced tea gets tipped. Again, the tip amount is determined based on the dynamically changing tipping behavior associated with tip determinants.

Figure 1F:
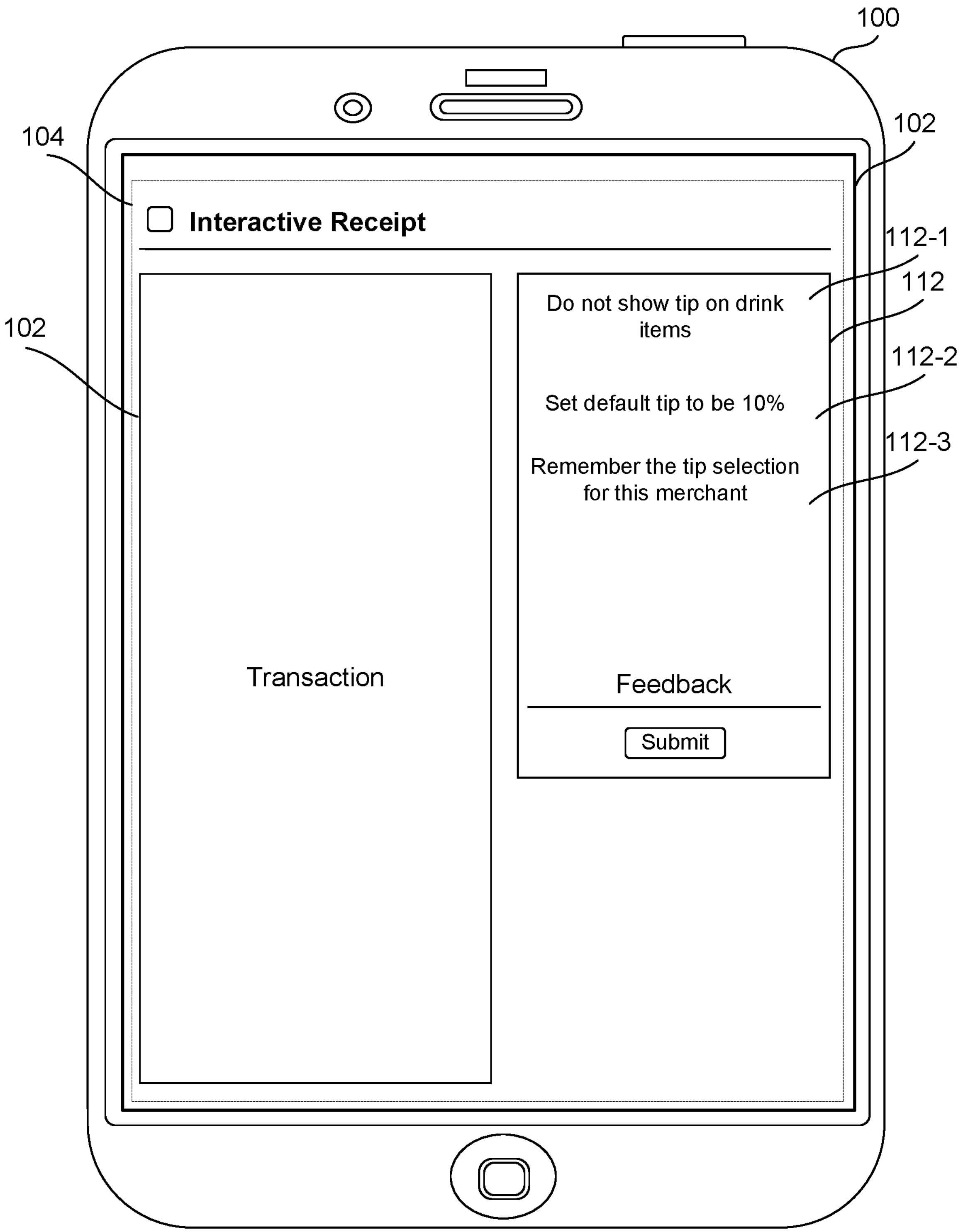
FIGS. 1F-1H illustrate a third embodiment of an interactive digital receipt technique implemented on a customer device.
Figure 1G:
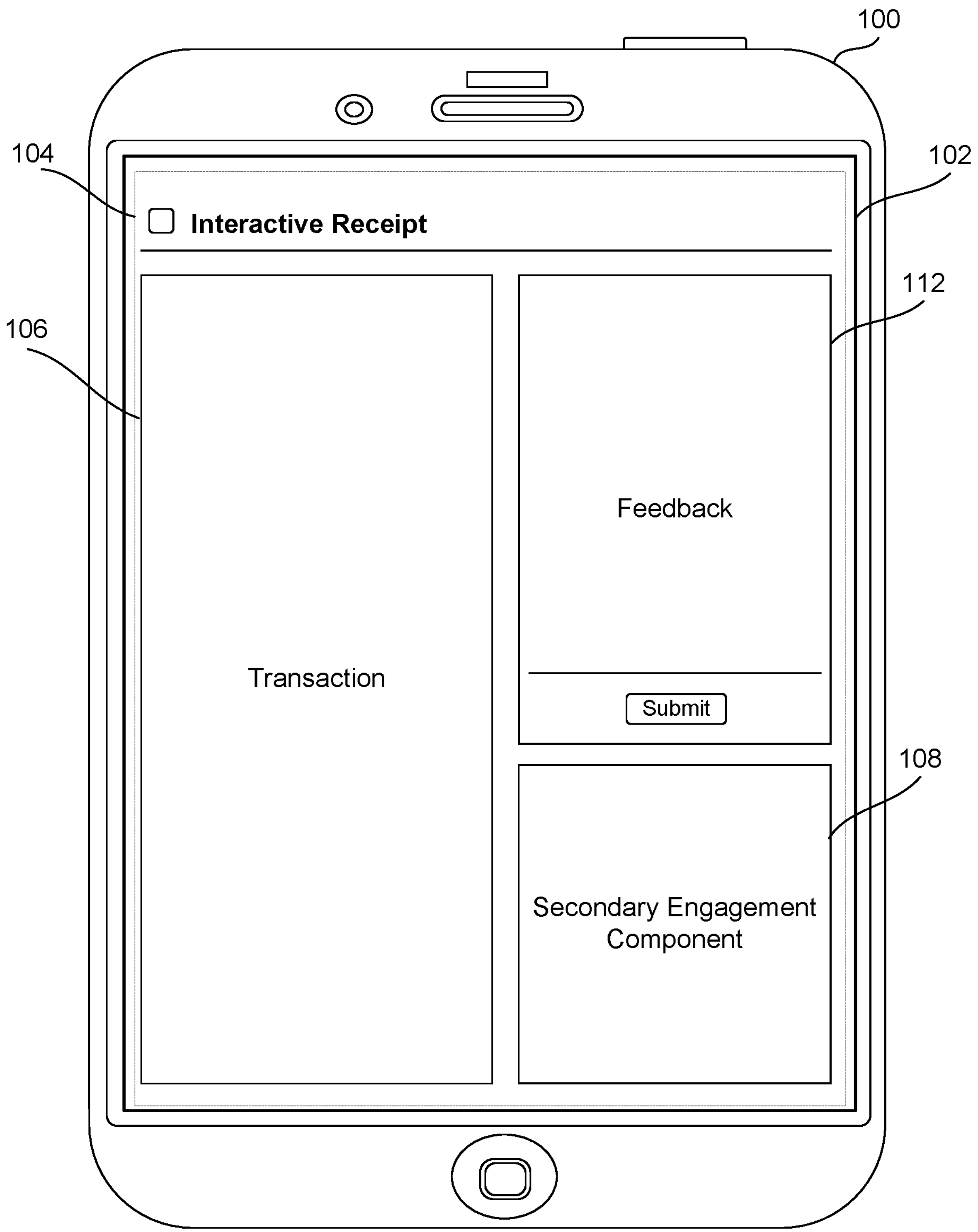
Figure 1H:
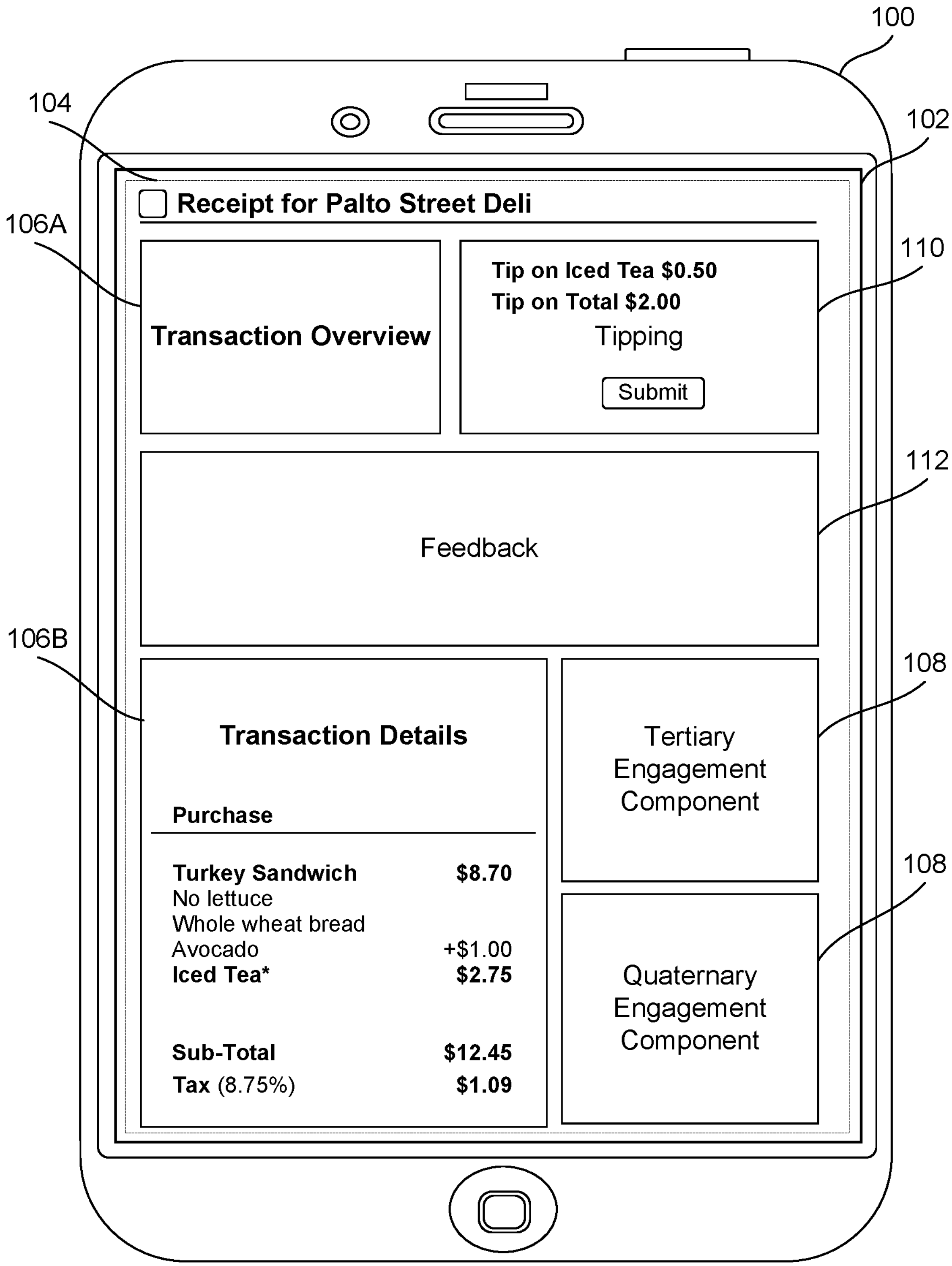

FIGS. 1F-1H illustrate a third embodiment of an interactive digital receipt technique implemented on a customer device 100. As illustrated in FIG. 1F, the interactive digital receipt 104 can include an engagement, or interactive, component that contains a feedback feature 112. The feedback feature 112 allows the customer (i.e., payer, consumer, or the like) to submit feedback after the completion of a particular transaction with a merchant (i.e., payee). The feedback may include conditions or weight to the tip determinants to be set in the payment processing system 164 to apply in all subsequent payment transactions. The feedback may also include submitting, for example, a rating (e.g., 5 stars), a review, a suggestion, or the like, on various aspects of the transaction (e.g., store cleanliness, service, products, overall visit satisfaction, reason for selective tipping, etc.). In some embodiments, the feedback is submitted directly to the merchant. In some embodiments, the payment processing system coordinates, communicates, and links with third party services associated with the merchant in implementing the feedback feature 112. In such embodiments, the feedback is transmitted to the third party services upon submission via the interactive digital receipt. The third party services aggregate the feedback in association with other feedback provided by the merchant. Such third party services may include, for example, Yelp.com, Urban Spoon, YP.com, and the like. In an illustrative example, the feedback feature 112 provides an option for the customer to submit a feedback or condition such as "do not generate tip on drink items in 112-1," "set the default tip based on past tip value in 112-2," "remember the tip selection for future transactions in 112-3." In another illustrative example, the feedback feature 112 provides an option for the customer to submit indirectly a write-up review to Yelp.com by using the feedback feature 112. In such example, the customer can write the review in a text box within the interactive receipt and the review is transmitted to Yelp® when the customer clicks Submit.

In one embodiment, the feedback feature 112 is configurable to be available only for a predefined time period, or timeframe. In some embodiments, the timeframe associated with the feedback feature 112 ("feedback timeframe") is configured to be the same as the timeframe associated with tipping feature 110 ("tipping timeframe"). For example, the timeframe may be set at one hour and at the expiration of the hour, both the tipping feature and the feedback feature are made unavailable to the customer. In some embodiments, the feedback timeframe is configured to be different from the tipping timeframe. For example, the feedback timeframe may be set at one week while the tipping timeframe may be set at one hour. In such example, at the expiration of the tipping timeframe, a customer may still be able to submit feedback for the corresponding transaction.

In some embodiments, the feedback timeframe is configured by an operator of the payment processing system. For example, the feedback timeframe can be configured to be the same for all participating merchants of the payment processing system. In other embodiments, the feedback timeframe is configured by a particular merchant. For example, the merchant can configure the feedback timeframe to be one day, one week, or any desired amount.

In one embodiment, a particular merchant may configure the feedback timeframe to be tied to an incentive (i.e., "feedback reward") for encouraging submission of a feedback. The incentive may be based on a time of submission of the feedback. For example, the customer is rewarded a "20% Off Coupon" incentive, or feedback reward, if such a condition is set. In some ways, the dynamic tipping behavior is crowd-sourced through the feedback feature thus incentivizing the feedbacks leads to setting of more conditions which is helpful in setting tip amounts in subsequent transactions. In another example, if the feedback is submitted within 10 minutes after the completion of the payment transaction between the customer and the merchant, the reward is a 20% Off coupon; on the other hand, if the feedback is submitted within 12 hours, but not exceeding the transaction timeframe allowed for the feedback (e.g., 24 hours), the reward is a 5% coupon. In some examples, the customer may apply a gift card or a pre-paid card towards the payment transaction. In such cases, the tip amount may be based on whatever amount is left on the gift card and this overrides any dynamic tipping based on other tip determinants.

The feedback feature 112 may be provided in the interactive digital receipt 104 in various configurations, as illustrated in FIGS. 1F-1G. Referring to FIG. 1G, the feedback feature 112 can be provided along with contents from the transaction component 106 and another engagement 108. Referring to FIG. 1H, the feedback feature 112 can be provided along with the tipping feature 110. The features 110, 112 may be configured according to a particular merchant's needs. For example, a merchant in the business of selling household supplies can configure the interactive digital receipt to generate the feedback feature 112 without generating the tipping feature 110. In another example, a merchant in the business of operating a restaurant can choose to have both the tipping feature 110 and the feedback feature 112 be generated in the interactive digital receipt 104. One of ordinary skill in the art will appreciate that other configurations are possible.

Figure 1I:
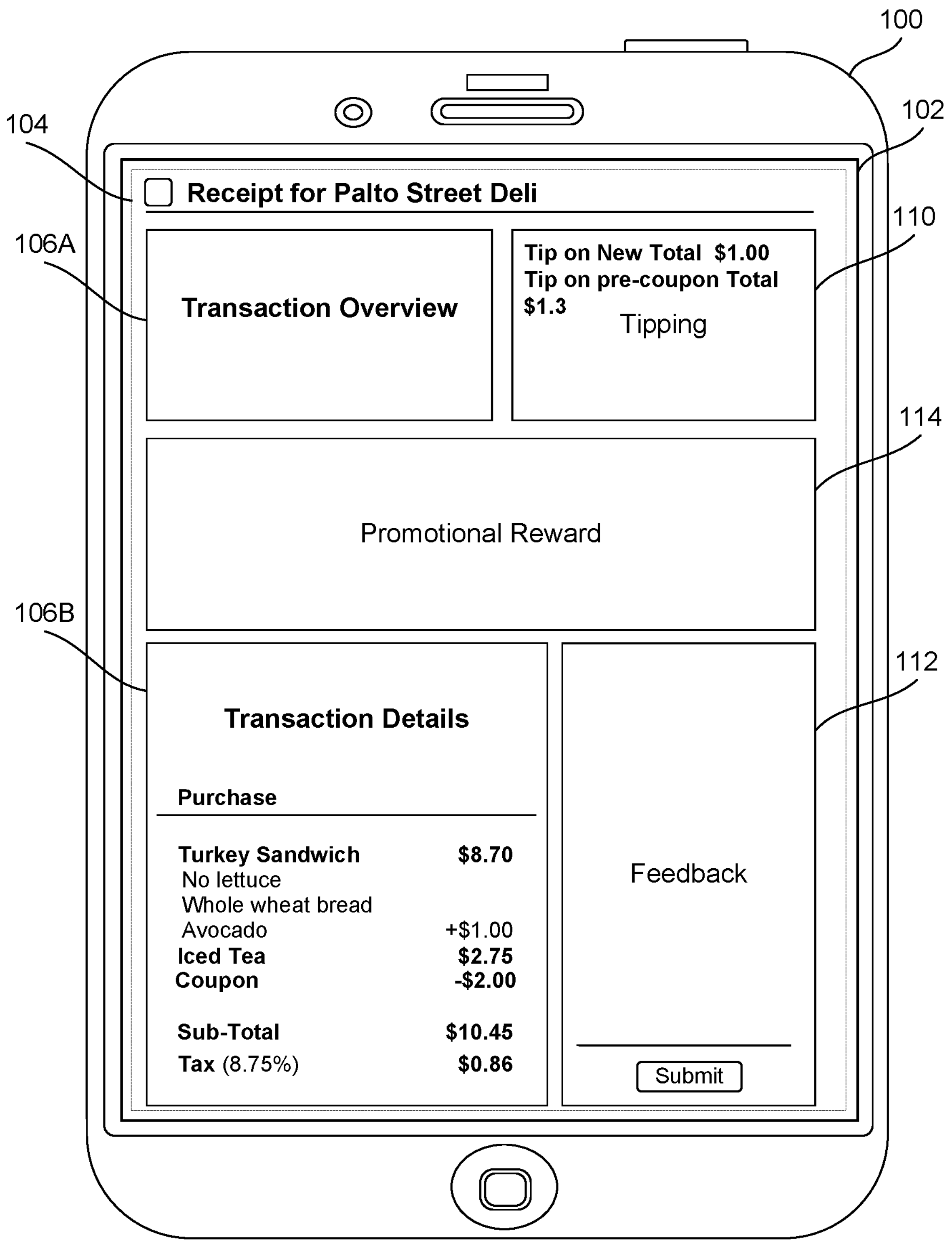
FIG. 1I illustrates a fourth embodiment of an interactive digital receipt technique implemented on a customer device.

FIG. 1I illustrate a fourth embodiment of an interactive digital receipt technique implemented on a customer device. As illustrated in FIG. 1I, the interactive digital receipt 104 includes an engagement, or interactive, component for generating a promotional reward feature 114. The promotional reward feature 114 allows a particular merchant to engage and incentivize a customer to interact with the merchant within a predefined time period, or timeframe. In some embodiments, the timeframe associated with the promotional reward feature 114 ("promotion timeframe") is configured to be the same as the timeframe associated with the feedback feature 112 ("feedback timeframe"), or the timeframe associated with the tipping feature 110 ("tipping timeframe"), or both. For example, the timeframe may be set at one hour, and at the expiration of the hour, the promotional reward feature, the feedback feature, and the tipping feature are all made unavailable to the customer. In some embodiments, the promotion timeframe is configured to be different from each of the feedback timeframe and the tipping timeframe.

The time-based promotional feature 114 offers the customer a particular promotional reward (or "promotion") associated with the merchant and/or the transaction completed, where the promotional reward reduces, or decreases in value, corresponding to a decrease in the passage of time associated with the timeframe. For example, a $10 coupon is generated via the interactive digital receipt the moment a restaurant payment transaction occurs (e.g., authorization of payment amount is completed) and a specific threshold tip is submitted. For example, if the customer submits a tip of 15% or higher, the coupon is generated. Any lower and the customer does not qualify for the coupon. The coupon promotes the restaurant by offering the customer $10 off on a next meal at the restaurant. Such $10 coupon decreases in value from the moment the coupon is generated; ultimately, the coupon decreases to a $0 value unless the customer redeems the coupon (e.g., by buying another meal at the restaurant). As such, the sooner the customer redeems the time-based coupon, the higher the value he/she gets to redeem.

The merchant may configure the rate of the reduction in value and/or the timeframe associated with the promotional reward. In one example, the restaurant sets the $10 coupon to expire after a week, with no reduction in value at all as long as the coupon is redeemed at the end of the week. In another example, the restaurant sets the $10 coupon to expire after 3 days, where the value reduces each day until the value reaches $0 at the end of the third day. The value may reduce in accordance with the passage of time or it may reduce according to a rate set by the merchant. For example, the value decreases at an exponential rate.

In some embodiments, the customer may redeem the time-based promotional reward by completing various redemption, or promotional, activities. Some redemption activities include simply revisiting the merchant to make another purchase for goods and/or services, as discussed in the example above. Other redemption activities include participating in a game via the customer device. Some redemption activities include participating in activities with other merchants affiliated with the merchant that offers the promotional reward. For example, the original merchant may offer a 15% Off Coupon, yet that coupon is redeemable only at the original merchant's affiliated store. The redemption activity and the decreasing rate of the time-based reward may be configured by the merchant offering the reward. Such configurations are beneficial as they allow the merchant to customize the promotions according to the merchant's business, such as tailoring to an advertising campaign or a targeted customer demographic.

In some implementations, the customer may apply the coupon in subsequent payment transactions. As shown, the customer may apply a previously generated coupon to a current transaction but the tip generation may be based on the actual amount and not on the amount obtained after applying the coupon. In some implementations, the tip may be set to higher values because a coupon was applied.

The promotional feature 114 may be provided in the interactive digital receipt 104 in various configurations. As illustrated in FIG. 1I, the promotional feature may be combined with the tipping feature 110 and the feedback feature 112. One of ordinary skill in the art will appreciate that other configurations are possible.

Other engagements, or interactive components, not shown in FIGS. 1B-1I may also be implemented via the interactive digital receipt displayed on the customer device. In one embodiment, the engagement includes an interactive transaction record. The interactive transaction record includes one or more interactive digital receipts that has resulted from one or more financial transactions belonging to the customer. A particular interactive record may be configured to include only interactive digital receipts associated with a particular merchant. A particular interactive record may be configured to include all interactive digital receipts associated with the customer, including receipts associated with different merchants with whom the customer has transacted. The interactive transaction record allows the customer to organize his/her interactive digital receipts and provides a comprehensive view of all payment transactions.

In one embodiment, the engagement includes an interactive advertisement component (e.g., promotion for product and/or service) to catch the customer's attention using advertisement with various content. Such advertisement may include, for example, the promotional reward feature 114 to entice the customer to "click-on" or select a particular offering being displayed on the display screen. In yet another example, the advertisement may be a plain display with no interaction required from the customer, where the interaction comes from the advertisement content changing to attract the customer's attention. The advertisement content may be related to the completed transaction for which the receipt 104 is generated. For example, for a coffee purchase transaction, the advertisement includes information about a sustainable coffee alliance organization. The advertisement can also include information about nearby merchants associated with the venue where the completed transaction has taken place. In some embodiments, the interactive advertisement component is coupled to the interactive transaction record, where advertisement content is changed based on details extracted from the interactive transaction record. The advertisement or content information allows customer to make more informed choices with regards to tipping. For example, knowing the number of steps and individuals involved in bringing dinner items from farm to table can encourage the customer to tip higher. Other customer engagements (or interactive components) not discussed above, but consistent with the techniques discussed throughout, may also be envisioned by one of ordinary skill in the art.

The order of interactive components shown in FIGS. 1B-1I can be adjusted as per customer or merchant preferences. For example, the merchant can opt to show the tip amounts before the cart value is presented or before the feedback option is provided. Further, the adaptive tip generation option can be turned on or off in a setting menu.

Figure 2:
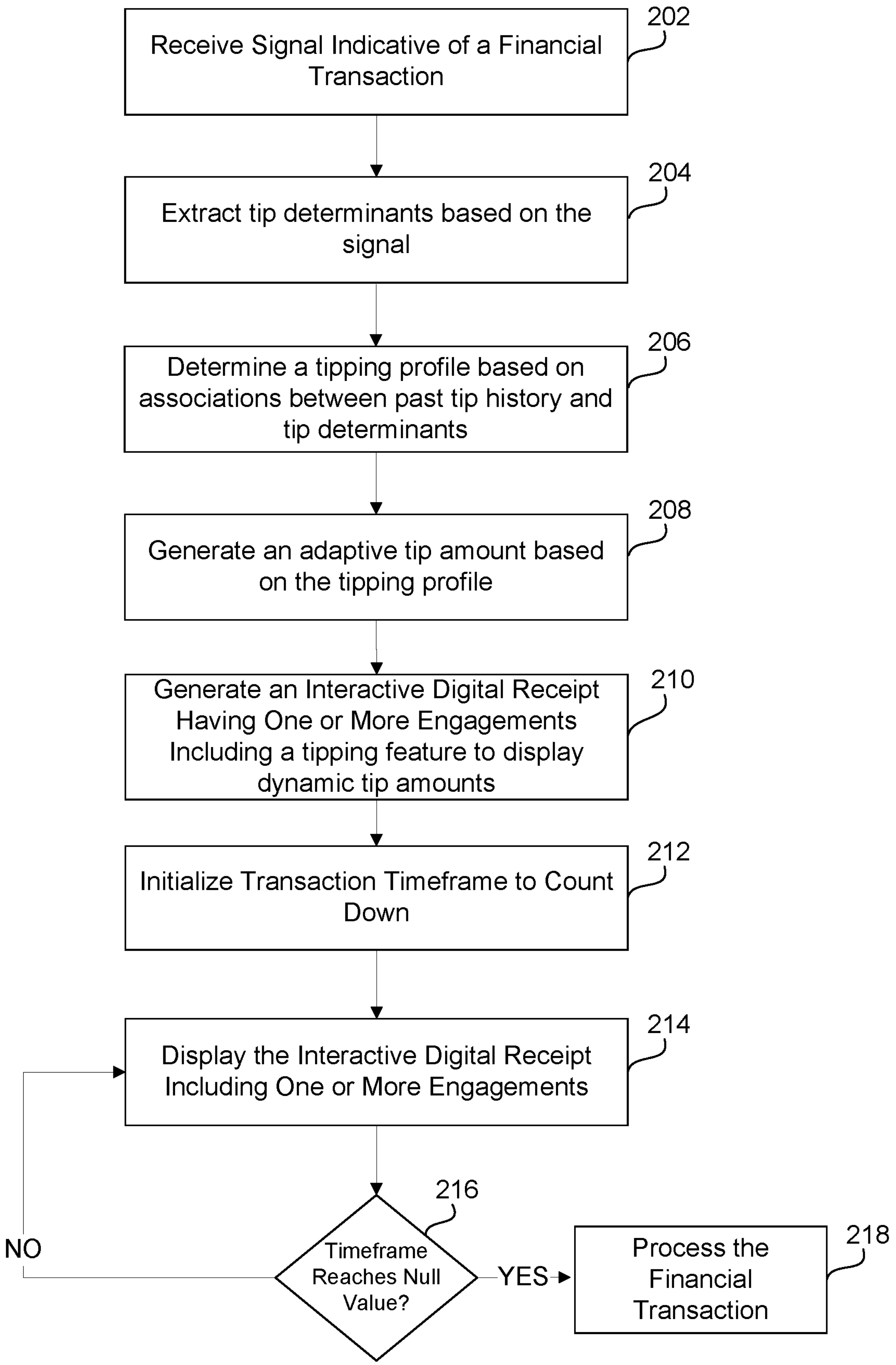
FIG. 2 illustrates a flow diagram of a process for generating an dynamic tip amount and implementing the tipping feature on an interactive digital receipt technique on a customer device, according to an embodiment of the present subject matter.

FIG. 2 illustrates a flow diagram of a process 200 for implementing an interactive digital receipt technique on a customer device. The customer device may be the customer device 100 of FIGS. 1A-1I. In some embodiments, the process 200 is implemented by the customer device. In some embodiments, the process 200 is implemented by a payment processing system, such as the system 164 of FIG. 1A, or even the POS terminal. An instance of the payment processing system may be implemented as a mobile application on the customer device, such as a smartphone.

At step 202, the PPS receives a signal indicating that a financial transaction, such as a payment transaction, between a customer of the customer device (e.g., a customer, a payer, a buyer, etc.) and a merchant (e.g., a seller, etc.) associated with the POS terminal. The signal may be communicated, or transmitted, from the merchant's POS terminal to indicate that the customer has made a payment to the merchant (i.e., to indicate that the transaction has been completed) and sent to a PPS.

At step 204, the PPS extracts information identifying tip determinants based on the signal or the data read off of the payment object. For example, the PPS determines identity of the merchant, customer, the items forming the payment transaction, the type of items, the payment card, the day of transaction, and the location of the merchant's store, and the like based on the transaction data. The PPS can also extract any transaction fingerprints associated with such tip determinants, for example any historical tip data corresponding to the tips received by the merchant, provided by the customer, associated with the payment card, etc.

At step 206, the PPS determines a dynamic tipping profile corresponding to the tip determinants identified at step 204. In some implementations, tip determinants may have a hierarchy and accordingly weights may be associated, based on which the tipping profile is evaluated based on the transaction fingerprints. The tip behaviors or tipping history can have patterns which also generate a tipping profile. The tipping profile can be a mathematical relationship or value of range of dynamic tip values.

At step 208, the PPS generates a tip amount, which is different from a tip amount based solely on the payment amount corresponding to the items. The tip amount is now configured dynamically based on the varying behaviors of the entities involved in the transaction.

At step 210, the PPS generates an interactive digital receipt to provide an electronic record of the transaction that has been completed between the customer and the merchant. The interactive digital receipt may be the receipt 104 of FIGS. 1A-1I and may be displayed on the customer device. The interactive digital receipt is configured to be a "living" digital receipt that continues to be maintained and updated on the PPS and/or the customer device. The receipt allows the customer to engage in one or more engagements, or interactions, associated with the transaction, even after the transaction has been completed (i.e., payment has been tendered). The one or more engagements provided on the receipt are time-based and may be configured by the merchant, the customer, or a combination thereof, as discussed above in the descriptions of FIGS. 1A-1I.

At step 212, the customer device initializes a transaction timeframe to count down in response to the interactive digital receipt being generated; that is, the transaction timeframe starts decreasing incrementally until it reaches a null value once the receipt is generated. At step 214, the customer device displays the interactive digital receipt on a display screen of the customer device. The interactive digital receipt includes one or more engagements being displayed to the customer on the display screen.

In one embodiment, the engagements includes a gratuity option that allows the customer the capability to authorize a gratuity amount (or "tip") after the payment amount has been tendered, such as a credit card authorization of the payment amount (i.e., at step 202). The gratuity option allows any adaptive or dynamic tip selected by the customer to be directly transmitted to the payment system. For example, once a restaurant patron has given the waiter her credit card to pay for the meal, the patron can add the tip amount by herself without needing the waiter to physically enter the additional tip amount into the payment system. In such example, the patron can simply add the tip on top of the original meal amount via the interactive digital receipt, and the additional credit card authorization is directly sent to the payment system; with the gratuity option available, the patron may choose to add the tip while she is still present at the restaurant or after she has left the restaurant.

As discussed above, in one embodiment, the gratuity option is available to the customer for an indefinite time. In another embodiment, the gratuity option is limited by the transaction timeframe. In such embodiment, the customer must utilize the gratuity option within the transaction timeframe, i.e., before the timeframe reaches the null value. When the timeframe reaches the null value, the gratuity option is disabled and the customer is no longer able to authorize an additional transaction amount for gratuity. The timeframe may be configured to be an unlimited time period (i.e., no expiration).

As discussed above in FIGS. 1A-1I, the gratuity option may be provided, or displayed, via the interactive receipt along with other engagements, or interactive components, such as a time-based feedback option, a time-based promotional reward, and/or a rewards record. Accordingly, as discussed above, the transaction timeframe associated with the engagement(s) provided via the receipt may include one or more different timeframes for each type of engagement being displayed on the interactive digital receipt (e.g., tipping timeframe, promotion timeframe, feedback timeframe, etc.).

At step 216, the customer device determines whether the transaction timeframe has reached a null value, i.e., "0" time left. If time still remains, then the device continues to display the engagements to engage the user, as indicated in step 208 If no time remains, the customer device processes the transaction, as indicated in step 212. Processing the transaction may include updating the interactive digital receipt based on the user's interactions with the one or more engagements displayed on the display screen.

In one embodiment, processing the transaction at step 218 may include transmitting to the remote system (e.g., payment processing system) an additional payment authorization for a gratuity amount (or "tip") submitted by the user. In one example, the customer may have chosen to interact with the gratuity option displayed at step 214 to select the dynamic gratuity amount to the transaction. In another example, the customer may have predefined a nominal gratuity amount to be automatically authorized when no gratuity amount is added for a transaction with the merchant. However, if the customer does not choose to interact with the gratuity option and/or to define a nominal gratuity amount, no additional payment authorization step is carried out in step 218.

In one embodiment, processing the transaction at step 218 may include updating the merchant's database with feedback completed by the customer via the interactive digital receipt. The feedback may be a condition to assign tips for subsequent payment transactions at a merchant location or for a particular item type or payment object. The processing may also include transmitting to the customer an incentive reward for completing (i.e., submitting) the feedback. As discussed above, the incentive reward may be based on a time of submission of the feedback.

In one embodiment, processing the transaction at step 218 may include processing for the customer (e.g., customer) a time-based reward for completing a redemption activity associated with the merchant (e.g., merchant). The time-based reward may be maintained and accessed via the interactive digital receipt, where the customer may choose to use the reward at any time after the redemption activity has been completed.

In one embodiment, processing the transaction at step 218 may include updating one or more records associated with the customer. Updating the records may include updating the user's tip record and updating the customer's interactive transaction record. The interactive transaction record includes one or more interactive digital receipts resulting from one or more financial transactions belonging to the customer. A particular interactive record may be configured to include only interactive digital receipts associated with a particular merchant. A particular interactive record may be configured to include all interactive digital receipts associated with the user, including receipts associated with different merchants with whom the customer has transacted.

Updating the customer's tip record may include analyzing details of the transaction between the customer and the merchant (i.e., the completed transaction of step 202). Analysis of such details allows the PPS to automatically create or update tipping profiles for subsequent transactions. For example, if the customer tips more than 50% for a particular server at a merchant location, the tipping behavior can be set to such values for subsequent transactions.

Figure 3:
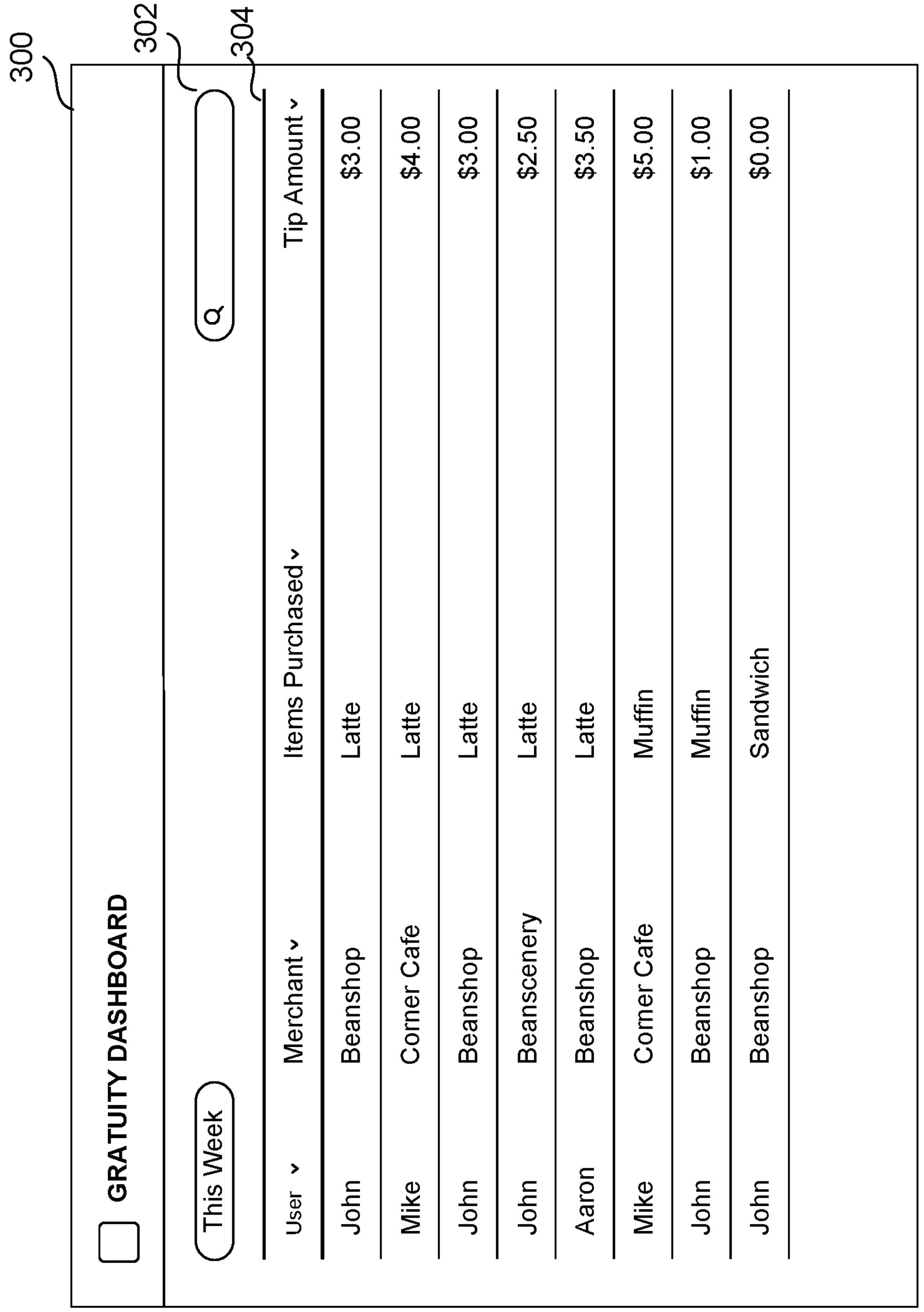
FIG. 3 illustrates a screenshot of a gratuity dashboard for managing interactive digital receipts implemented on a customer device, according to an embodiment of the present subject matter.

Updating the customer's interactive transaction record may include adding the interactive digital receipt associated with the completed transaction to a list of existing interactive digital receipts. The interactive transaction record may be stored on the customer device or merchant device, such as POS terminal or a central server like PPS FIG. 3 illustrates a screenshot of a tip dashboard 300 for determining an adaptive value of tip for interactive digital receipts. The tip dashboard 300 may be embodied as the interactive transaction record discussed above. The tip dashboard 300 may be implemented on a user interface of a POS terminal or a customer device (e.g. customer device 100 of FIGS. 1A-1I) to allow a merchant or customer (e.g., a payer, a buyer, etc.) to view a list of interactive digital receipts and the distribution of tips over a period of week, year. The interactive digital receipts are associated with one or more completed financial transactions between the user and one or more merchants.

Referring to FIG. 3, the tip dashboard 300 can be implemented as a data-structure in the payment processing system. The data structure includes a search feature 302 and a selection feature 304. The interactive digital receipts may be viewed and/or organized by using the selection feature 302 to select an organization based on a time, a merchant, an item type, or a transaction amount. The payment processing system accesses the tip amount submitted by various users at various locations for a variety of items on a particular day, for example using the search feature 304. By retrieving the information and studying patterns, the payment processing system can create unique relationships between a merchant, customer, item type, location and a tip amount. For example, by accessing the tipping behavior of John, the payment processing system determines that John is more likely to tip higher at Corner Café than Bean shop. Accordingly, the payment processing system adapts the tip amount at both the locations to reflect such a behavior. In one implementation, the pattern recognition component 174 detects patterns in the behaviors which can be used to generate tipping profiles.

FIG. 4 illustrates a screenshot of a gratuity ("tip") generation dashboard 400 for generating gratuity profiles in response to a particular transaction. The gratuity generation dashboard 400 may be part of a user interface implemented on a merchant computing system, such as the POS terminal 154 of FIG. 1A. The gratuity generation dashboard 400 is connected to PPS that is configured to generate one or more interactive digital receipts on a user device of a customer.

The gratuity generation dashboard 400 enables the PPS to generate a tipping profile in response to a payment transaction by analyzing tipping behavior corresponding to merchants, customers, location of merchants, payment object provided for the payment transaction, the type of items in the shopping card, etc. Using the gratuity generation dashboard 400, the PPS may dynamically change the tip amount that is generated, or displayed, to a particular customer at the completion of every transaction. Further, the merchant may choose between different templates of a particular engagement type to be displayed. Such dynamic capability enables the merchant to utilize the interactive digital receipt according to the business needs of the merchant. For example, for a frequent customer, the merchant may choose to generate a lower tip value or an item-based tip to reward loyalty, which is customarily not offered as the default engagement to customers.

As shown, each of the tip determinants, such as merchant A, or customer B, is associated with a tipping profile based on its transaction fingerprint, that is past interactions with PPS. By correlating these data structures, the PPS can generate a dynamic or adaptive gratuity amount best suited for the specific payment transaction. Some data-structures may include conditions which dictate whether or not to correlate certain data-structures or the manner in which they should be correlated. Accordingly, a dynamic gratuity amount or range of amounts is generated as shown in 402.

Figure 5B:
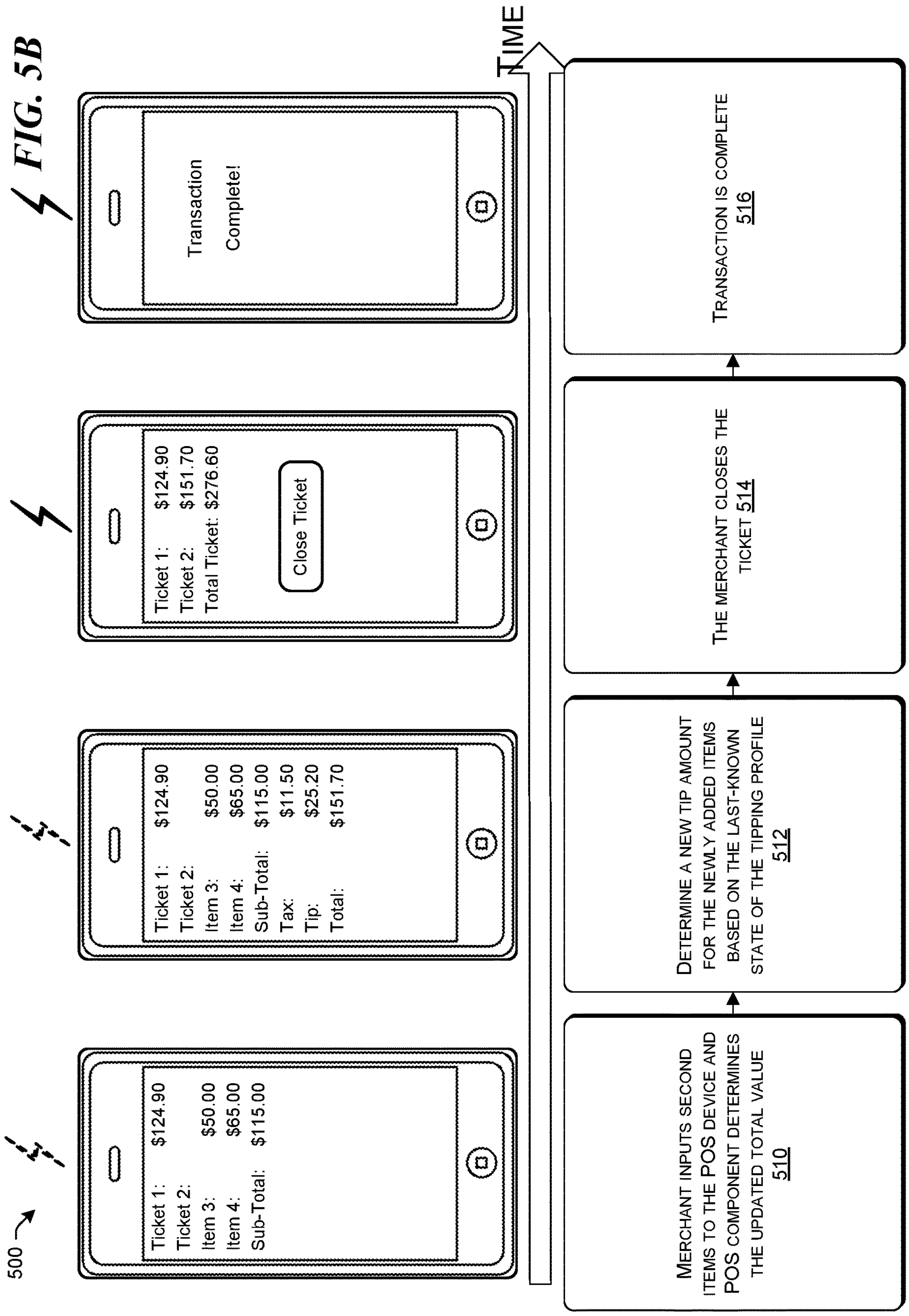

FIGS. 5A-5B collectively illustrate a sequence diagram 500 illustrating an example open ticket transaction including authorization of dynamic tip selection operations executed by a PPS and a POS terminal in a point-of-sale (POS) context. The process of FIGS. 5A-5B is discussed in the context of the scenario of FIG. 1, s specifically offline scenarios. However, this is merely to aid in comprehension and the process may be utilized in many other contexts. The solid network lines indicate connection of the mobile device with the PPS, while dotted or shaded network lines indicate that the mobile device is offline with respect to the PPS.

At 502, the merchant inputs a request to create an open ticket for the customers. For example, the merchant may tap the "open ticket" button displayed by the user interface (UI) to instruct the merchant device and the payment processing system to create an open ticket. Subsequent to receiving the instruction, the POS component of the computing devices may create a data record (e.g. stored in the database) to maintain information regarding the open ticket.

At 504, the POS component of the PPS presents a UI requesting the merchant enter a payment object for the open ticket. The merchant swipes the first payment object, a first credit card, to provide payment object information for the first credit card. In the illustrated example, upon creating the open ticket, payment information is requested by the POS component prior to the merchant entering items requested by the customers. However, implementations are not so limited. In some implementations, the merchant may enter items requested by the customers and request payment information from the customers at the merchant's discretion or in some other point in the transaction.

At 506, after the payment object information for the first credit card is received, the POS component may determine an initial authorization value for the first credit card. In the illustrated example, the initial authorization value for the first credit card is determined to be $200. The determination of the authorization value may be based on one or more factors such as prior interactions with the customer, information about the payment object, and so on. Once the authorization value is determined, the POS component displays an open ticket customer interface (UI). In the illustrated example of FIGS. 5A and 5B, the open ticket UI includes a listing of the items. The merchant inputs one or more first item(s) requested by the customers from the merchant into the POS device. The POS component determines the cost of the first items to determine a total value. In the illustrated example, the merchant inputs two items, item 1 with the cost of $35 and item 2 with the cost of $60, for a total of $95. At this point in the process, the POS component extracts relevant tip determinants off of the information obtained so far. For example, the type of the payment object, the authorization value on the payment object, identity of the customer, the merchant, the item type, category of items, etc., are retrieved.

At 508, the dynamic tip generator computes a dynamic tip amount corresponding to the tip determinants. For example, the dynamic tip generator determines a tipping profile or a plurality of profiles corresponding to the various tip determinants. Note that the dynamic tip amount is based on the cart value and other parameters which are subject to change in an open ticket scenario. The tipping profile can be a mathematical equation or a fixed percentage of tip specific for that payment transaction. In some cases, there can be an offline tipping profile specifically for offline scenarios. For example, the merchant may request higher tips to allow customer to avail open tickets. The process then continues to FIG. 5B.

At 510, the merchant inputs one or more second items to the POS device and the POS component determines an updated total value. In the illustrated example, the merchant inputs two additional items, item 3 with the cost of $50, item 2 with a cost of $65, for an updated total value of $210.

At 512, the mobile device, through a local merchant application, determines an updated value of the tip or a new tip only applicable on the newly added items. The merchant application does so based on the tipping profile at step 508. This is particularly helpful in cases where the mobile device is going in and out of communication network with the PPS. For example, in cases of couriers where the open ticket may close only after the items are delivered to the customer at their home. But at that time the customer may add a few items to the order. If the mobile device is online with respect to the PPS, the tipping profile can be the most recent as accessible from the PPS. However, if the mobile device is offline with respect to the PPS, the tipping profile can be the last known state. The new amount is deducted from the credit card on record. If the credit card is not authorized for the new total, the customer can be asked to provide a second payment object. In some cases, the merchant and customer may have a bill splitting arrangement.

At 514, the merchant closes the ticket. In offline mode, this can be done only after the mobile device comes online. At 516, the merchant indicates that the transaction has been finalized as per adaptive tipping.

The sequence of operations described above is only an example provided for discussion purposes. Numerous other variations are possible.

Figure 6A:
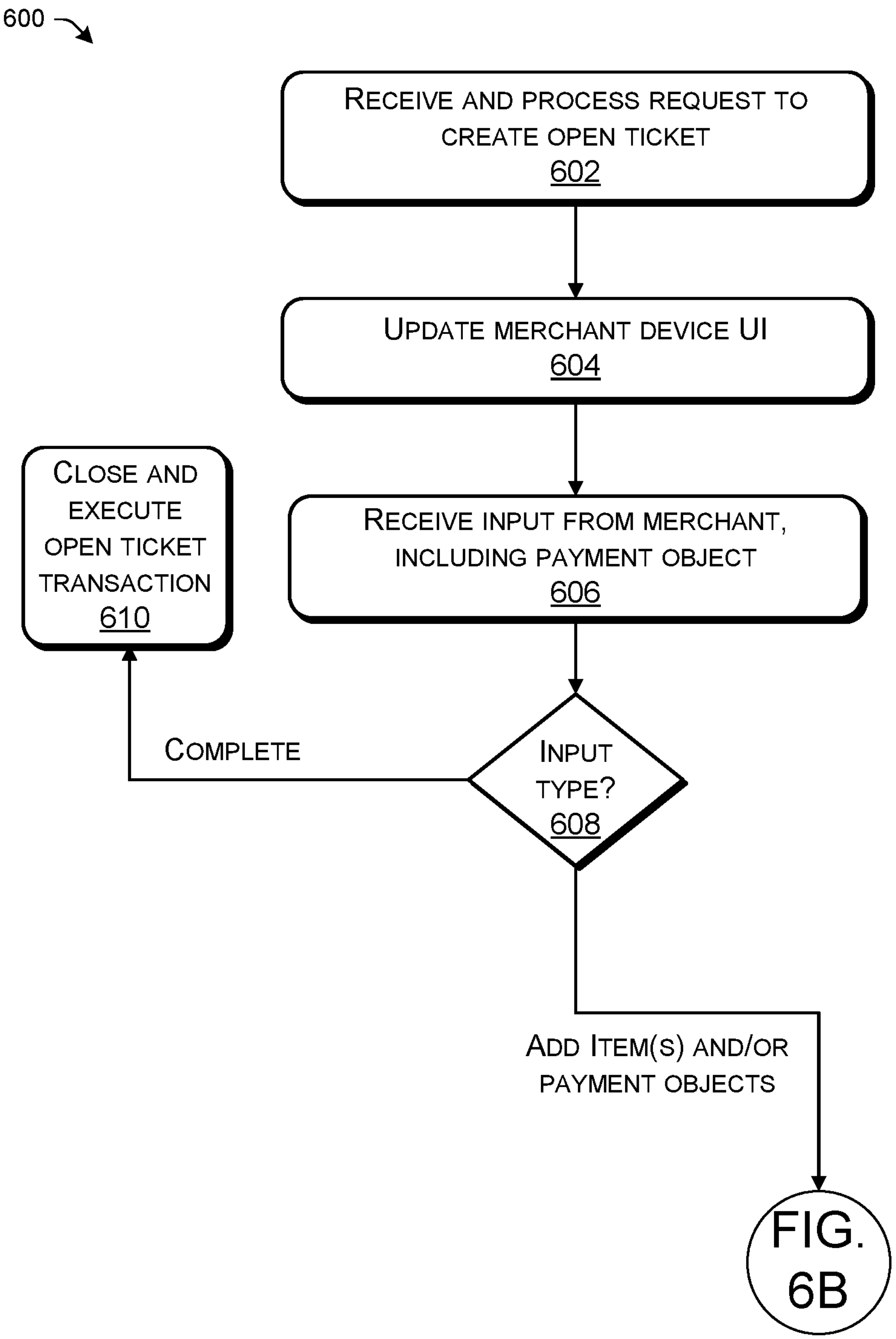
FIGS. 6A and 6B are flow diagrams illustrating an example process for handling tipping in offline mode for example in the context of open ticket transactions, according to an embodiment of the present subject matter.
Figure 6B:
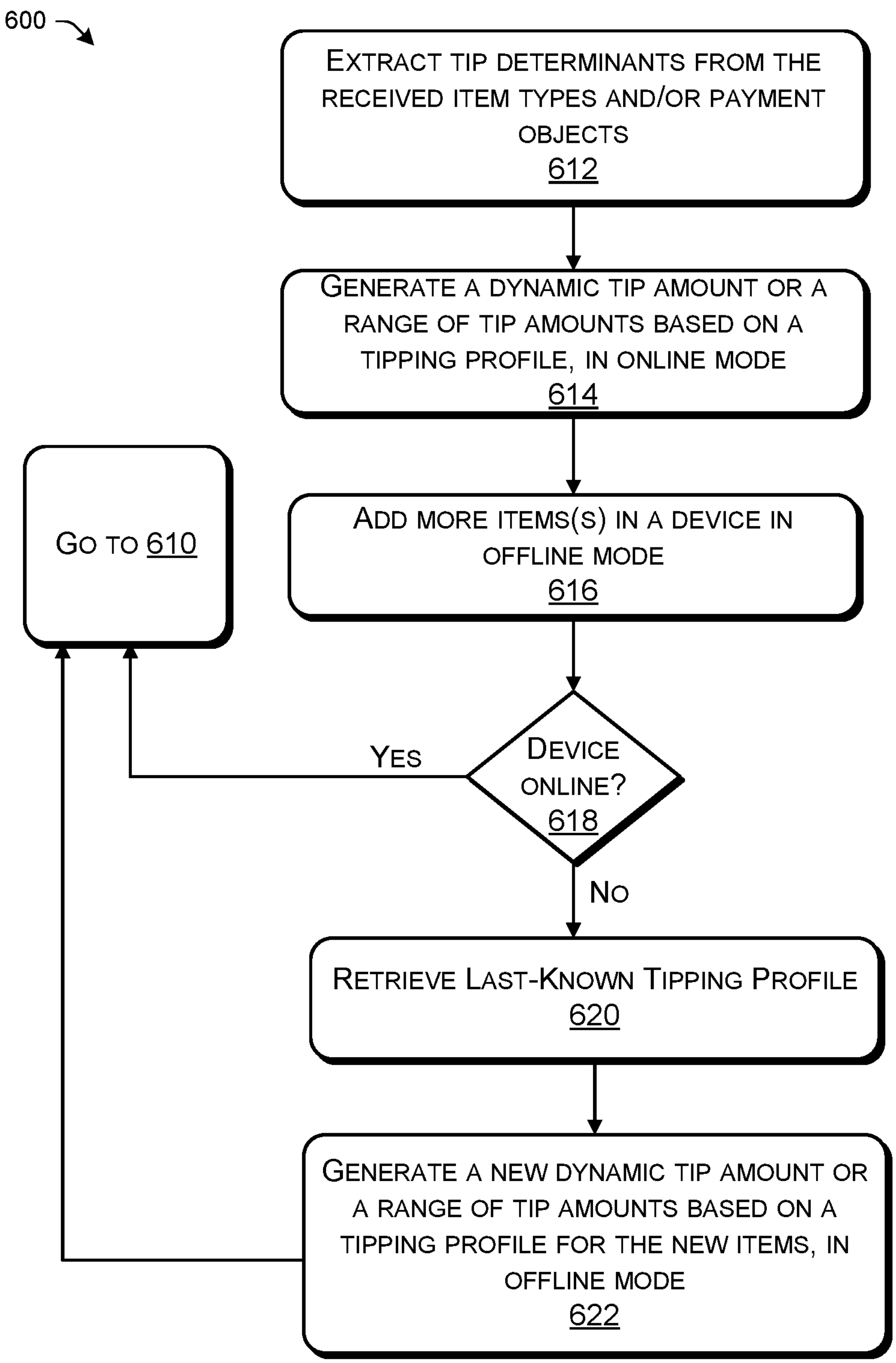

FIGS. 6A and 6B are flow diagrams illustrating an example process 600 for generating gratuity amounts in offline scenarios using an exemplary open ticket implementation, according to an implementation of the present subject matter. The following actions described with respect to FIG. 1-5 and may be performed by the entities of FIG. 1A.

At 602, the POS component receives a request to create an open ticket for the customers and processes the request to create the open ticket. For example, the POS component may create a data record for the open ticket transaction in the database.

At 604, the POS component provides the POS component of the merchant device with the current state of the open ticket and the POS component updates the UI of the merchant device. The user interface may vary from implementation to implementation and may be similar to that shown in FIGS. 5A and 5B or FIGS. 1B-1I. For example, once a payment object and/or items have been added to the open ticket transaction, the POS component may update the UI to display a tipping feature similar to that shown in FIGS. 5A and 5B.

At 606, the POS component receives an input from the merchant to perform a change to the open ticket transaction. For example, the merchant may enter item information and the cost of each item. The customer may also provide his or her payment object at this time along with a limit to how much the merchant is authorized to charge in one open ticket.

At 608, the type of input is determined. In the example process 600, the payment module determines if the input is the addition of a payment object, an addition of one or more items to the open ticket, an allocation adjustment of any bill splitting arrangement and/or an indication that the open ticket transaction is complete and should be executed. If the input is the addition of a payment object or addition of one or more items to the open ticket, the process proceeds to 612 on FIG. 6B. If the input is an allocation adjustment of any bill splitting arrangement, the process includes checking the authorization limit of the payment object and if it is not enough to cover the cost of items, the customer is asked to enter another payment object. This is not shown in the figures. If the input is an indication that the open ticket transaction is complete, the process proceeds to 610.

Turning to FIG. 6B, at 612, the tip determinants are extracted on the basis of the payment object or one or more items added to the open ticket transaction. For example, identity of the merchant, customer, item types, and payment object information is obtained.

At 614, the dynamic tip generator determines an updated total by first computing a dynamic tip amount based at least on the tip determinants as described in FIGS. 1-5. The ip determinants may be weighted, that is some parameters may be more critical than others. In case the payment object is not authorized for the total amount, bill splitting may be instituted. For this, using the updated total and the specific allocations, the POS component determines the non-specific remainder of the total to be split between the non-specific allocation instruments. Since, this is open ticket, the customer can enter more items until the open ticket is open. In one example, the customer can enter additional items at 616.

At 618, if the device on which the receipt is being displayed is online, a new tip amount can be calculated by following step 614. However, if the device is offline, the device may access the last known value of the tip amount and the tipping profile used for the evaluation of the tip amount at step 620. Accordingly, a new tip amount is generated based on the tipping profile at step 622. If no new items are added, the merchant can choose to the close the ticket by following step 610 as before.

At 610, the merchant receives an indication that the open ticket transaction is complete, the PPS attempts to execute the transaction. For example, the open ticket is completed when the customer device or any other device displaying the interactive receipt comes back online. For example, the payment processing system may interact with the card payment network(s), bank computing device(s), payment processing system(s), and so on associated with the payment objects to execute the transaction including the tip amount. More particularly, some implementations may allow the merchant to obtain a signature from the customers associated with the payment objects to be processed, perform any additional authorization operations needed with the card payment network for the final allocated amounts, and print receipt(s) for the customers. The signature/authorization/receipt process may be performed serially (e.g. obtain one signature, authorize the associated payment object and print receipt and repeat for each additional instrument) or in parallel (e.g. obtain a plurality of signatures, authorize the associated payment object(s) for the final allocated amounts and print receipts).

The process 600 described above is only an example provided for discussion purposes. For example, the determinations at 608 and 618 are merely examples and other or additional determinations or options may be included in other implementations. In a particular example variation, additional types of payment objects may be added to the determination at 618 and similar handling may be provided for the additional types of payment objects.

In another example variation, some implementations may provide for the option to exit from the bill splitting operation temporarily to execute the payment transaction for one or more of the payment objects before returning to the bill splitting operation for the remaining payment objects. For example, some implementations may allow the merchant to obtain a signature from the customer associated with the payment object to be processed, perform an authorization operation with the card payment network, and print a receipt for the customer before returning to the bill splitting operation for the remaining payment objects.

Figure 7:
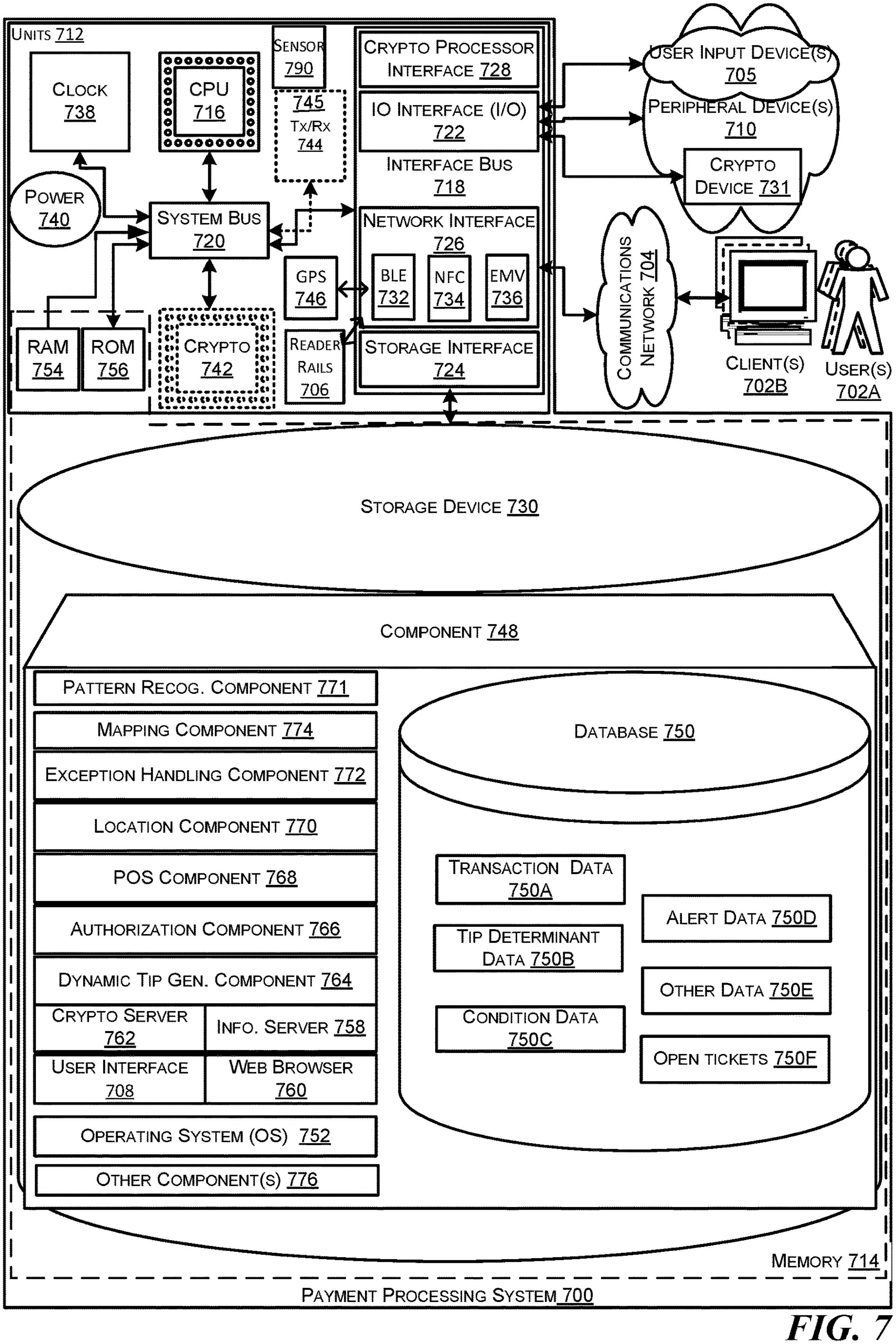
FIG. 7 is a block diagram illustrating components of a payment processing system, according to an embodiment of the present subject matter.

FIG. 7 is a block diagram illustrating embodiments of a PPS 700 configured to allow processing of payment transactions between entities, such as a merchant and a buyer, or a sender and recipient of funds by authorizing transactions initiated by registered devices. In one embodiment, the PPS 700 may serve to aggregate, process, store, search, serve, identify, instruct, generate, match, and/or facilitate interactions with a computer through various technologies, and/or other related data. The PPS 700 may be used to collect data for later retrieval, analysis, and manipulation, which may be facilitated through an internal or external database. For example, the PPS 700 on receiving payment related information may complete the transaction, generate receipt as proof of the transaction, update inventory of the product after the transaction, and obtain data related to the buyer involved in the transaction, such as transaction history, location data, and the like. In some implementations, the components of the PPS 700 can also be found in a buyer device (for example, a mobile phone of a buyer), a merchant device (for example, a point-of-sale terminal for processing payment transactions), and a payment beacon to send and receive static or dynamic information, for example, the payment proxy, transaction summary or receipt, either perpetually or on activation. The devices may have fewer or more components than defined here as will be clear by context.

The PPS 700 may communicate with a POS terminal (e.g., transaction processing software applications executing on a tablet, or a computer) and various neighboring and remote, but connected, devices, such as buyer devices. The PPS 700 has the circuitry and logic to register a new device presented at the time of transaction along with a payment object, and mapping the device with the object or without the object for any subsequent payment transactions. The device may be registered in a variety of ways based on the characteristics that are obtained. For example, if the radiated performance is to be used as a factor in device registration and identification, the antenna transmitter and receiver of the PPS 700 are initialized. In another example, if the manufacturing tolerances are to be measures, components like the sensors and accelerometers of the PPS 700 are activated.

Users 702A, who may be buyers, merchants, consumers, senders or recipients of funds, buyers, sellers, and/or other entities or systems, may engage information technology systems (e.g., computers, mobile devices, laptops, servers) to facilitate processing of information, such as transactional, financial, and so on. It should be noted that the term "server" as used throughout this application refers generally to a computer, other device, program, or combination thereof that processes and responds to the requests of remote users across a communications network. Servers serve their information to requesting "clients" 702B connected to the users 702A. The term "client" or "buyer device" as used herein refers generally to a computer, program, other device, user and/or combination thereof that is capable of processing and making requests and obtaining and processing any responses from servers across a communications network 704. Networks 704 facilitate the transfer of information from source points to destinations. The users (e.g., merchants) may directly interact with the PPS 700, e.g., via the user inputs devices 605.

In one implementation, the PPS 700 can be configured to receive a payment card or payment card information to process payment card transactions (i.e., those involving reading of a payment card physically provided by the buyer at the merchant's location), as well as card-not-present (CNP) transactions (i.e., those where the instrument is not physically presented at the time that the payment is effected, e.g., through payment proxy), either through a card reader 606 or by providing a graphical user interface 708 to accept financial account information of the user 702A initiating the payment. A payment card transaction may be any transaction where a merchant or a buyer uses a payment card to purchase a product or service offered by the merchant, for example, by swiping a user's credit card through a magnetic rails or chip contacts 706 or by providing the information through voice, text, or other wired or wireless data communication techniques. The term "swipe" here refers to any manner of triggering a magnetic rails or chip contacts 706 to read data from a payment card, such as by passing a card into or through a magnetic stripe card reader, optical scanner, smartcard (card with an embedded IC chip) reader (e.g., an EMV-compliant card reader or NFC enabled reader), radio frequency identification (RFID) reader, or the like. The magnetic rails or chip contacts are integrated within the PPS 700 (as shown) or connected externally with the PPS controller 700 and/or client(s) 702B as peripheral devices 710. If the card reader 706 is connected externally, the peripheral devices 710 may be connected via wired or wireless communication network 704 and interact to each other through customized interfaces. In one implementation, the PPS 700 can be connected to an audio plug of another device, such as the POS terminal. If the PPS 700 is integrated within the POS terminal, the one or more interfaces and components can be configured to accept payment data through various communication protocols. Accordingly, hardware implementation may include creation of slots, magnetic tracks, and rails with one or more sensors to facilitate a user 702A, e.g., a merchant, to detect and accept a payment card. In one implementation, the payment card and the peripheral devices 606 may support the same technology for short-range (typically less than 100 meters) and/or low power wireless communication protocols and technologies, such as Bluetooth Low Energy (BLE), standard Bluetooth, WiFi, Near Field Communication (NFC) or Radio-Frequency Identification (RFID). According to the communication protocol preferred or implemented, the PPS 700 may require additional steps to configure the rails or chip contacts 706 to operate and work alongside the PPS 700. For example, a pairing component (described later) may be used to connect, synchronize, and pair various devices to facilitate exchange of data obtained off the payment card.

The term "payment card' or 'payment object' refers to a payment mechanism that includes a conventional debit card, a conventional credit card, a prepaid gift card, or the like, a smartcard that has an embedded integrated circuit chip (e.g., Europay-MasterCard-visa (EMV) card), a proxy card, or any card that functions as a combination of any of these mechanisms. The term "proxy card" as used herein refers to a card that may or may not have a card number/account number that appears to be that of a real credit or debit card account (i.e., it is in the correct format), but where that card/account number is actually only a proxy for the buyer's real card/account number. The card/account number generally adheres to a naming standard set by the financial institution associated with or issuing the payment card. Other examples of payment card may also include a prepaid card, a gift card, a rewards card, a loyalty points card, a frequent flyer miles card, a check, cash, or any other kind of payment instrument that holds financial value or provides a promise to pay at a later time.

The payment card used in the example above is one type of a financial instrument. Other types of financial instruments, other than the payment card, can be used to initiate the transfer of funds. Another example of a financial instrument is a biometrically identifiable instrument, such as a person's finger (e.g., for fingerprint recognition), face, iris or retina, heartbeat, voice pattern, genetic parameter unique to the user, etc. Alternatively, a financial instrument can be a software instrument or virtual instrument, such as a virtual wallet, optionally embedded in a hardware device to enable contact or contactless payments.

Payment Object Reader Architecture

In one implementation, the PPS 700 may be based on computer systems that may comprise, but are not limited to, PPS units 712 and memory 714. Furthermore, PPS units can comprise hardware and/or software components, referred to as PPS units 712, which may comprise a central processing unit ("CPU(s)" and/or "processor(s) and/or microprocessor(s)" (these terms are used interchangeably)) 716 and an interface bus 718, which may be interconnected and/or communicating through a system bus 720 on one or more motherboard(s) having conductive and/or otherwise communicative pathways through which instructions (e.g., binary encoded signals) may travel to enable communications, operations, storage, etc. The interface bus 718 may also include other interfaces or adapters specific to network, storage, peripherals, and input-output interface(s), through which data may pass into and out of a computer and which allow users to access and operate various system components. The interface bus 718 may be connected to external units, such as peripheral devices 710 or client(s) 702B via communication network 704. Each of the exemplary components 712 is now described in detail.

Processor(s)

The CPU 716 may incorporate various specialized processing units, such as, but not limited to: integrated system (bus) controllers, memory management control units, floating point units, and even specialized processing sub-units like graphics processing units, digital signal processing units, and/or the like. In various embodiments, the processor core may be a low-power/ultra-low power/low-cost microcontroller; examples include an Intel Processor like Intel Atom, Apple A4, NVidia Tegra 2, Marvell Armada, Qualcomm Snapdragon, Samsung Hummingbird and Exynos, Texas Instruments OMAP and MSP microcontroller, ARM Holdings processor like the Cortex-A, -M -R, Series, or ARM series and/or the like processor(s). Should processing requirements dictate a greater amount speed and/or capacity, distributed processors (e.g., Distributed PPS 700), mainframe, multi-core, parallel, and/or super-computer architectures may similarly be employed. Alternatively, should deployment requirements dictate greater portability, smaller Personal Digital Assistants (PDAs) may be employed.

Depending on the particular implementation, features of the PPS 700 may be achieved by implementing a microcontroller, such as Freescale's Kinetis K21D; and/or the like. Also, to implement certain features of the PPS 700, some feature implementations may rely on embedded components, such as: Application-Specific Integrated Circuit ("ASIC"), Digital Signal Processing ("DSP"), Field Programmable Gate Array ("FPGA"), and/or the like embedded technology. Depending on the particular implementation, the embedded components may include software solutions, hardware solutions, and/or some combination of both hardware/software solutions.

Interface Bus and Adapters

Interface bus(ses) 718 may accept, connect, and/or communicate to a number of interface adapters, although not necessarily in the form of adapter cards, such as but not limited to: input-output interfaces (I/O) 722, storage interfaces 724, network interfaces 726, and/or the like. Optionally, cryptographic processor interfaces 728 may be connected to the interface bus 718.

Storage interfaces 724 may accept, communicate, and/or connect to a number of storage devices such as, but not limited to: storage devices 730, removable disc devices, and/or the like. Storage interfaces 724 may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), fiber channel, Small Computer Systems Interface (SCSI), Universal Serial Bus (USB), and/or the like.

Input-Output interfaces (I/O) 722 may accept, communicate, and/or connect to user input devices 705, peripheral devices 710, such as externally connected card readers, cryptographic processor devices 731, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); USB 2.0; USB 3.1; USB Type C; Ethernet; infrared; joystick; keyboard; midi; optical; PC AT; PS/2; parallel; radio; video interface: Apple Desktop Connector (ADC), BNC, coaxial, component, composite, digital, Digital Visual Interface (DVI), high-definition multimedia interface (HDMI), RCA, RF antennae, S-Video, VGA, and/or the like; wireless transceivers: 802.11a/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, Li-Fi etc.); and/or the like. In various embodiments, an audio or video display with a touch screen and driver may be included, the touch screen being based upon a variety of later-developed or current touch screen technology including resistive displays, capacitive displays, optical sensor displays, electromagnetic resonance, or the like. Additionally, touch screen display may include single touch or multiple-touch sensing capability. Any display technology may be used for the output display, such as a Liquid Crystal Display (LCD) or solid state device such as light-emitting diode (LED) or organic light-emitting diode (OLED), Plasma display, trans-reflective (Pixel Qi) display, electronic ink display (e.g. electrophoretic, electrowetting, interferometric modulating). In various embodiments, the resolution of such displays and the resolution of such touch sensors may be set based upon engineering or non-engineering factors (e.g. sales, marketing). In some embodiments, speakers and LED indicators can be used to present audio and visual identifiers of transaction and device status. In addition, buttons may be configured to power PPS 700 on or off, operate the controller or reset the controller 600.

In some embodiments of the PPS 700, image capture device may be included, which may further include a sensor, driver, lens and the like. The sensor may be based upon any later-developed or convention sensor technology, such as CMOS, CCD, or the like. Image recognition components may be provided to process the image data. For example, such components can support functionalities including, but not limited to, barcode detection, facial recognition, camera parameter control, etc.

Network interface(s) 726 may be regarded as a specialized form of an input-output interface. One or more network interfaces 726 may be used to engage with various communications network types 704. For example, multiple network interfaces may be employed to allow for the communication over broadcast, multicast, and/or unicast networks. Through a communications network 704, the PPS controller 700 is accessible through remote clients 702B (e.g., computers with web browsers) by users 702A. Network interfaces 726 may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers (e.g., Distributed PPS architectures may similarly be employed to pool, load balance, and/or otherwise increase the communicative bandwidth required by the PPS 700.

In some implementations, the network interfaces 726 may be communicatively coupled to hardware components, which facilitate detection of payment cards. For example, the network interfaces 726 may couple to a payment card slot or rail designed to accept payment cards through swipe or insertion or any other action. In another example, the network interfaces 726 may couple to one or more sensors included to detect presence of payment card or a tap of the payment card onto a surface of the PPS 700.

In various embodiments, the network interface 726 may also support wireless data transfers between the PPS 700 and external sources, such as clients 602B and cameras, or the like. Wireless protocols may include Wi-Fi (e.g. IEEE 802.11a/b/g/n, WiMax), Bluetooth or Bluetooth low energy (BLE); infrared, and the like, through BLE interface, WiFi interface, QR interface, NFC interface, EMV interface, cellular technology interface, and other interface(s), described subsequently.

According to one implementation, BLE interface ("BLE") 732 is configured to work on Bluetooth® or BLE® protocol to facilitate communication with a BLE transceiver installed on other devices. In one implementation, BLE is intended for low-power and low-latency applications for wireless devices within a short range, such as up to about 50 meters. BLE interface 732 may be used in applications requiring intermittent communications, smaller amounts of data transfer and bandwidths, and/or low duty cycles. BLE interface 732 can be configured to use only a fraction of the power as compared to other interfaces. In many cases, BLE interface 732 may be able to operate more than a year on the power source without charging.

BLE interface 732 is capable of being paired with a peripheral device, such as another reader, a payment card, or a client 702B associated with a user 702A, thus allowing the PPS 700 to (a) serve as a "beacon" and broadcast data and/or (b) become a relay point between the PPS 700 and payment card, card reader 706 or a client 702B serving as a point of sale terminal for a merchant. The BLE interface 732 allows the controller 700 with BLE interface 732 can be placed at merchant locations, museums, ski resorts, state parks, entertainment venues, parking garages, etc.

As defined herein, a beacon is a short range communication device having a known or fixed location that provides a signal that can be detected by mobile devices within proximity of the beacon. For example, BLE interface 732 can transmit a radio frequency (RF) signal that includes its position coordinates (e.g., latitude, longitude), which can be detected by a mobile device. Alternatively, BLE interface 732 can transmit other data, such as payment proxy related to the financial account information of the user 702B.

The PPS 700 BLE beacon allows for constant, scheduled or random scanning of other Bluetooth peripherals and devices. In one implementation, a component, such as BLE interface component, within the PPS 700 and/or the client 702B can be set to run in the background under a BLE protocol, persistently, intermittently or on activation monitoring for a significant change in location and/or presence of an appropriate BLE peripheral or beacon at a merchant or vendor location. BLE beacon also allows for persistent or intermittent transmission of data. For example, BLE beacon may persistently transmit or receive information related to payment proxy associated with the client 702B or PPS 700.

When the owner or user of the client 702B or payment card enters a store having PPS 700 as a point of sale terminal, he or she would get in the BLE network radius of the PPS 700. PPS 700 then serves as a bidirectional conduit for the card reader 706 to communicate with the CPU 724 collecting or handling the credit card transaction. Along with receiving transaction data or any other data by the BLE interface 732, the PPS 700 may also encrypt, decrypt, or store the data for future processing. It does these actions in addition to running the payment application itself, which may display items for sale, up-sell based on purchases, allow confirmation of purchases, application of coupons, the ability to provide feedback, etc.

In one implementation, the PPS 700 or the client 702B may be connected to a BLE peripheral device having BLE interface 732 functionalities. In some implementations, the payment card may include a chip supporting BLE functionalities. A control logic unit (not shown) may also be included to bridge BLE interface either to ISO 7816 contact interface or ISO 14443 contactless interface to provide for autonomous bi-directional data transfer between paired devices. In one implementation, the PPS 700 is capable of communicating using Bluetooth, and is thus able to pair with a peripheral device 710 to obtain payment object information from a phone that at least has Bluetooth capabilities. In one implementation, a plurality of BLE peripheral devices may be connected via the BLE protocol, or other communication network, to form a mesh network. Such a mesh network may allow for transfer of data between the peripheral devices, even those that are more than the distance prescribed by the BLE protocol.

Similar to BLE beacons, data can be exchanged using other kind of RF beacons, infrared beacons, cellular communications (CDMA, GSM, LTE, etc.), beacons, pattern generation beacons, such as barcodes, Quick Response (QR) codes, or a radio frequency identifier (RFID) tag. QR code or NFC may have short range but high accuracy; Wi-Fi or Bluetooth may have mid-range and medium accuracy; and cellular may have long-range but low accuracy. In some embodiments, the controller 700 can receive and permanently store payment information so that the controller 600 acts as a payment object that does not require a payment card or other payment object to be present.

In one example, an NFC interface 734 ("NFC") can allow for close range communication using standards such as ISO 18092, ISO 21481, TransferJet® protocol and in compliance with FIME certifications. Close range communication with the NFC interface may take place via magnetic field induction, allowing an NFC interface chip 634 to communicate with other NFC devices or to retrieve information from tags having RFID circuitry via the NFC interface. In instances where it is desired to read an NFC enabled payment object, or an NFC enabled payment object is determined to be in proximity to the CPU 716 may be configured to drive antenna 745 via a driving circuit (not shown) to induce a magnetic field capable of being modulated by the NFC enabled payment object. From here, the modulated magnetic field signal may be converted into a digital signal that CPU 716 can interpret via the NFC component 734. On the other hand, when it is desired to transmit data via antenna 745, CPU 716 may be configured to disable the driving circuit and transmit data using the NFC protocol by instructing a NFC modulator (not shown) to modulate the magnetic field to which antenna 745 is operatively coupled. In some embodiments, there can be a switch within the NFC modulator to turn on or off the load applied to the antenna 745. The switch can be under the control of the CPU 716. In some embodiments the antenna 745 can drift from a desired frequency (become detuned). This can be the result of a metal object being in the proximity of device 610 or reader 700. The monitor circuit (not shown) can monitor the frequency of the antenna 745, and determine when the frequency of the antenna 745 has drifted away from the desired frequency. When the it is determined that the NFC antenna 745 is out of tune, NFC antenna monitor circuit can work in concert with the CPU 716 to vary one or parameters such as capacitance, voltage, or impendence of the antenna 745 to tune the NFC antenna 745. The antenna 745 along with transmitter-receiver 644 is configured to detect characteristics, such as radiated performance, radiated signal strength, frequencies, etc., via radio communication protocol.

In another example, an EMV interface 736 ("EMV") can allow the PPS 700 to accept Chip and PIN cards follow technical standards more formally known as EMV, after Europay, MasterCard and Visa (EMV). In one implementation, the EMV interface complies with EMV's Level 1, Level 2 and Level 3 certifications. In some instances, CPU 716 receives payment data read by the EMV interface 736 via the card contacts (not shown), or alternatively from a magnetic stripe reader reading payment data from a magnetic stripe card. The payment data received at the CPU 716 is stored, either temporarily or permanently, in memory 714 of the reader 700. The payment data stored in memory can then be transmitted via the NFC antenna 718. The network interfaces 626 may work in conjunction with components explained later.

In other implementations, a plurality of beacon technologies may be used based on specific accuracy or power requirements. Such technologies may be combined based on weight or some other relationship. In yet another implementation, selections may be made based on user preference or availability of the beacon technology at that time. For example, the reader 700 may be configured to provide and detect a plurality of beacons. For example, if a camera is on, a QR code on the client 702B display may be read, for example to pair two payment devices. If only cellular is on, a modem may detect a femtocell may be nearby. The client 702 B, such as a merchant's register or point of sale terminal, may combine data from the multiple beacons and use such data for analysis of transactions over a course of time. For example, the buyer device 702B may be configured to use Wi-Fi RSSI/RTT and BT RSSI/RTT measurements from a first beacon, QR code value from a second beacon, and WiFi RSSI and cellular measurements from a third beacon for accurately identifying and establishing secured connections with the buyer device 702B.

The beacons can be dynamic with data and other beacon parameters changing as per environment or the type of device pairing with the reader 700; in other implementations, the beacons can be static and displayed using LED displays, electronic displays, or the like, described with reference to I/O interface. In one embodiment, the PPS 700 may also be connected to and/or communicate with entities such as, but not limited to: one or more users, for example users 602A, associated with user input devices 705; one or more users 602A through their respective buyer devices 702B; peripheral devices 710; an internal or external cryptographic processor device 731; and/or a communications network 704.

Communications Network

The network 704 can include any combination of local area and/or wide area networks, using both wired and wireless communication systems. In some embodiments, the network 704 uses standard communications technologies and/or protocols. Thus, the network 704 can include links using technologies such as Ethernet, 802.11, a Wi-Fi, a Bluetooth network; and/or the like worldwide interoperability for microwave access (WiMAX), 3G, 4G, CDMA, digital subscriber line (DSL), etc. Similarly, the networking protocols used on the network 608 may include multiprotocol label switching (MPLS), transmission control protocol/Internet protocol (TCP/IP), hypertext transport protocol (HTTP), and/or file transfer protocol (FTP). Data exchanged over the network 708 can be represented using technologies and/or formats including hypertext markup language (HTML) or extensible markup language (XML). In addition, all or some links can be encrypted using conventional encryption technologies such as secure sockets layer (SSL), transport layer security (TLS), and Internet Protocol security (IPsec). Additionally, the communication network may be a mesh network. For example, in a wireless local area network (WLAN), network devices may be configured to receive and forward communications which are ultimately destined for a different device. These types of networks are generically referred to as "mesh" networks, where network nodes may form a "mesh" of paths for which communications may travel to reach their destination. Wireless networks may use beacon transmissions to advertise the network's existence, as well as provide information about the network and capabilities associated with the network. Different kinds of beaconing mechanisms may be used, for example, one for infrastructure mode networks (also called basic service set (BSS) networks) and one for ad-hoc mode networks (also called independent basic service set (IBSS) networks). In infrastructure networks, access points (APs) are the entities responsible for generating beacons whereas in ad hoc networks, all network nodes (including user stations) participate in the generation of beacons. The ad hoc network beacons (referred to as IBSS beacons) are used to advertise the network (which consists of all the nodes) as a whole while the infrastructure network beacons (referred to as BSS beacons) are generated by an AP and meant to advertise the existence of only that individual AP.

Clock

Clock 738 may have a crystal oscillator that generates a base signal through the reader's circuit pathways. The clock 738 may be coupled to the system bus 720 and various clock multipliers that increase or decrease the base operating frequency for other components interconnected in the PPS 700.

Power Source

The units 712 may also include a power source 740. The power source 640 may be of any form capable of powering small electronic circuit board devices such as the following power cells or batteries: alkaline, lithium hydride, lithium ion, lithium polymer, nickel cadmium, solar cells, and/or the like. Other types of AC or DC power sources may be used as well. The power source 740 is connected to at least one of the interconnected subsequent components of the PPS 700 thereby providing an electric current to all subsequent components. In one example, the power source 740 is connected to the system bus 704. In an alternative embodiment, an outside power source 740 is provided through a connection across the I/O 722 interface. For example, a USB connection can carry both data and power across the connection and is therefore a suitable source of power. To this end, coupled to power source 740 may be a USB micro interface (not shown) configured to receive a USB micro jack, although other types of connectors are anticipated. In certain embodiments, connection of a jack to USB micro interface can activate a switch within power source 740 to override power supplied by the battery. This allows for battery power to be conserved for situations where external power cannot be provided. Furthermore, power source 740 may also include a battery charger to allow the battery to be charged when external power is supplied via USB micro interface.

In one implementation, the power source 740 may include a selector (not shown) to selectively power one or more units within the PPS 700. For example, the power source 740 may power the BLE network interface and BLE component and power the CPU 716 only on receiving a wake up signal, using an activation signal, triggered by a tactile, visual, or audio input. To this end, the PPS 700 may include wake-up electronics (not shown) configured to wake-up the PPS 700 from a low-power state to an active state in response to detection of a payment object. In some embodiments, wake-up electronics can also power down PPS 700 to a low-power state after a predetermined amount of time or after completion of a communication.

Cryptographic Processor

A cryptographic processor 642 and/or transceivers (e.g., ICs) 644 may be connected to the system bus 620. In another embodiment, the cryptographic processor and/or transceivers may be connected as either internal and/or external peripheral devices 610 via the I/O interface bus 622. To this end, the transceivers 644 may be connected to antenna(s) 645, thereby enabling wireless transmission and reception of various communication and/or sensor protocols. For example the antenna(s) may connect to a transceiver chip or a wireless microcontroller targeting Bluetooth applications, e.g., providing 802.11n, Bluetooth 4.2, Bluetooth 2.1+EDR, FM, GSM/EDGE/GPRS/2G/3 G/HSDPA/HSUPA/LTE (4G) communications, global positioning system (GPS) thereby allowing PPS 700 to determine its location, for example. A separate GPS unit 746 (also referred to as the location component) may be used to determine the location of a merchant or buyer performing a payment transaction using a payment card. The GPS unit may work on any of the protocols mentioned above. The location information may be used to advertise location specific information to the user.

Furthermore, the communicative instructions may be stored and/or transmitted in batches (e.g., batches of instructions) as programs and/or data components to facilitate desired operations.

Peripheral Devices

Peripheral devices 710 may be connected and/or communicate to I/O interface 722 and/or other facilities of the like such as network interfaces, storage interfaces, directly to the interface bus 718, system bus, the CPU, and/or the like. Peripheral devices 710 may be external, internal and/or part of the PPS 700. Peripheral devices 710 may include: antenna, audio devices (e.g., line-in, line-out, microphone input, speakers, etc.), cameras (e.g., still, video, webcam, etc.), dongles (e.g., for ensuring secure transactions with a digital signature, and/or the like), external processors (for added capabilities; e.g., crypto devices 731), force-feedback devices (e.g., vibrating motors), network interfaces, printers, scanners, storage devices, transceivers (e.g., cellular, GPS, etc.), video devices (e.g., goggles, monitors, etc.), video sources, visors, and/or the like.

The card reader 700 may comprise user interfaces, such as, for example, a PC/SC EMV L1/L2/NFC certified Smart Card Reader, a keypad for PIN entry, such as key keypad, a display, such as the illustrated LCD display, etc., and electrical interfaces, an interface for back-up battery power, an interface for a display, a power interface, LED lights for indicating status of a transaction, a buzzer, etc. The card reader may be, for example, PCI v3 compliant and configured to facilitate the acceptance of credit/debit card payments.

A sensor 790 may be included. In some embodiments, the sensor 790 may include accelerometers, antenna decouplers, signal generator, signal modification and conditioning components to detect certain characteristics of neighboring devices. The characteristics are generally physical, mechanical or design related. The sensor 790 is also capable of sending and receiving signals or test parameters, the parameters are then compared internally to determine whether the values correspond to a known device.

Peripheral devices 710 may also include sensors, devices, and subsystems can be coupled to network interface to facilitate multiple functionalities. For example, motion sensor, magnetic, light sensor, and proximity sensor can be coupled to network interface to facilitate orientation, detection, lighting, and proximity functions of the PPS 700, by analyzing any input, such as audio, visual, tactile, mechanical, electrical, magnetic, hydraulic, electromagnetic input, and the like. Location processor (e.g., GPS receiver similar to GPS 646) can be connected to the network interface to provide geo-positioning. Motion sensor can include one or more accelerometers configured to determine change of speed and direction of movement of the PPS 700. Magnetic sensors may detect presence or absence of a payment card and differentiate a payment card from other cards.

Peripheral devices 710 may also include a camera subsystem and an optical sensor, e.g., a charged coupled device (CCD) or a complementary metal-oxide semiconductor (CMOS) optical sensor, can be utilized to facilitate camera functions, such as recording photographs and video clips.

Peripheral devices 710 may also include an audio subsystem can be coupled to a speaker and a microphone to facilitate voice-enabled functions, such as voice recognition, voice replication, digital recording, and telephony functions. Audio subsystem can be configured to receive voice commands from the user.

Peripheral devices 710 may also include an I/O subsystem that can include touch surface controller and/or other input controller(s). Touch surface controller can be coupled to a touch surface or pad. Touch surface and touch surface controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch surface. Touch surface can include, for example, a touch screen.

Other input controller(s) can be coupled to other input/control devices, such as one or more buttons, rocker switches, thumb-wheel, infrared port, USB port, and/or a pointer device such as a stylus. The one or more buttons (not shown) can include an up/down button for volume control of speaker and/or microphone.

In one implementation, a pressing of the button for a first duration may disengage a lock of the touch surface; and a pressing of the button for a second duration that is longer than the first duration may turn power to PPS controller 100 on or off. The user may be able to customize a functionality of one or more of the buttons. The touch surface can, for example, also be used to implement virtual or soft buttons and/or a keyboard. The touch surface may also activate the PPS controller to actively relay information. At all other times, the reader 700 may be dormant to conserve power.

User input devices 705 often are a type of peripheral device 710 (see below) and may include: card readers, dongles, finger print readers, gloves, graphics tablets, joysticks, keyboards, microphones, mouse (mice), remote controls, retina readers, touch screens (e.g., capacitive, resistive, etc.), trackballs, trackpads, sensors (e.g., accelerometers, ambient light, GPS, gyroscopes, proximity, etc.), styluses, and/or the like. The card readers, as mentioned before, may be configured to read a variety of payment cards. Such card readers may either be dongle like or puck style.

Cryptographic units such as, but not limited to, microcontrollers, processors 716, interfaces 718, and/or devices 731 may be attached, and/or communicate with the PPS 700. Cryptographic units support the authentication of communications from interacting agents, as well as allowing for anonymous transactions. Cryptographic units may also be configured as part of the CPU.

It should be noted that although user input devices 705 and peripheral devices 710 may be employed, the PPS 700 may be embodied as an embedded, dedicated, and/or monitor-less (i.e., headless) device(s), wherein access would be provided over a network interface connection. Additionally, part or all peripheral devices may be integrated within the PPS 700.

Memory

Memory 714 may further include, but is not limited to, one or more components 748 that include programs that supplement applications or functions performed by the PPS 700, database 750, operating system 752, random access memory (RAM) 754, read only memory (ROM) 756, and storage device 730, etc., into which data may be saved that serves, amongst other things, as repository for storing data pertinent to functioning of the components.

The PPS 700 may employ various forms of memory 614, such as ROM 754, and a storage device 730. Storage devices may include a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like.

PPS Components

The memory 714 may contain a collection of program and/or database components and/or data such as, but not limited to: operating system component(s) 752 (operating system); information server component(s) 758 (information server); user interface component(s) 708 (user interface); Web browser component(s) 760 (Web browser); database(s) 750; cryptographic server component(s) 762 (cryptographic server); the component(s) 748; and/or the like (i.e., collectively a component collection). These components 748 may be stored and accessed from the storage devices and/or from storage devices accessible through an interface bus 718.

Operating System

The operating system component 752 is an executable program component facilitating the operation of the PPS 700. The operating system can facilitate access of I/O, network interfaces, peripheral devices, storage devices, and/or the like. In various embodiments, any number of current or future operating systems may be supported such as: any highly fault tolerant, scalable, portable, ROM-able, real-time, deterministic, multitasking and secure kernels systems, e.g., μC/OS-III, μC/OS-III, Apple Macintosh OS X (Server); Unix and Unix-like system distributions; Linux distributions; limited and/or less secure operating systems, e.g., AppleMacintoshOS, MicrosoftWindows XP, Windows Server2003, Windows Server 2008, Windows Server2012, Windows Vista®, Windows 7, and Windows 8, Blackberry OS (e.g., Blackberry 10), Firefox OS, Sailfish OS, Tizen, Ubuntu Touch OS, Chrome OS, iPhone OS (e.g. iOS), WindowsMobile (e.g. Windows 10 Mobile), Google Android (e.g. Lollipop 5.1); and/or the like. In various embodiments of the present subject matter, the operating system may be a multi-threaded multi-tasking operating system. Accordingly, inputs and/or outputs from and to a display and inputs/or outputs to physical sensors may be processed in parallel processing threads. In other embodiments, such events or outputs may be processed serially, or the like. Inputs and outputs from other functional blocks may also be processed in parallel or serially, in other embodiments, such as image acquisition device and physical sensors.

The operating system 752 may provide communications protocols that allow the PPS 700 to communicate with other entities through a communications network 713. Various communication protocols may be used by the PPS 700 as a subcarrier transport mechanism for interaction, such as, but not limited to: multicast, TCP/IP, UDP, unicast, and/or the like.

Information Server

The information server 758 may: support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols; provide results in the form of Web pages to Web browsers; and allows for the manipulated generation of the Web pages through interaction with other program components.

Web Browser

A Web browser component 760 is a stored program component that is executed by a CPU. The Web browser may be a hypertext viewing application such as Google Chrome or Macintosh Safari. Web browsers and like information access tools may be integrated into PDAs, cellular telephones, and/or other mobile devices. Also, in place of a Web browser and information server, a combined application may be developed to perform similar operations of both. The combined application would similarly affect the obtaining and the provision of information to users, user agents, and/or the like from the enabled nodes. The web browser may be coupled to a web server (not shown). In other implementations, the PPS 700 may host a website (hereinafter, "system website") that includes one or more graphical user interfaces (GUIs) for organizing and presenting content to users. For example, through the system website, users create account logins to connect to their social identities (e.g., social profiles or social accounts), read content (e.g., messages, comments, posts), create or post content, communicate in real-time with other users (e.g., chat), and/or otherwise engage or interact with other users of the system website (e.g., "friends," "followers," "social contacts," or other types of social network connections). In some embodiments, the user interactions on the system website lead to internal API communication, which involves the PPS 700 monitoring the user interactions for an indication of an intent to transfer money, sending, in response to such indication, requests (e.g., POST or GET requests) to the API of the server(s) to query the database(s) 750, and displaying the data returned by the API of the server(s) as appropriate. The indication of the intent is determined may be based on an identification of a user input, e.g., a string of characters, that has a particular syntax, the syntax being a monetary indicator preceding one or more alphanumeric characters. The user input having the syntax operates as a trigger to send money to a payment proxy represented by the user input.

User Interface

The user interface 708 may allow for the display, execution, interaction, manipulation, and/or operation of program components and/or system facilities through textual and/or graphical facilities through one or more interaction interface elements, such as check boxes, cursors, menus, scrollers, and windows (collectively and commonly referred to as widgets) to facilitate the access, capabilities, operation, and display of data and computer hardware and operating system resources, and status. Graphical user interfaces (GUIs) 708 may be used to provide a baseline and means of accessing and displaying information graphically to users. The user interface may also be a graphic user interface as provided by, with, and/or atop operating systems and/or operating environments such as already discussed.

Cryptographic Server

A cryptographic server component 762 is a stored program component that is executed by a CPU 716, cryptographic processor 742, cryptographic processor interface 728, cryptographic processor device 731, and/or the like, to enable encryption schemes allowing for the secure transmission of information across a communications network to enable the PPS. components to engage in secure transactions. The cryptographic server 762 facilitates the secure accessing of resources on the PPS and facilitates the access of secured resources on remote systems; i.e., it may act as a client and/or server of secured resources. Cryptographic processor interfaces 728 can allow for expedition of encryption and/or decryption requests by the cryptographic component. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MDS, which is a one way hash operation), passwords, Secure Socket Layer (SSL), Secure Hypertext Transfer Protocol (HTTPS), and/or the like. Employing such encryption security protocols, the PPS 700 may encrypt all incoming and/or outgoing communications.

The PPS 700 may be associated with a secure enclave unit (not shown) that may represent any logic, circuitry, hardware, or other structures for creating and maintaining a secured, protected, or isolated environment, in which an application or other software may run, execute, be loaded, or otherwise be present an information processing system. The secure enclave unit may further include encryption unit (not shown), which may include any logic, circuitry, or other hardware to execute any one or more encryption algorithms and the corresponding decryption algorithms, and may include logic, circuitry, or other hardware shared with another encryption unit in processor. In one embodiment, the secure enclave unit includes the digital signatures, and biometric payment instruments created thereof.

Database

The database component 750 may be a fault tolerant, relational, scalable, secure database, such as Oracle or Sybase. Alternatively, the database 750 may be implemented using various data-structures, such as an array, hash, (linked) list, struct, structured text file (e.g., XML), table, and/or the like. Such data-structures may be stored in memory and/or in structured files. In another alternative, an object-oriented database may be used. Also, the database may be implemented as a mix of data structures, objects, and relational structures.

In one embodiment, the database 750 includes several data tables 750A-E. A transaction data table 750A includes fields such as, but not limited to: transaction information, service code, POS entry code, CVV, CVV2, limit to authorization, value of gift card, and/or the like. A tip determinant table 750B includes fields such as, but not limited to: merchant, customer, item type, item count, item expiration, card type, card value, location coordinates, tipping profile, tipping behavior, historical data, fingerprint, and the like. A condition 750C includes fields such as, but not limited to: location coordinates, connection status, communication channel, open communication port, time of day, exception, and the like. An alert data table 750D includes fields such as, but not limited to: receipt generated, engagement received, feedback received, etc. An other data table 750E includes fields such as, but not limited to: authorization flag, rejection flag, and the like.

In one embodiment, specific tables may be created when each of the components are executed. Furthermore, the tables may be stored temporarily or permanently in the database 750.

Components

The component(s) 748 is a stored program component that is executed by the CPU 716. In one embodiment, the PPS component 748 incorporates any and/or all combinations of the aspects of the PPS 700 that was discussed in the previous figures. As such, the PPS 700 affects accessing, obtaining and the provision of information, services, transactions, and/or the like across various communications networks.

Examples of components include, but are not limited to, dynamic tip generation component(s) 764, Authorization component(s) 766, POS component(s) 768, location component 770, pattern recognition component 771, exception handling Component 772, mapping component(s) 774, and other component(s) 776. The dynamic tip generation component 764 receives data from POS terminals and determines based on tip determinants what should the value of adaptive tip be. The authorization component 766 may allow and enable the PPS 700 to accept the payment instruments and authorize payment transactions. The POS component 768 may allow and enable the PPS 700 to accept payment object data, e.g., from the credit card or NFC based payment methods, and process or transfer the transaction data to an external server, such as a payment processing system and financial network system, to obtain financial account information of users to fulfill a transaction. The location component(s) 770 tracks the user's mobile device and the merchant point of sale device to push information based on proximity through for example, short-range communication networks, such as Bluetooth, BLE, and NFC technologies. The pattern recognition component 771 allows and enables the PPS 700 to analyze the data corresponding to tip determinants and generate tipping profiles and map relationships between buyer and seller.

The exception handler component 772 detects any exceptions as per the conditions set by the customer or the merchant. For example, the customer may set the condition to override the dynamic tip at a particular merchant location or time of the day.

The mapping component(s) 774 may allow and enable the PPS 700 to map the tipping profiles to merchants, buyers, merchant locations, item types or payment objects.

The structure and/or operation of any of the PPS 700 components may be combined, consolidated, and/or distributed in any number of ways to facilitate development and/or deployment. To this end, one may integrate the components into a common code base or in a facility that can dynamically load the components on demand in an integrated fashion. The components may be consolidated and/or distributed in countless variations through standard data processing and/or development techniques. Multiple instances of any one of the program components may be instantiated on a single node, and/or across numerous nodes to improve performance through load-balancing and/or data-processing techniques. Furthermore, single instances may also be distributed across multiple controllers and/or storage devices; e.g., databases.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components. The grammar syntax itself may be presented as structured data that is interpreted and/or otherwise used to generate the parsing mechanism. Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

Regarding the processes 200 and 600 while the various steps, blocks or sub-processes are presented in a given order, alternative embodiments can perform routines having steps, or employ systems having steps, blocks or sub-processes, in a different order, and some steps, sub-processes or blocks can be deleted, moved, added, subdivided, combined, and/or modified to provide alternative or sub-combinations. Each of these steps, blocks or sub-processes can be implemented in a variety of different ways. Also, while steps, sub-processes or blocks are at times shown as being performed in series, some steps, sub-processes or blocks can instead be performed in parallel, or can be performed at different times as will be recognized by a person of ordinary skill in the art. Further, any specific numbers noted herein are only examples; alternative implementations can employ differing values or ranges.

While aspects of the described subject matter can be implemented in any number of different systems, circuitries, environments, and/or configurations, the embodiments are described in the context of the following exemplary system(s) and configuration(s). The descriptions and details of well-known components are omitted for simplicity of the description. It will thus be appreciated that those skilled in the art will be able to devise various arrangements that, although not explicitly described or shown herein, embody the principles of the present subject matter. Furthermore, all examples recited herein are intended to be for illustrative purposes only to aid the reader in understanding the principles of the present subject matter and the concepts contributed by the inventor(s) to furthering the art, and are to be construed as being without limitation to such specifically recited examples and conditions. Moreover, all statements herein reciting principles, aspects, and embodiments of the present subject matter, as well as specific examples thereof, are intended to encompass equivalents thereof. Some recurring terms are now described. These definitions should not be considered limiting.

It should also be appreciated by those skilled in the art that any block diagrams, steps, or sub-processes herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown. The order in which the methods are described are not intended to be construed as a limitation, and any number of the described method blocks can be deleted, moved, added, subdivided, combined, and/or modified in any order to implement the methods, or an alternative combination or sub-combinations. Also, while steps, sub-processes or blocks are at times shown as being performed in series, some steps, sub-processes or blocks can instead be performed in parallel, or can be performed at different times as will be recognized by a person of ordinary skill in the art. Further any specific numbers noted herein are only examples; alternative implementations can employ differing values or ranges. Furthermore, the methods can be implemented in any suitable hardware, software, firmware, or combination thereof.

Reference to an "embodiment" in this document does not limit the described elements to a single embodiment; all described elements may be combined in any embodiment in any number of ways. Furthermore, for the purposes of interpreting this specification, the use of "or" herein means "and/or" unless stated otherwise. The use of "a" or "an" herein means "one or more" unless stated otherwise. The use of "comprise," "comprises," "comprising," "include," "includes," and "including" are interchangeable and not intended to be limiting. Also, unless otherwise stated, the use of the terms such as "first," "second," "third," "upper," "lower," and the like do not denote any spatial, sequential, or hierarchical order or importance, but are used to distinguish one element from another. It is to be appreciated that the use of the terms "and/or" and "at least one of", for example, in the cases of "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Additionally, note that the terms "connected" or "coupled" and related terms used throughout the description are used in an operational sense and are not necessarily limited to a direct physical connection or coupling. Thus, for example, two devices may be coupled directly, or via one or more intermediary media or devices. As another example, devices may be coupled in such a way that information can be passed there-between, while not sharing any physical connection with one another. Based on the disclosure provided herein, one of ordinary skill in the art will appreciate a variety of ways in which connection or coupling exists in accordance with the aforementioned definition.

The term "cause" and variations thereof, as used throughout this description, refers to either direct causation or indirect causation. For example, a computer system can "cause" an action by sending a message to a second computer system that commands, requests or prompts the second computer system to perform the action. Any number of intermediary devices may examine and/or relay the message during this process. In this regard, a device can "cause" an action even though it may not be known to the device whether the action will ultimately be executed or completed.

In some implementations, the network(s) may be any type of network known in the art, such as a local area network or a wide area network, such as the Internet, and may include a wireless network, such as a cellular network, a cloud network, a local wireless network, such as Wi-Fi and/or close-range wireless communications, such as Bluetooth® and Bluetooth® low energy, near field communications (NFC), a wired network, or any other such network, or any combination thereof. Accordingly, the one or more networks may include both wired and/or wireless communication technologies, including Bluetooth®, Bluetooth® low energy, Wi-Fi and cellular communication technologies like worldwide interoperability for microwave access (Wi-MAX), 3G, 4G, CDMA, digital subscriber line (DSL), etc., cloud computing technologies, as well as wired or fiber optic technologies. Additionally, the communication network may be a mesh network. For example, in a wireless local area network (WLAN), network devices may be configured to receive and forward communications which are ultimately destined for a different device. These types of networks are generically referred to as "mesh" networks, where network nodes may form a "mesh" of paths for which communications may travel to reach their destination. Wireless networks may use beacon transmissions to advertise the network's existence, as well as provide information about the network and capabilities associated with the network. Different kinds of beaconing mechanisms may be used, for example, one for infrastructure mode networks (also called basic service set (BSS) networks) and one for ad-hoc mode networks (also called independent basic service set (IBSS) networks). In infrastructure networks, access points (APs) are the entities responsible for generating beacons whereas in ad hoc networks, all network nodes (including user stations) participate in the generation of beacons. The ad hoc network beacons (referred to as IBSS beacons) are used to advertise the network (which consists of all the nodes) as a whole while the infrastructure network beacons (referred to as BSS beacons) are generated by an AP and meant to advertise the existence of only that individual AP. Components used for such communications can depend at least in part upon the type of network, the environment selected, or both. Protocols for communicating over such networks are well known and are not discussed herein in detail.

The term "component," "module" or "engine" refers broadly to general or specific-purpose hardware, software, or firmware (or any combination thereof) components. Components and engines are typically functional components that can generate useful data or other output using specified input(s). A component or engine may or may not be self-contained. Depending upon implementation-specific or other considerations, the components or engines may be centralized or functionally distributed. An application program (also called an "application") may include one or more components and/or engines, or a component and/or engine can include one or more application programs.

What is claimed is:

1. A computer-implemented method of generating a digital receipt in response to a payment transaction between a customer and a merchant, the computer-implemented method comprising:

receiving, by one or more computing devices associated with a payment processing service and from an instance of a point-of-sale (POS) application installed on a merchant mobile device associated with the merchant, transaction data associated with the payment transaction between the merchant and the customer;

retrieving, by the one or more computing devices and based on the transaction data, at least one tip determinant of a plurality of tip determinants, wherein the at least one tip determinant is further based at least in part on an item type of an item purchased via the payment transaction;

generating, by the one or more computing devices, a tipping profile for the payment transaction based at least in part on a history of tipping behavior associated with the at least one tip determinant;

generating, by the one or more computing devices, one or more dynamic tip amounts based at least on the tipping profile;

generating, by the one or more computing devices, the digital receipt indicative of the payment transaction, wherein the digital receipt includes a plurality of interactive components, including an interactive tipping component configured to enable the customer to select, via the instance of the POS application on the merchant mobile device, one of the one or more dynamic tip amounts associated with the payment transaction; and transmitting, by the one or more computing devices, the generated digital receipt to the merchant mobile device, wherein the transmitting causes a user interface associated with the merchant mobile device to present the interactive tipping component configured to enable the customer to select one of the one or more dynamic tip amounts via an interaction with the user interface that is displayed on the merchant mobile device.

2. The computer-implemented method of claim 1, further comprising associating, by the one or more computing devices, a weight to the at least one tip determinant, and wherein the plurality of tip determinants are arranged in a hierarchy of tip determinants based on weights of individual tip determinants of the plurality of tip determinants.

3. The computer-implemented method of claim 1, wherein the interactive tipping component is associated with a transaction timeframe that defines a time period for the customer to select one of the one or more dynamic tip amounts using the interactive tipping component, and wherein a nominal amount configured by the customer is automatically authorized as a default tip when no selection of one of the one or more dynamic tip amounts is received within the transaction timeframe.

4. The computer-implemented method of claim 1, wherein the plurality of interactive components includes an interactive feedback component for the customer to submit feedback associated with the payment transaction, and wherein the interactive feedback component is configured to update the tipping profile for a subsequent payment transaction.

5. The computer-implemented method of claim 1, wherein the plurality of interactive components includes an interactive promotion component for the customer to redeem a promotional reward, wherein, upon determining that the promotional reward has been applied, and wherein the computer-implemented method further includes generating the one or more dynamic tip amounts based at least on an original cost of the item and the tipping profile.

6. The computer-implemented method of claim 1, further comprising:

generating an interactive transaction record that is accessible via the digital receipt, the interactive transaction record comprising a plurality of transaction records completed between the customer and the merchant; and for every digital receipt generated for a new payment transaction between the customer and the merchant, updating the interactive transaction record.

7. The computer-implemented method of claim 1, wherein receiving an indication of the payment transaction includes receiving data associated with a payment object presented by the customer for payment towards the payment transaction.

8. The computer-implemented method of claim 7 further comprising:

based at least in part on the data associated with the payment object, determining that the payment object has a fixed value;

determining a remaining value on the payment object after deducting a cost of the item from the fixed value; and generating the one or more dynamic tip amounts based on the remaining value.

9. The computer-implemented method of claim 1, further comprising receiving a request to generate the tipping profile at substantially the same time as a request for authorization of a payment object presented by the customer.

10. The computer-implemented method of claim 1, further comprising:

receiving, by the one or more computing devices and at least partly via the user interface of the merchant mobile device, a first input requesting that an open ticket for the payment transaction be opened;

opening, by the one or more computing devices, the open ticket for the payment transaction in response to the first input;

receiving, by the one or more computing devices and from the merchant mobile device, first information associated with a first payment instrument received at a payment object reader of the merchant mobile device, the first payment instrument to satisfy at least part of a total cost of the payment transaction, wherein the total cost of the payment transaction includes a cost of the item being purchased and the one or more dynamic tip amounts;

receiving, by the one or more computing devices and at least partly via the user interface, a second input specifying one or more first items to add to the open ticket;

determining, by the one or more computing devices, a first cost of the payment transaction of the one or more first items wherein the first cost includes the cost of the item being purchased;

generating, by the one or more computing devices, the one or more dynamic tip amounts based at least in part on the tipping profile associated with the first information, the first input, and the first cost of the payment transaction;

transmitting, by the one or more computing devices, the first cost, the one or more dynamic tip amounts, and the tipping profile to the merchant mobile device within the digital receipt;

receiving, by the one or more computing devices and via the user interface, a third input specifying one or more second items to add to the open ticket, wherein the third input is provided when the merchant mobile device is offline with respect to the payment processing service;

determining, by the one or more computing devices, a second cost of the payment transaction, based on adding the one or more second items;

determining, by the one or more computing devices, an updated value of the one or more dynamic tip amounts based on the tipping profile associated with the third input;

adding, by the one or more computing devices, the updated value of the one or more dynamic tip amounts to the digital receipt;

closing, by the one or more computing devices, the open ticket; and processing, by the one or more computing devices, the payment transaction with an amount in the digital receipt when the merchant mobile device is online with respect to the payment processing service.

11. The computer-implemented method of claim 10, further comprising saving a last-known state of the tipping profile on the merchant mobile device.

12. A system of a payment processing service for generating a dynamic gratuity amount on a payment transaction between a merchant and a customer, the system comprising:

a memory;

one or more processors to execute instructions stored in the memory for:

receiving, by one or more computing devices associated with the payment processing service and from an instance of a point-of-sale (POS) application installed on a merchant mobile device associated with the merchant, transaction data associated with the payment transaction between the merchant and the customer;

retrieving, by the one or more computing devices associated with the payment processing service and based on the transaction data, at least one tip determinant, wherein the at least one tip determinant is further based at least in part on an item type of an item purchased via the payment transaction;

generating, by the one or more computing devices, a tipping profile for the payment transaction based at least in part on a history of tipping behavior associated with the at least one tip determinant;

generating, by the one or more computing devices, at least one dynamic tip amount based at least in part on the tipping profile;

generating, by the one or more computing devices, a digital receipt indicative of the payment transaction, wherein the digital receipt includes an interactive tipping component configured to enable the customer to select, via the instance of the POS application on the merchant mobile device, the at least one dynamic tip amount associated with the payment transaction; and transmitting, by the one or more computing devices, the generated digital receipt to the merchant mobile device, wherein the transmitting causes a user interface of the merchant mobile device to present the interactive tipping component configured to enable the customer to select the at least one of the one or more dynamic tip amount via an interaction with the user interface that is displayed on the merchant mobile device.

13. The system of claim 12, further comprising an exception handler to override the at least one dynamic tip amount with a customer-generated tip amount.

14. The system of claim 12 further comprising a pattern recognition component configured to:

analyze tipping profiles corresponding to the at least one tip determinant;

extract a pattern in the tipping profile; and generate a tip relationship between the customer and the merchant based on the pattern.

15. The system of claim 12, further comprising an open tickets data table configured to:

maintain an open ticket;

track incoming items into the open ticket; and dynamically modify the at least one dynamic tip amount based on the incoming items.

16. The system of claim 12, further comprising executing by a dynamic tip generator, further instructions to assign respective weights to the at least one tip determinant.

17. One or more non-transitory computer-readable media maintaining instructions stored in a memory that, when executed by one or more processors, program the one or more processors to perform acts comprising:

receiving, by one or more computing devices associated with a payment processing service and from an instance of a point-of-sale (POS) application installed on a merchant mobile device associated with a merchant, transaction data associated with a payment transaction between the merchant and a customer;

retrieving, by the one or more computing devices and based on the transaction data, at least one tip determinant of a plurality of tip determinants, wherein the at least one tip determinant is further based at least in part on an item type of an item purchased via the payment transaction;

generating, by the one or more computing devices, a tipping profile for the payment transaction based at least in part on a history of tipping behavior associated with the at least one tip determinant;

generating, by the one or more computing devices, at least one dynamic tip amount based at least in part on the tipping profile;

generating, by the one or more computing devices, a digital receipt indicative of the payment transaction, wherein the digital receipt includes an interactive tipping component for enabling the customer to select, via the instance of the POS application on the merchant mobile device, the at least one dynamic tip amount associated with the payment transaction; and transmitting, by the one more computing devices, the generated digital receipt to the merchant mobile device wherein the transmitting causes a user interface of the merchant mobile device to present the interactive tipping component configured to enable the customer to select the at least one of the one or more dynamic tip amount via an interaction with the user interface that is displayed on the merchant mobile device.

18. The one or more non-transitory computer readable media of claim 17, the acts further comprising associating respective weights to the at least one tip determinant, and wherein the plurality of tip determinants are arranged in a hierarchy based on the respective weights.

19. The one or more non-transitory computer readable media of claim 17, the acts further comprising:

receiving, via the user interface of the merchant mobile device, a first input requesting that an open ticket for the payment transaction be opened;

opening, in response to the first input, the open ticket for the payment transaction;

receiving, from the merchant mobile device, first information associated with a first payment instrument received at a payment object reader of the merchant mobile device, the first payment instrument satisfying at least part of a total cost of the payment transaction, wherein the total cost of the payment transaction includes a cost of the item being purchased and the at least one dynamic tip amount;

receiving, via the user interface, a second input specifying one or more first items to add to the open ticket;

determining a first cost of the payment transaction of the one or more first items, wherein the first cost includes the cost of the item being purchased;

determining, by the one or more computing devices, the at least one dynamic tip amount based on the tipping profile associated with the first information, the first input, and the first cost of the payment transaction;

transmitting the first cost of the payment transaction, the at least one dynamic tip amount, and the tipping profile to the mobile device within the digital receipt;

receiving, via the user interface, a third input specifying one or more second items to add to the open ticket, wherein the third input is provided when the merchant mobile device is offline;

determining a second cost of the payment transaction based on adding the one or more second items;

determining, by the one or more computing devices, an updated value of the at least one dynamic tip amount based on the tipping profile associated with the third input, wherein the merchant mobile device is communicatively coupled to the payment processing service;

adding the updated value of the at least one dynamic tip amount to the digital receipt;

closing the open ticket; and processing the payment transaction with an amount in the digital receipt when the merchant mobile device is online.

20. A computing device of a payment processing service, the computing device comprising:

a memory;

one or more processors to execute instructions stored in the memory for:

receiving, from an instance of a point-of-sale (POS) application installed on a merchant mobile device associated with the merchant, transaction data associated with the payment transaction between the merchant and the customer;

retrieving, based on the transaction data, at least one tip determinant, wherein the at least one tip determinant is further based at least in part on an item type of an item purchased via the payment transaction;

generating a tipping profile for the payment transaction based at least in part on a history of tipping behavior associated with the at least one tip determinant;

generating at least one dynamic tip amount based at least in part on the tipping profile;

generating a digital receipt indicative of the payment transaction, wherein the digital receipt includes an interactive tipping component configured to enable the customer to select, via the instance of the POS application on the merchant mobile device, the at least one dynamic tip amount associated with the payment transaction; and transmitting the generated digital receipt to the merchant mobile device, wherein the transmitting causes a user interface of the merchant mobile device to present the interactive tipping component configured to enable the customer to select the at least one of the one or more dynamic tip amount via an interaction with the user interface that is displayed on the merchant mobile device.

21. The computing device of claim 20, further comprising a pattern recognition component configured to:

analyze tipping profiles corresponding to the at least one tip determinant;

extract a pattern in the tipping profile; and generate a tip relationship between the customer and the merchant based on the pattern.

22. The computing device of claim 20, further comprising an open tickets data table stored in the memory, the open tickets data table being configured to:

maintain an open ticket;

track incoming items into the open ticket; and dynamically modify the at least one dynamic tip amount based on the incoming items.

23. The computing device of claim 20 further comprising an exception handler to override the at least one dynamic tip amount with a customer-generated tip amount.

* * * * *